US012810501B2

(12) United States Patent
Khilnani et al.

(10) Patent No.: US 12,810,501 B2
(45) Date of Patent: Nov. 24, 2026

(54) COLLAGE GENERATION OF COMPLEMENTARY OBJECTS

(71) Applicant: Pinterest, Inc., San Francisco, CA (US)

(72) Inventors: Sanidhya Khilnani, Jersey City, NJ (US); Guilherme Gentil Martins Seiz de Freitas, San Francisco, CA (US); Weiqi An, San Francisco, CA (US); Ryan Wilson Probasco, San Leandro, CA (US); Albert Pereta Farre, Barcelona (ES); Steven Ramkumar, Brooklyn, NY (US); David Temple, Mill Valley, CA (US)

(73) Assignee: Pinterest, Inc., San Francisco, CA (US)

( * ) Notice: Subject to any disclaimer, the term of this patent is extended or adjusted under 35 U.S.C. 154(b) by 163 days.

(21) Appl. No.: 18/764,005

(22) Filed: Jul. 3, 2024

(65) Prior Publication Data

US 2026/0011057 A1 Jan. 8, 2026

(51) Int. Cl.

*G06T 11/60* (2026.01)
*G06Q 30/0241* (2023.01)
*G06V 10/26* (2022.01)
*G06V 10/94* (2022.01)

(52) U.S. Cl.

CPC .......... *G06T 11/60* (2013.01); *G06Q 30/0276* (2013.01); *G06T 2200/24* (2013.01); *G06V 10/26* (2022.01); *G06V 10/945* (2022.01)

(58) Field of Classification Search

None

See application file for complete search history.

(56) References Cited

U.S. PATENT DOCUMENTS 9,449,338 B2 * 9/2016 Isaacson ............ G06Q 30/0613
10,878,535 B2 12/2020 Yadav et al.
2004/0111332 A1 6/2004 Baar et al.
(Continued)

FOREIGN PATENT DOCUMENTS

WO WO-2023115044 A1 * 6/2023 ............ G06T 11/00

OTHER PUBLICATIONS

Diakopoulos et al. (Mediating Photo Collage Authoring, UIST05: The 18th Annual ACM Symposium on User Interface Software and Technology, Oct. 23-26, 2005, pp. 183-186 (Year: 2005).*
(Continued)

*Primary Examiner* — Kee M Tung
*Assistant Examiner* — Biao Chen
(74) *Attorney, Agent, or Firm* — Gustafson IP

(57) ABSTRACT

Described are systems and methods of identifying complementary image segments and generating collages of the complementary image segments. Based on an initial image segment, the complementary image segments may first be determined. Then, a layout of the collage may be determined based on the initial image segment and the complementary image segments. The collage may then be generated using the initial image segment, the complementary image segments, and the layout. The origin information, such as the source image, source image location, etc., from which the extracted image segment is generated is maintained as metadata so that interaction with the extracted image segment on the collage can be used to determine and/or return to the origin of the extracted image segment. Collages may be updated, shared, adjusted, etc.

20 Claims, 35 Drawing Sheets

(56) References Cited

U.S. PATENT DOCUMENTS

| | | | |
|---|---|---|---|
| 2006/0104542 | A1 | 5/2006 | Blake et al. |
| 2007/0058884 | A1 | 3/2007 | Rother et al. |
| 2007/0188626 | A1 | 8/2007 | Squilla et al. |
| 2008/0069409 | A1 | 3/2008 | Kojima et al. |
| 2010/0226566 | A1 | 9/2010 | Luo et al. |
| 2014/0207611 | A1 | 7/2014 | Cleary et al. |
| 2015/0178786 | A1 | 6/2015 | Claessens |
| 2015/0332117 | A1 | 11/2015 | Zhou et al. |
| 2016/0098685 | A1 * | 4/2016 | Hanigan ............ G06Q 10/1053 705/321 |
| 2016/0328868 | A1 * | 11/2016 | Tran ........................ G06T 11/60 |
| 2018/0174340 | A1 | 6/2018 | Shah et al. |
| 2019/0164322 | A1 | 5/2019 | Kong et al. |
| 2019/0236786 | A1 | 8/2019 | McNerney et al. |
| 2022/0091706 | A1 | 3/2022 | Winn et al. |
| 2023/0259549 | A1 | 8/2023 | Kim |
| 2024/0428304 | A1 * | 12/2024 | Rudnick ............ G06Q 30/0641 |

OTHER PUBLICATIONS

Fang, F. et al, Narrative Collage of Image Collections by Scene Graph Recombination, Sep. 2018, IEEE Transactions on Visualizations and Computer Graphics vol. 24, No. 9, pp. 2559-2572 (Year: 2018).

Fuwen Tan et al, “Where and Who? Automatic Semantic-Aware Person Composition,” IEEE, 10 pages, (Year:2018).

* cited by examiner

COLLAGE GENERATION OF COMPLEMENTARY OBJECTS

BACKGROUND

With the ever expanding amount of accessible digital content available to users and customers, it continues to become more and more difficult for users to organize and maintain information relating to digital content of interest and/or discovered by the user. For example, some systems allow users to maintain links or bookmarks to websites or specific webpages discovered by a user. Other systems also allow users to store images of items discovered by users.

BRIEF DESCRIPTION OF THE DRAWINGS

FIGS. 1A through 10 are representations of a graphical user interface, the creation of a collage of extracted image segments, and a remix of the created collage, in accordance with disclosed implementations.

FIG. 2 is an example collage process, in accordance with disclosed implementations.

FIG. 3 is an example image processing subprocess, in accordance with disclosed implementations.

FIG. 4 is an example image segment modification subprocess, in accordance with disclosed implementations.

FIG. 5 is an example collage transformation process, in accordance with disclosed implementations.

FIG. 6 is an example buyable objects collage process, in accordance with disclosed implementations.

DETAILED DESCRIPTION

Figure 1A:

Described are systems and methods to extract image segments, referred to herein as extracted image segments, from an image and include those image segments in a collage. The origin information, such as the source image, source image location, etc., from which the extracted image segment is generated, is maintained as metadata so that interaction with the extracted image segment on the collage can be used to determine and/or return to the origin of the extracted image segment. For example, if an extracted image segment on a collage originated from an e-commerce website, the address to the e-commerce website may be maintained in metadata of the extracted image segment when generated and added to the collage. Additionally, other information, such as a collage category, annotations, object types of the objects represented in image segments, and the like may also be stored as metadata in association with a collage.

Extracted image segments may be positioned anywhere on a collage that is presented on a user device. For example, extracted image segments may be visually stacked with respect to other extracted image segments of the collage, extracted image segments may be rotated, extracted image segments may be adjusted in size, etc. Likewise, in some implementations, extracted image segments may be animated or otherwise distinguished when presented as part of a collage when presented.

In some implementations, an object represented in an extracted image segment may be buyable. For example, a seller of an item represented in an extracted image segment of a collage may be determined and associated with and/or identified in the metadata of the extracted image segment. Likewise, an indicator may be presented with the extracted image segment to indicate that the object represented in the extracted image segment may be purchased from the seller. A user, when viewing the collage, may interact with the extracted image segment and, for example, be redirected to the e-commerce website of the seller of the object and complete a purchase of the object. In other implementations, the user may interact with the extracted image segment and directly purchase the object represented in the extracted image segment.

In other implementations, collages may be automatically and dynamically generated based at least in part on an initial image segment without further input from a user. For example, one or more initial image segments that include representation(s) of one or more objects of interest may be processed by one or more trained machine learning systems to identify additional image segments that include representations of objects that are complementary to the object of interest represented in the initial image segment. From the additional image segments, one or more image segments may be selected (e.g., from a corpus of content items, etc.) to be included in an automatically generated collage. For example, the additional image segments may be determined based on the type of the object(s) of interest and the types of objects represented in the additional image segments, a number of additional image segments to be included in the collage, user information, and the like. Additionally, prior to generation of the collage, a layout/organization of the collage may also be determined. For example, the layout/organization of the collage may be determined based on the initial image segments and/or the additional image segments selected for inclusion in the collage. A collage that includes the initial image segment(s) and the selected additional image segments arranged and configured in accordance with the determined layout may then be generated. The generated collage may include metadata including a reference to each image segment included in the collage, and each image segment may include a reference to a corresponding image from which it was extracted.

According to another aspect of the present disclosure, collages may be generated from objects that are extracted from a scene presented in a single image/content item rather than identifying additional image segments that are complementary to an initial image segment. It may be assumed that objects appearing together in a scene in a common image/content item are complementary objects to each other. Accordingly, multiple objects may be identified and extracted from a single content item as image segments to generate a collage of the objects presented in the content item. Similar to other implementations, prior to generation of the collage, a layout/organization of the collage may also be determined. For example, the layout/organization of the collage may be determined based on the image segments extracted for inclusion in the collage. A collage that includes the image segments arranged and configured in accordance with the determined layout may then be generated. The generated collage may include metadata including a reference to each image segment included in the collage, and each image segment may include a reference to the corresponding image from which it was extracted.

According to certain aspects of the present disclosure, the collages can facilitate further exploration and consumption of content in connection with an online service. For example, one or more of the image segments included in a collage may be selected by the user to form the basis for a query (e.g., a multi-modal query, a refinement query, etc.), a further automatically generated collage, and the like.

As discussed further below, an image segment and/or extracted image segment may be any portion of an image and may correspond to an object represented in the image segment/extracted image segment. In some implementations, an image may be processed by a deep neural network ("DNN") that is trained to detect object(s) in an image and segment the image, such that each object represented in the image corresponds to an image segment of the image. When viewing the image, the image segments determined for an image may be presented such that they are visually distinguished from the image. A user may select an image segment and the pixels of the image corresponding to the selected image segment are extracted to generate an extracted image segment. Likewise, metadata, such as an indication of the image, the location of the image, a link to a website from which the object represented by the extracted image segment can be purchased or obtained, additional information about the object, reviews of the object, a link to a second collage from which the image or the extracted image segment were obtained, a popularity of the extracted image segment, an indication of a user that created the extracted image segment, etc., may be included in the extracted image segment.

FIGS. 1A through 10 are representations of a graphical user interface, the creation of a collage of extracted image segments, and a remix of the created collage, in accordance with disclosed implementations. As illustrated, the disclosed implementations may be performed in whole or in part on a user device 100, such as a cell phone, smart phone, tablet, wearable, laptop, desktop, etc. In other implementations, portions of the disclosed implementations, such as image processing, image segmentation, and/or extraction of image segments, may be performed on one or more remote computing resources and images, image segments, extracted image segments, collage generation, etc., performed on the user device. In yet other implementations, the disclosed implementations, such as image processing, image segmentation, extraction of image segments, collage generation, storing of images, image segments, extracted image segments, etc. may be performed on one or more remote computing resources. Further, the remote computing resources may include one or more processor(s) and one or more memory, which may store one or more applications, that may be executed by the processor(s) to cause the processor(s) of the remote computing resources to perform various functions and/or actions of the disclosed implementations. Additionally, user device 100 and the remote computing resources may communicate with each other and one or more datastores via a network (e.g., the Internet, cellular, satellite, Bluetooth, Wi-Fi, etc.). The one or more datastores may be configured to store and maintain information, such as a corpus of content items, a corpus of image segments, user information, and the like. According to implementations of the present disclosure, user device 100 may access and/or interact with one or more services executing on the remote computing resources that implement aspects of the present disclosure via one or more applications operating and/or executing on user device 100. As will be appreciated, any variation of processing and/or other operations of the disclosed implementations may be performed on one or many different devices. Likewise, the disclosed implementations, may, for example, be provided as part of a social networking environment, e-commerce environment, or any other form of interactive computing.

Turning first to FIG. 1A, a user interface 111 is presented on a display of user device 100. In the illustrated example, the user interface 111 includes a plurality of images that may be viewed and optionally selected by a user through interaction with the user device 100. In the example illustrated with respect to FIG. 1A, the user interface includes three columns of images. A user may view any number of images through the user interface 111 and select one or more images.

Images may be provided from a remote data store that is accessible to user device 100, such as a social networking service, the Internet, etc., may be provided from a memory on the user device, may be generated from a camera or other imaging element of the user device, etc. In general, an image may be obtained from any source and utilized with the disclosed implementations.

In the illustrated example, the user selects image 112, for example through physical interaction with a touch-based display of the user device. In response to selection of the image 112, and turning to FIG. 1B, an image segment of the image 112 may be determined and presented with the image such that the image segment 112-2 is distinguished from the remainder of the image 112-1. In the illustrated example, the image segment 112-2 of the image 112 (FIG. 1A) includes a wine bottle and when presented by the user device, the image segment 112-2 is presented such that it is visually distinguished from the remainder of the image 112-1. While the example discussed with respect to FIGS. 1A and 1B indicates the wine bottle as the image segment 112-2, in other implementations, other image segments, or all image segments, such as an image segment of the wine glass 112-3 and an image segment for the table 112-4, may be determined and visually presented such that the image segments are visually distinguished.

In some implementations, additional images 124, image segments, and/or extracted image segments, such as images/extracted image segments that are visually similar to the image segment 112-2, may also be presented on the user interface of user device 100 in response to a user selection of an image 112. For example, in some implementations, the popularity or frequency of extracted image segments used on other collages by the same or other users may be monitored and popular or trending extracted image segments presented to the user as additional images 124. Alternatively, or in addition thereto, and as another example, existing extracted images that are similar to other extracted images included on a collage by the user and/or that are determined to be of potential interest to the user may be presented to the user as additional images 124. Other additional images 124 that may be presented include, but are not limited to extracted image segments that enable purchase of an object represented in the extracted image segments, extracted image segments that are related to an extracted image segment of the collage and/or the image segment, extracted image segments generated by the user that selected the image segment, etc.

In this example, the user interacting with the device selects the image segment 112-2. Upon selection of the image segment 112-2, pixels of the image 112 corresponding to the selected image segment 112-2 are extracted from the image 112 and an extracted image segment that includes the pixels is generated. In addition, as discussed further below, metadata, including but not limited to an indication of the image, the location of the image, a link to a website from which the object represented by the extracted image segment can be purchased or obtained, additional information about the object, reviews of the object, a link to a second collage from which the image or the extracted image segment were obtained, a popularity of the extracted image segment, an indication of a user that created the extracted image segment, etc., may be included in the extracted image segment.

Figure 1B:
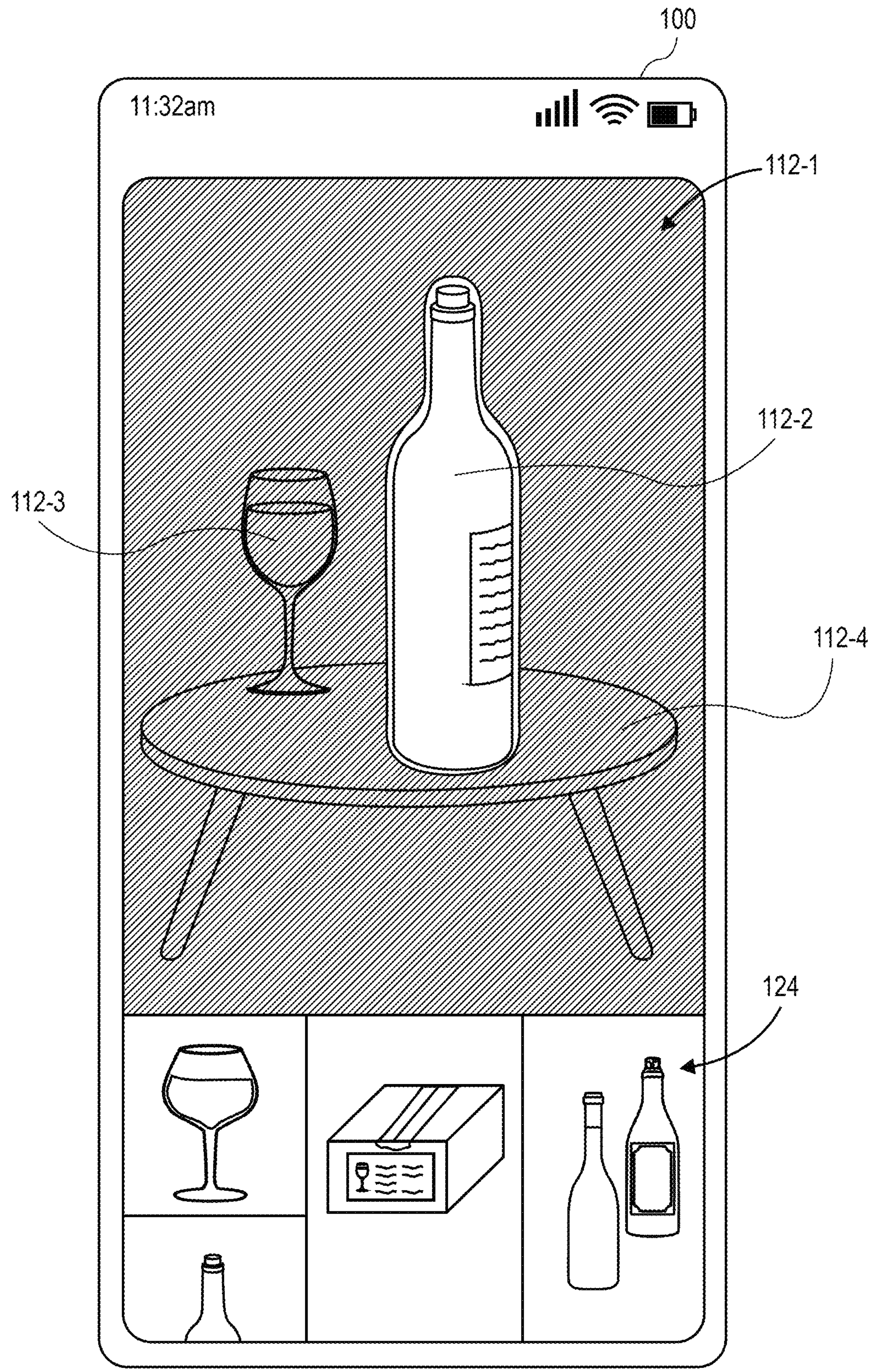
Figure 1C:
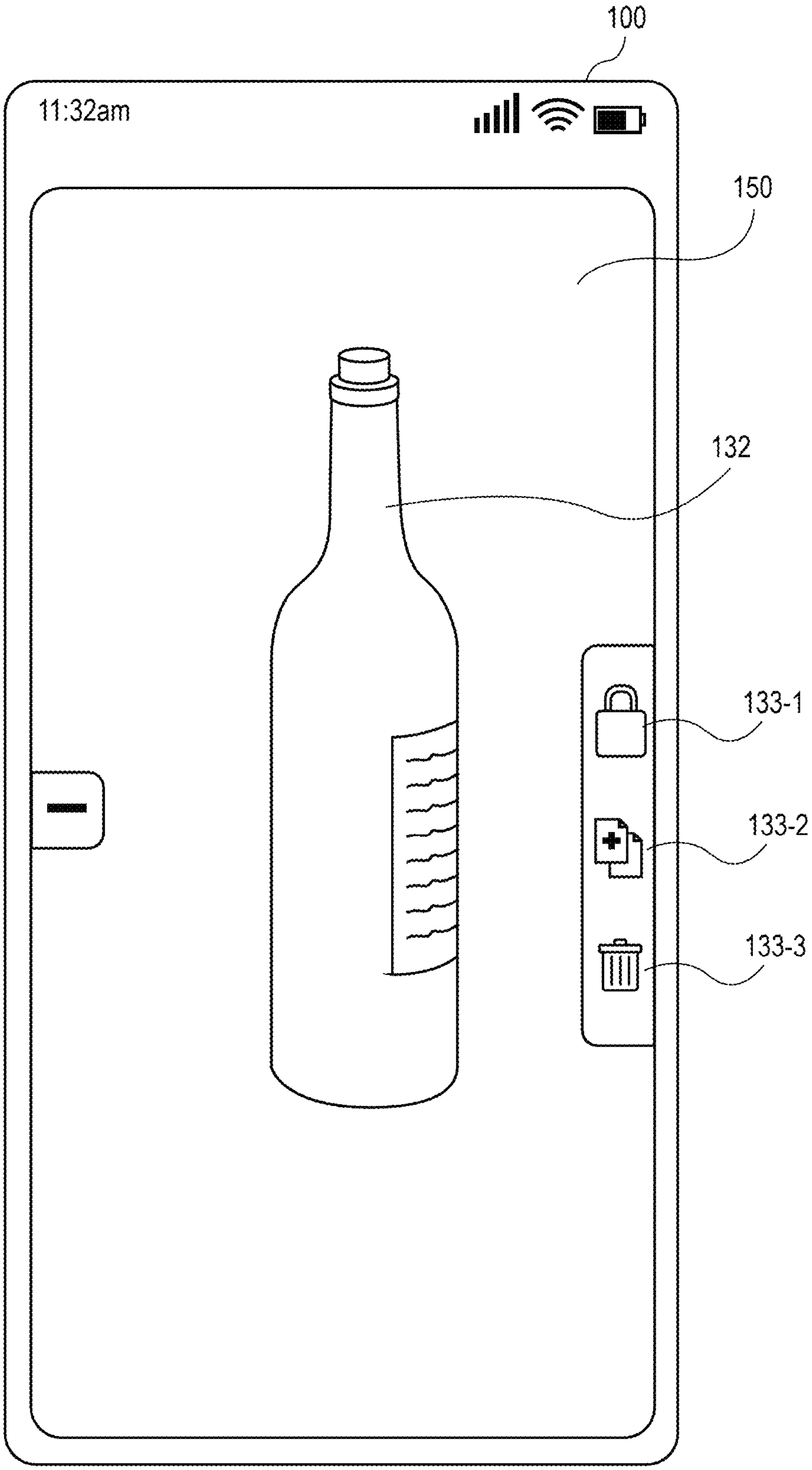

Referring now to FIG. 1C, upon selection of an image segment and generation of the extracted image segment, the extracted image segment 132 is presented on the display of the device 100 as part of a collage 150. A user may interact with the extracted image segment 132 included on the collage 150. For example, the user may crop the extracted image segment, rotate the extracted image segment, increase/decrease the size of the extracted image segment, etc. In some implementations, the object represented in the extracted image segment 132, may be further processed to determine a three-dimensional ("3D") mesh of the object, such that a user can rotate the extracted image segment in three-dimensions.

In addition to interacting with the extracted image segment 132, in some implementations, the user may select to lock the extracted image segment so that it cannot be further interacted with, cannot be transformed, the position/size of the extracted image segment cannot be changed, etc., through selection of the lock control 133-1. Alternatively, or in addition thereto, the user may select to generate a duplicate of the extracted image segment 132 through selection of the duplication control 133-2. Finally, if the user decides they do not want to include the extracted image segment 132 in the collage, the user may remove or delete the extracted image segment through selection of the delete control 133-3.

Figure 1D:
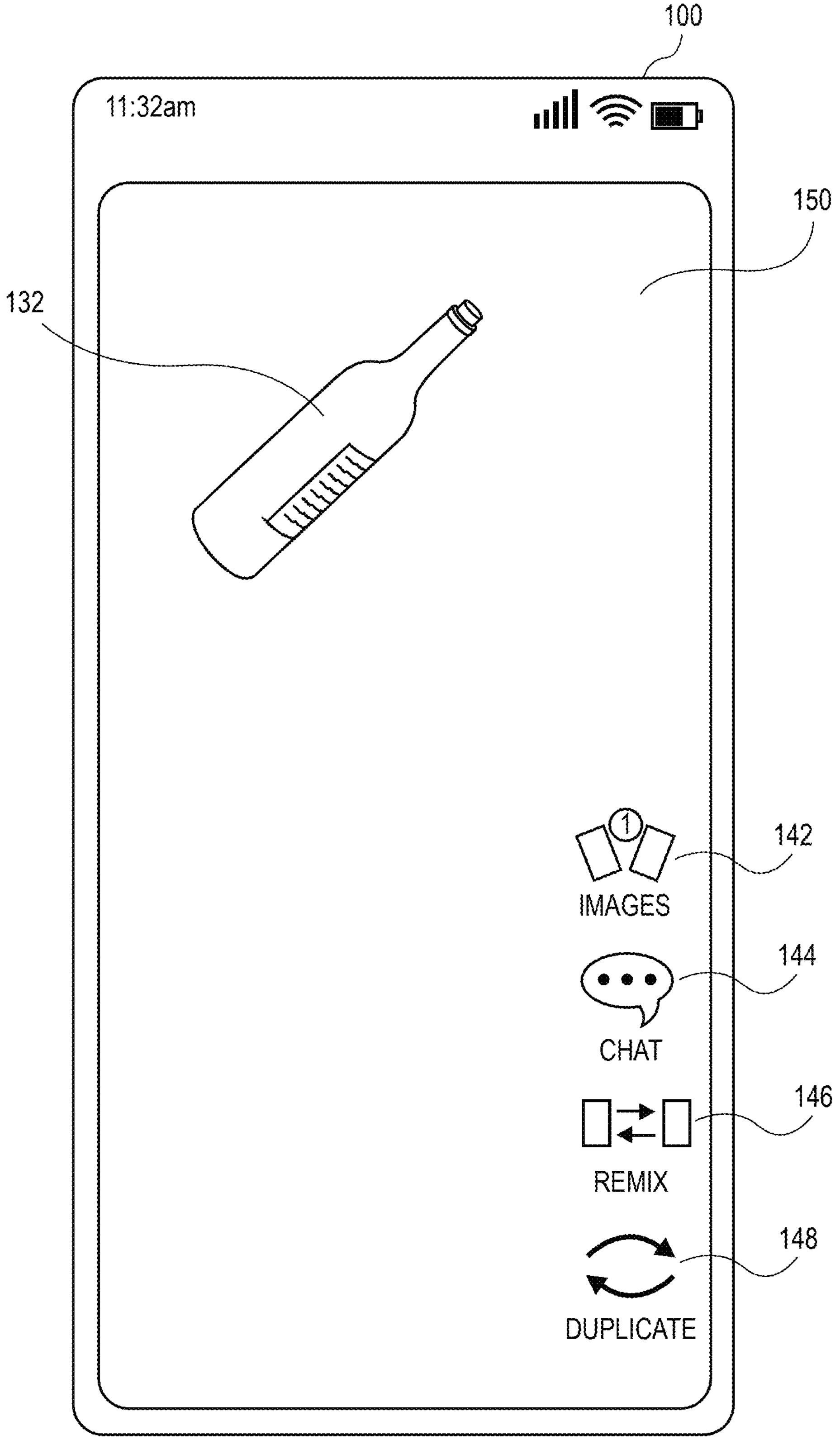

In the illustrated example and referring to FIG. 1D, the user has adjusted the first extracted image segment 132 by decreasing the size of the extracted image segment 132, rotating the extracted image segment 132 and moving the extracted image segment 132 up and to the left portion of the collage 150.

In addition to viewing extracted image segments presented on a collage, additional information indicators 142, 144, 146, 148 may also be presented. The additional information indicator 142 may provide information indicating the number of extracted image segments included on the collage, in this example, one. The additional information indicator 144 may provide the opportunity for the user that created the collage to invite a second user to view the collage, for example making the collage a collaborative collage (as discussed below) and to chat with the second user. The additional information indicator 146 may be a re-mix indicator that, when selected by the user, or another user, remixes the presentation of the extracted image segments of the collage. Remixing may include adjusting the position, size, orientation, stack position, etc. of one or more extracted image segments of a collage. The additional information indicator 148 may be a duplication indicator that, when selected by the user, or another user, causes a duplicate (also referred to as a child copy) of the collage to be generated. Similar to generating a duplicate of a collage in response to a transformation request by another user, as discussed below, a duplicate collage generated in response to selection of the indicator 148 may visually appear the same but the metadata for the collage and image segments may be updated to link back to or otherwise reference the collage from which it was generated.

Figure 1E:
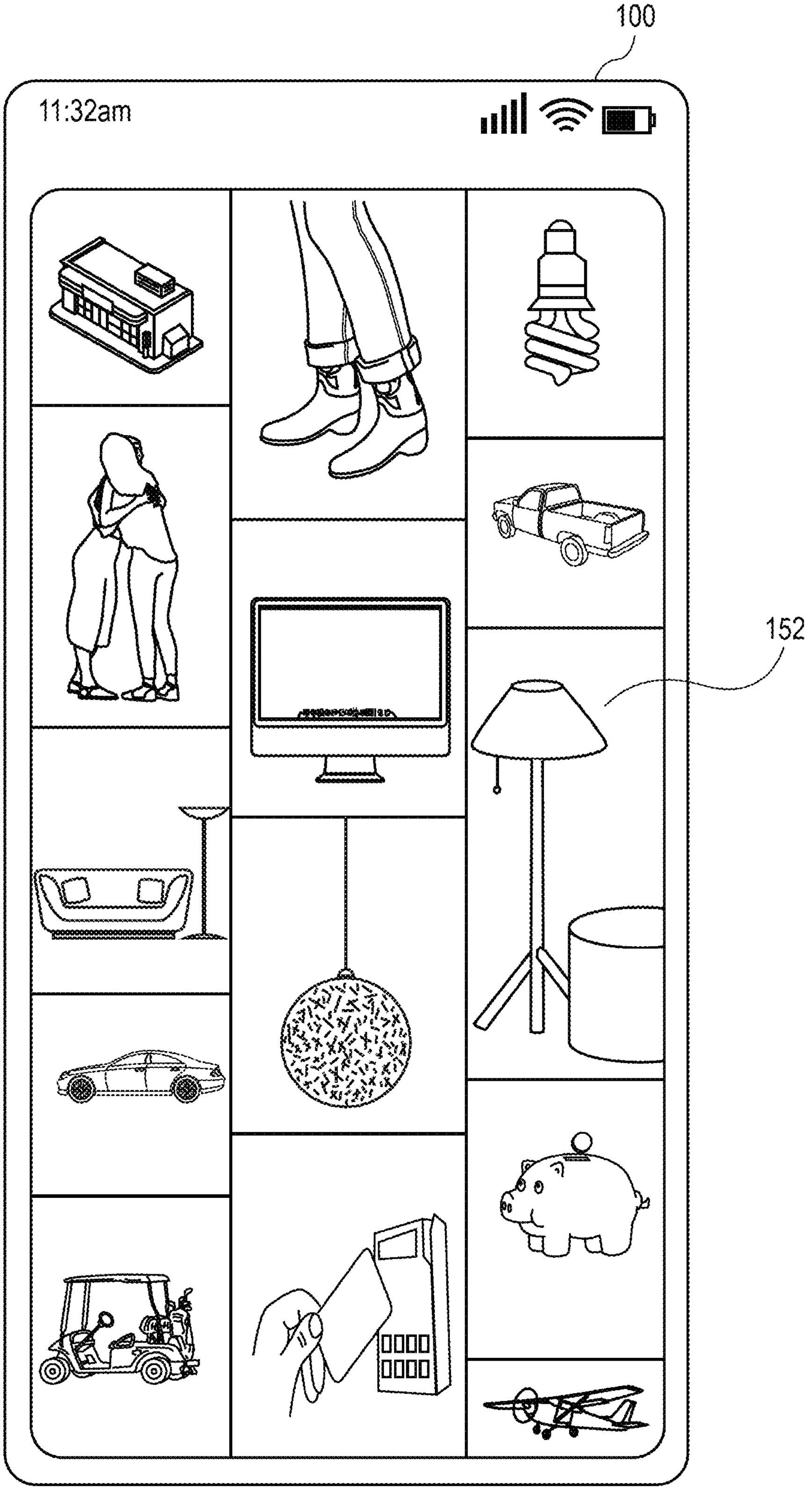
Figure 1F:
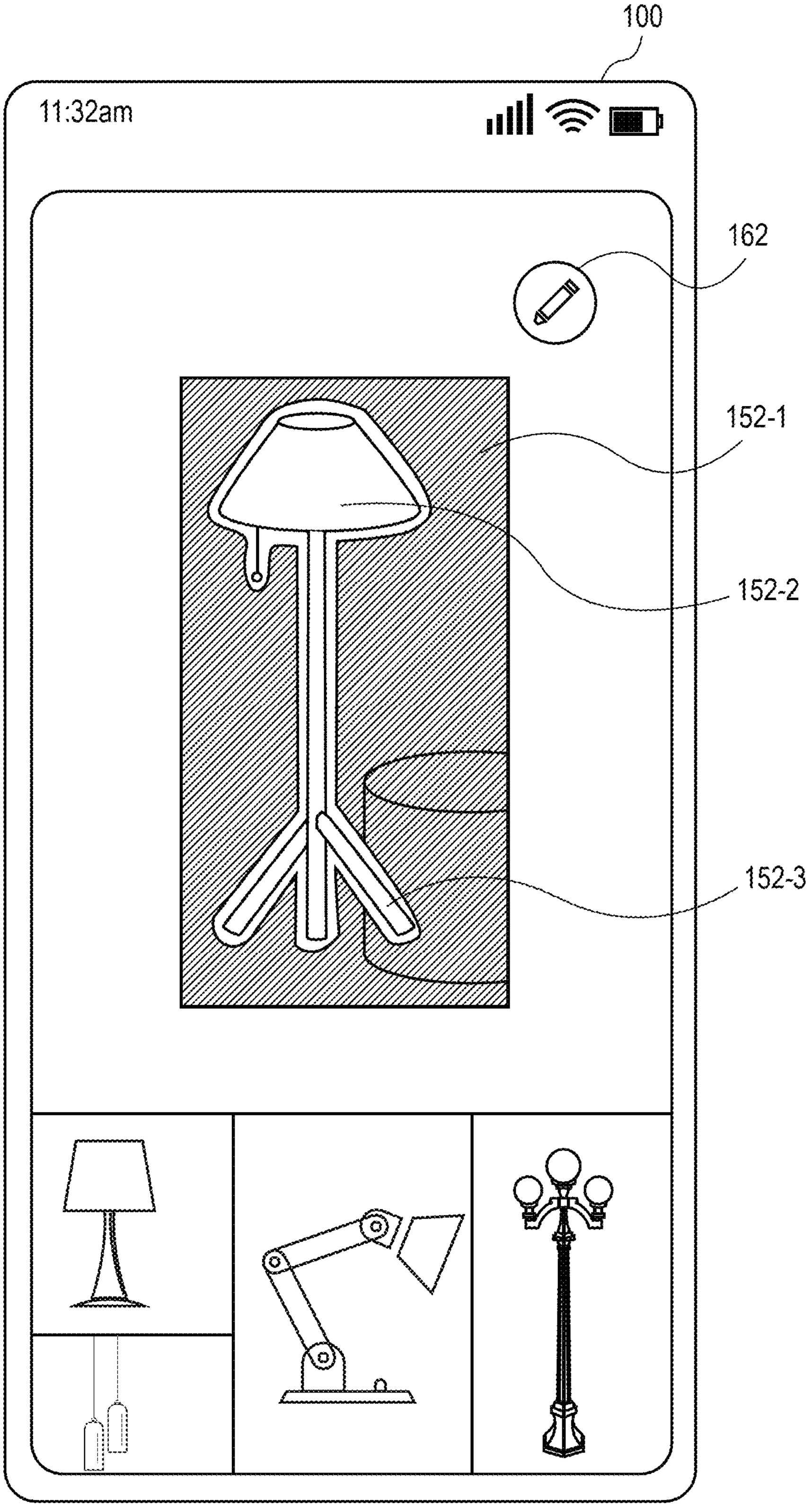

Continuing with the current example and referring now to FIG. 1E, after adding a first extracted image segment 132 to the collage, the user may again view any number of images on a user interface of user device 100. As before, the user may scroll through any number and/or source of images and select an image, such as image 152. In this example, upon selection of the image 152 and referring now to FIG. 1F, an image segment 152-2 corresponding to an object represented in the image, in this example a floor-standing lamp, may be determined and presented to the user via the display of user device 100 such that the image segment 152-2 is visually distinguished from the image 152-1. In the illustrated example, as part of processing of the image to determine objects and generate image segments, processing may likewise be performed to determine if a portion of the object of an image segment is occluded by another object in the image 152. In this example, one of the legs 152-3 of the lamp represented in the image segment 152-2 is determined to be occluded. In such an example, one or more image processing algorithms, such as an inpainting algorithm, may be used to determine the look, shape, and position of the occluded part of the object and present the occluded part of the object as part of the image segment 152-2. Likewise, in some implementations, the user interface may also include a modification control 162 that may be selected by the user to modify the image segment by adjusting the pixels of the image that are included in the image segment. Likewise, for occluded portions of an object corresponding to the image segment, the modification control 162 may be utilized by the user to in-paint or correct a portion of the image segment determined through processing of the image segment.

Figure 1G:
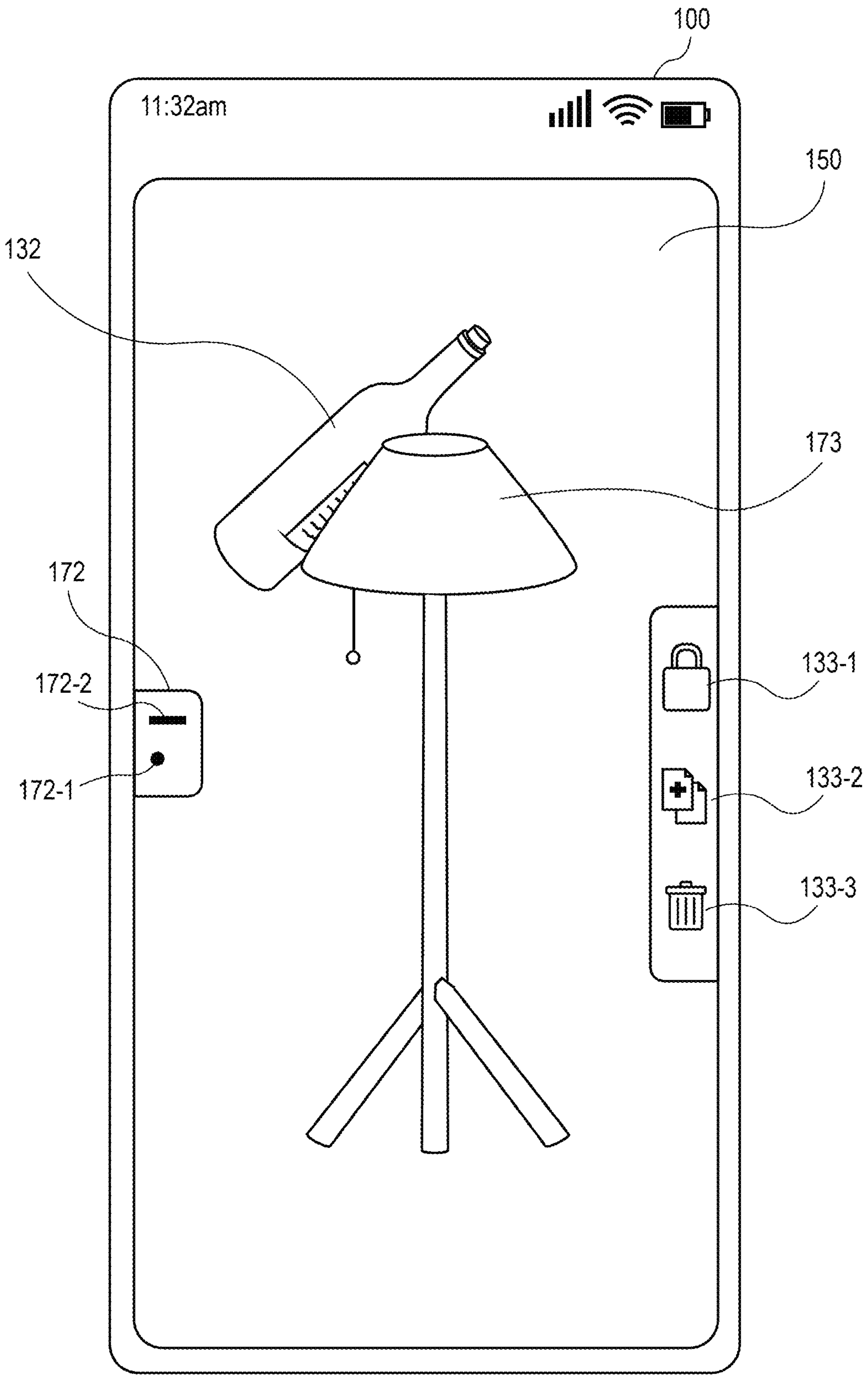
Figure 1H:
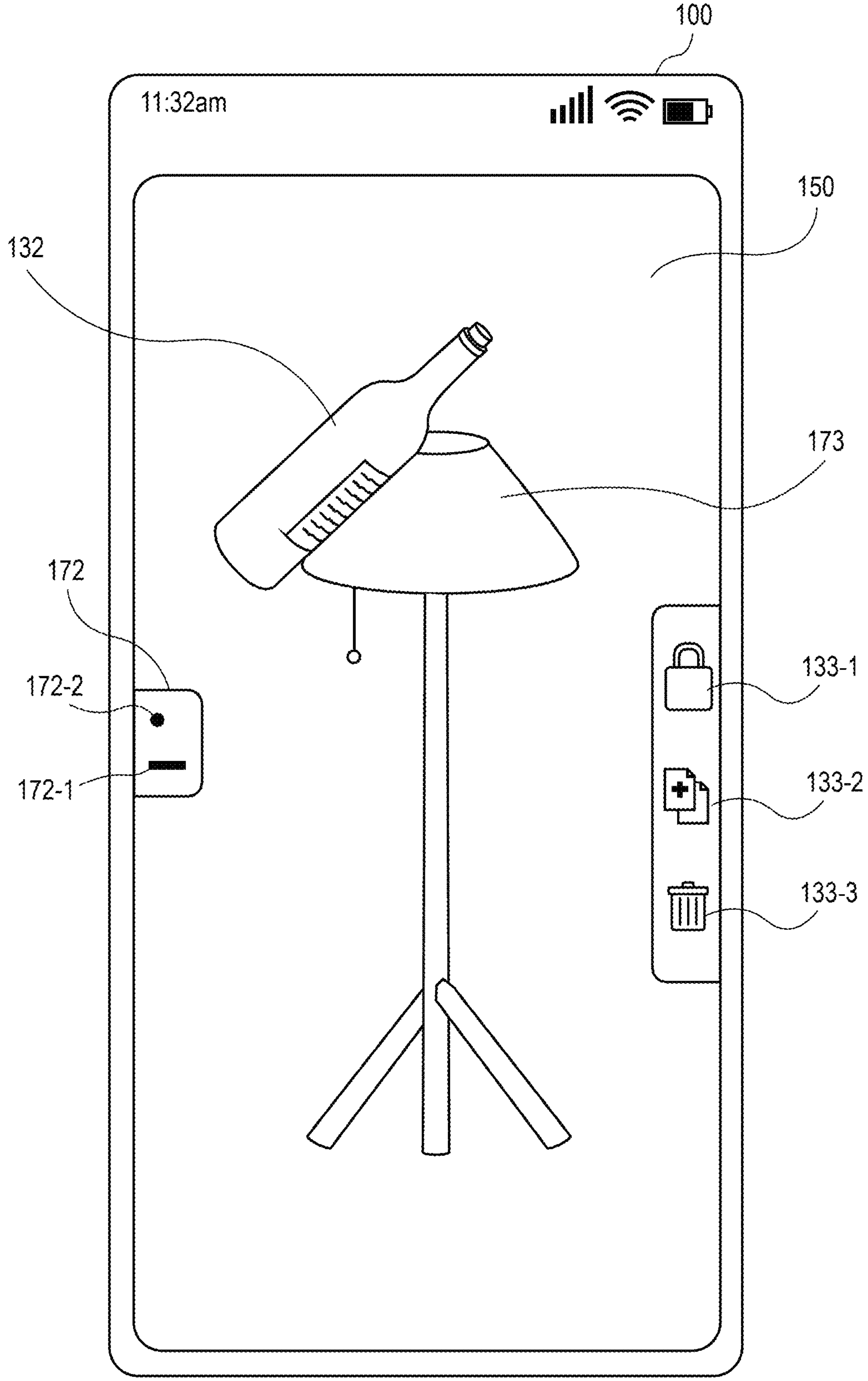

Referring now to FIG. 1G, upon selection of an image segment and generation of the extracted image segment, the second extracted image segment 173 is presented on the display of user device 100 as part of a collage 150 along with the other extracted image segments of the collage, in this example, extracted image segment 132. A user may interact with the extracted image segment included on the collage 150. For example, the user may crop the second extracted image segment 173, rotate the extracted image segment, increase/decrease the size of the extracted image segment, etc. In some implementations, the object represented in the extracted image segment may be further processed to determine a 3D mesh of the object such that a user can rotate the extracted image segment in three-dimensions. Likewise, when the collage 150 has more than one extracted image segment, a stack control 172 may be included that allows the user to move extracted image segments up or down in the stack with respect to other image segments of the collage.

For example, in the collage 150 presented in FIG. 1G, the second extracted image segment 173 is visually presented on the top of a stack such that it is presented on top of the first extracted image segment 132. The user may adjust the position of the extracted image segments through selection of an extracted image segment and interaction with the stack control 172, such as selection of the move up stack control 172-2 or the move down stack control 172-1. For example, comparing FIG. 1G to 1H, in FIG. 1G, the second extracted image segment 173 is presented at the top of the stack and in front of the first extracted image segment 132. In response to the user selecting the second extracted image segment 173 and the move down control 172-1, referring now to FIG. 1H, the second extracted image segment is moved down in the stack and presented behind the first extracted image segment 132.

Figure 1I:
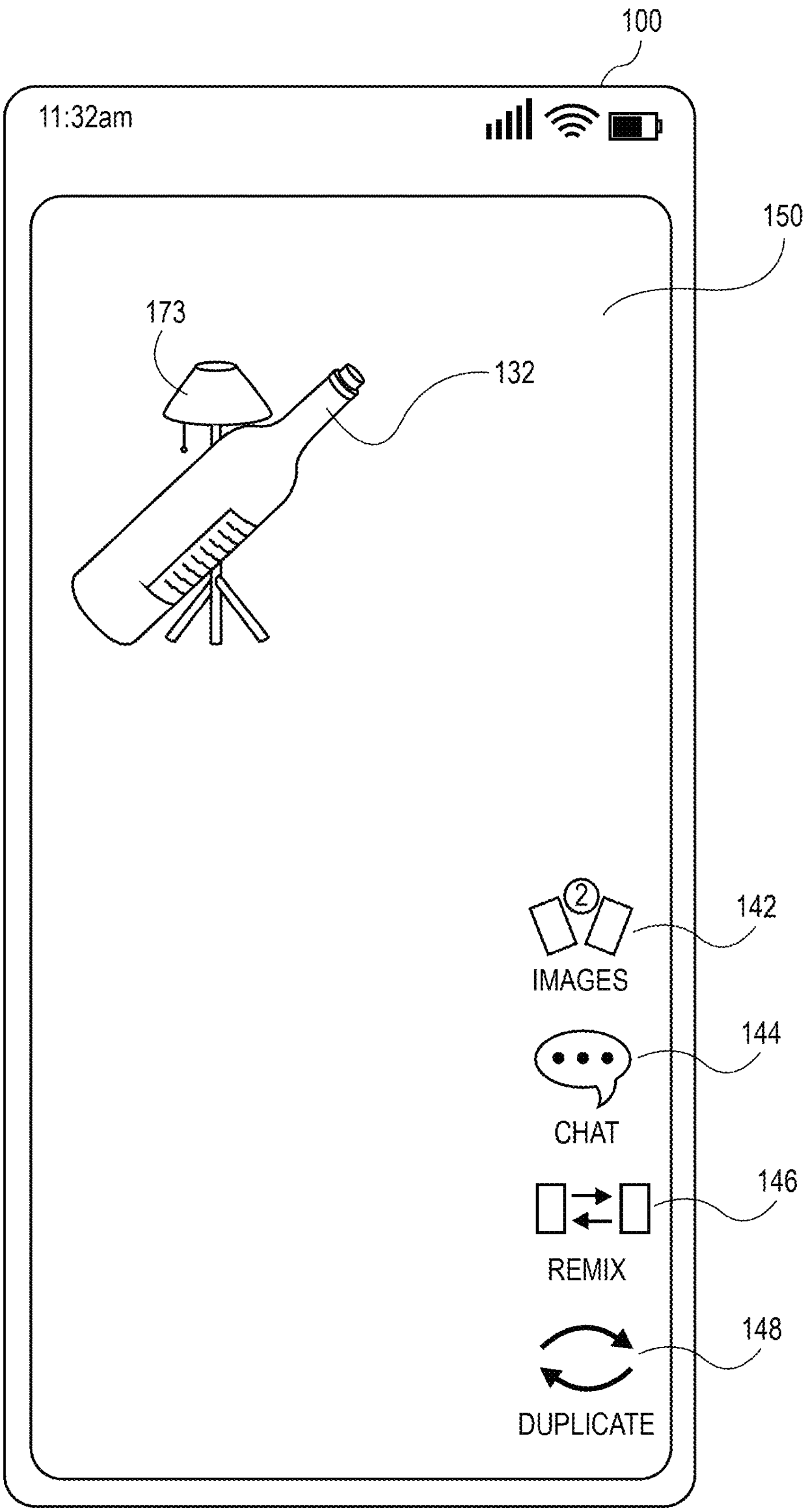

In the illustrated example and referring to FIG. 1I, the user has adjusted the second extracted image segment 173 by decreasing the size of the extracted image segment 173, moving it to the bottom of the stack such that it is presented behind or beneath the first extracted image segment 132, and moved to be centered behind the first extracted image segment 132 in the upper left corner of the collage 150.

Figure 1J:
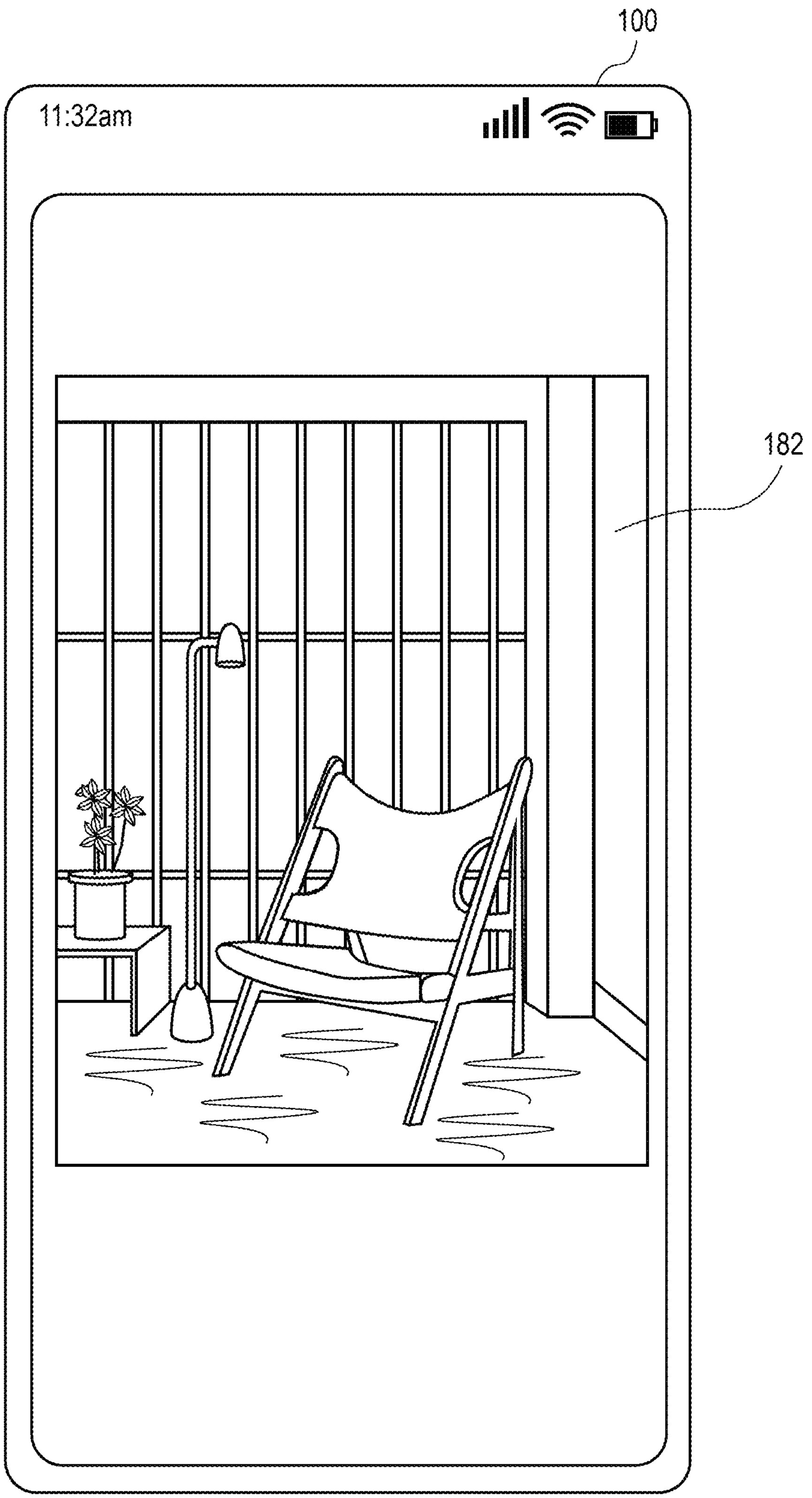
Figure 1K:
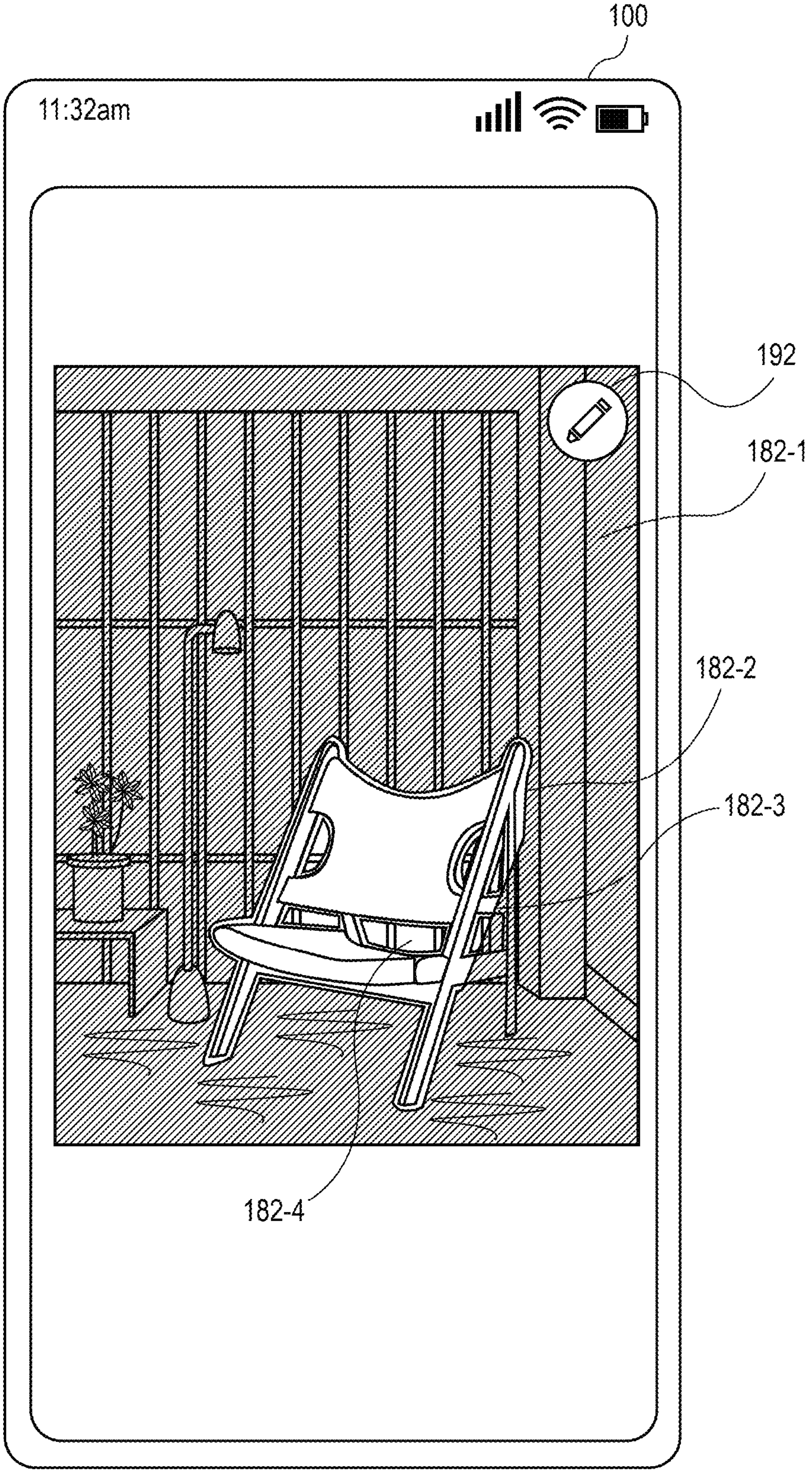

Continuing with the above example and referring now to FIG. 1J, the user has generated an image 182 using an imaging element of user device 100. In this example, the image 182 includes a representation of a chair and other objects. Upon processing the image, as discussed below, an image segment 182-2 corresponding to the chair is determined and presented such that the image segment is visually distinguished from the remainder of the image 182-1, as illustrated in FIG. 1K.

Similar to the above, the user interface may include an alteration control 192 that may be selected by the user to alter pixels of the image 182 that are to be included or excluded from the image segment when extracted. For example, in the example illustrated with respect to FIG. 1K, processing of the image 182 to determine the image segment 182-2 incorrectly excluded pixels representative of the rear leg 182-3 of the chair from the image segment 182-2. Through interaction with the alteration control 192, the user may choose to add or remove pixels from the image segment. For example, and referring to FIG. 1L, the user may interact with the alteration control 192 and select to either add pixels to the image segment, by selecting the add alteration control 192-1 or select to remove pixels from the image segment, by selecting the remove alteration control 192-2. In this example, the user has selected the add alternation control 192-1 and though interaction with the image, such as through a touch-based display of the device 100, indicated which portion of the image and thus the pixels to include or add into the image segment 182-2. Specifically, in this example, the user has selected to include pixels corresponding to the leg 182-3 of the chair. Likewise, the user has also selected the remove alteration control 192-2 and selected to remove the pixels corresponding to the space 182-4 between the seat of the chair and the back of the chair that were originally included in the image segment as a result of a processing of the image segment. Upon altering the image segment to include or exclude pixels, in some implementations, image processing of the image, a portion of the image, such as the altered portion and/or the portion corresponding to the object of interest, may be re-run, as discussed further below.

In some implementations, rather than adjusting an image to include/exclude pixels of an object of interest that is then extracted as an extracted image segment, as discussed herein, a user may select to remove an object from all or a portion of the image. In such an example, the indicated object may be removed from the image or portion of the image and an in-fill or in-painting process, as is known in the art, utilized to assign pixel values to the pixels that previously represented the removed object. As a result, the image may be adjusted to appear as if the object was not included in the image. For example, and referring to FIG. 1K, if the user selected to remove the chair (object) from the image, an in-fill or in-painting process may be utilized to assign pixel values such that the floor and wall of the room represented in the object are represented by the pixels that previously represented the chair.

Figure 1L:
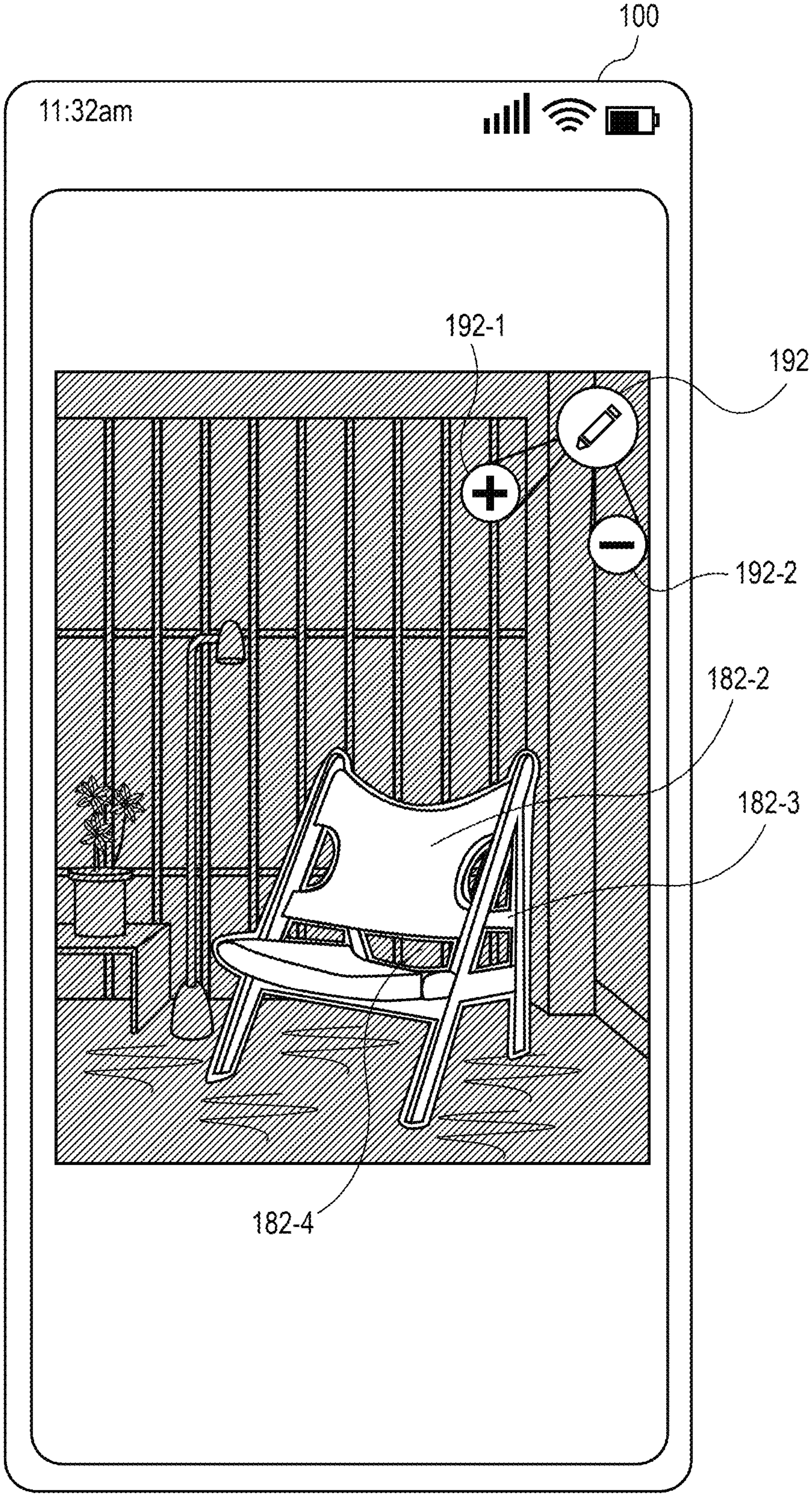
Figure 1M:
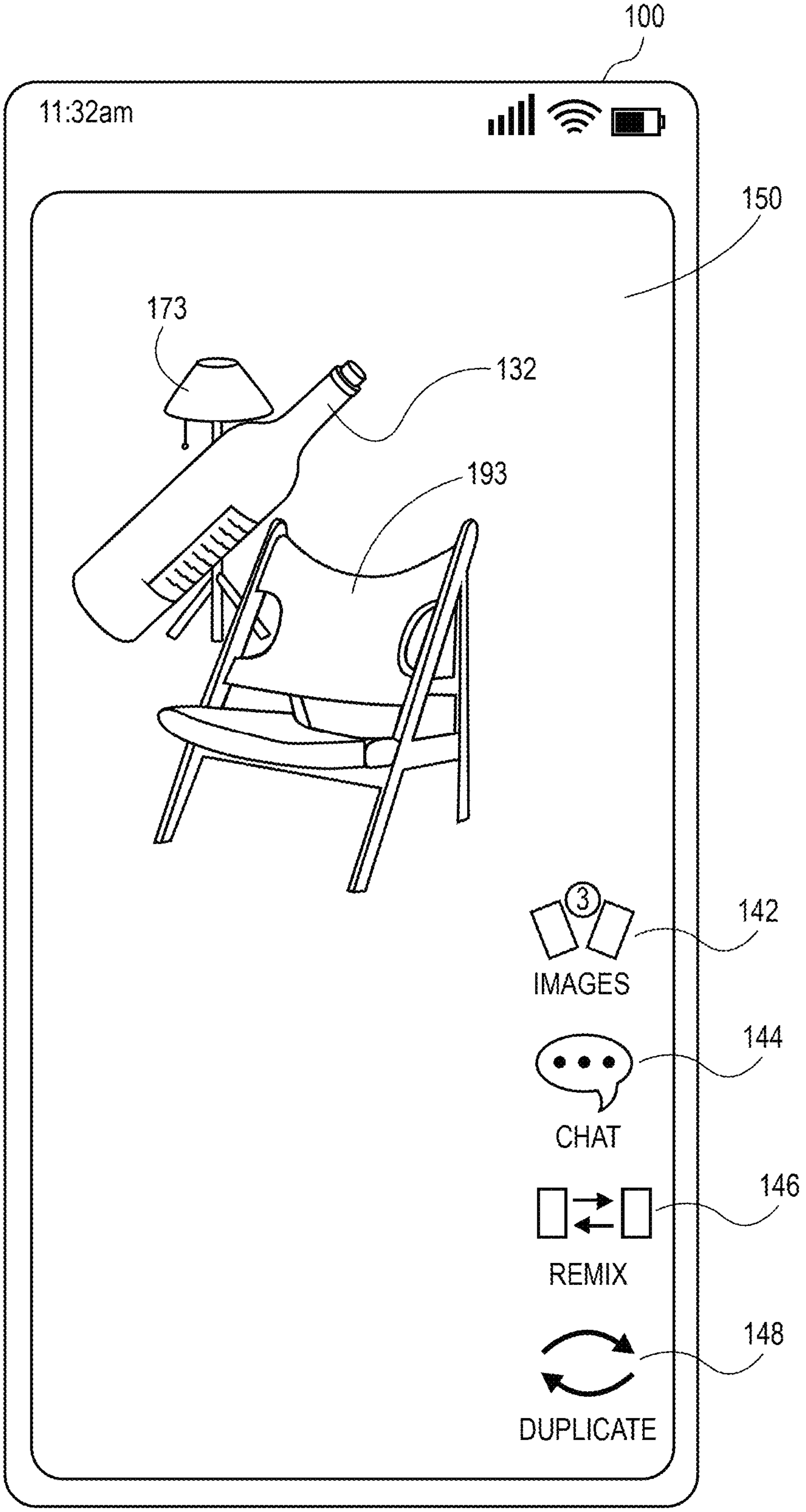

After altering the image segment, the user may select the image segment and a third extracted image segment 193 may be generated that includes the pixels of the image corresponding to the image segment 182-2 and metadata for the image segment. Likewise, the third extracted image segment 193 is presented on the collage 150 with the other extracted image segments 132 and 173, and the user may adjust the extracted image segment, as discussed. Referring now to FIG. 1M, in this example, the user has adjusted the third extracted image segment 193 to be positioned near the first extracted image segment 132 and the second extracted image segment 173, as well as in-front of the second extracted image segment 173. In addition, the image's additional information 142 now includes metadata for each of the three extracted image segments 132, 173, and 193 that may be selected and viewed by the user, or other viewers of the collage. Likewise, the image's additional information 142 now indicates that there are three extracted images included in the collage 150.

Figure 1N:
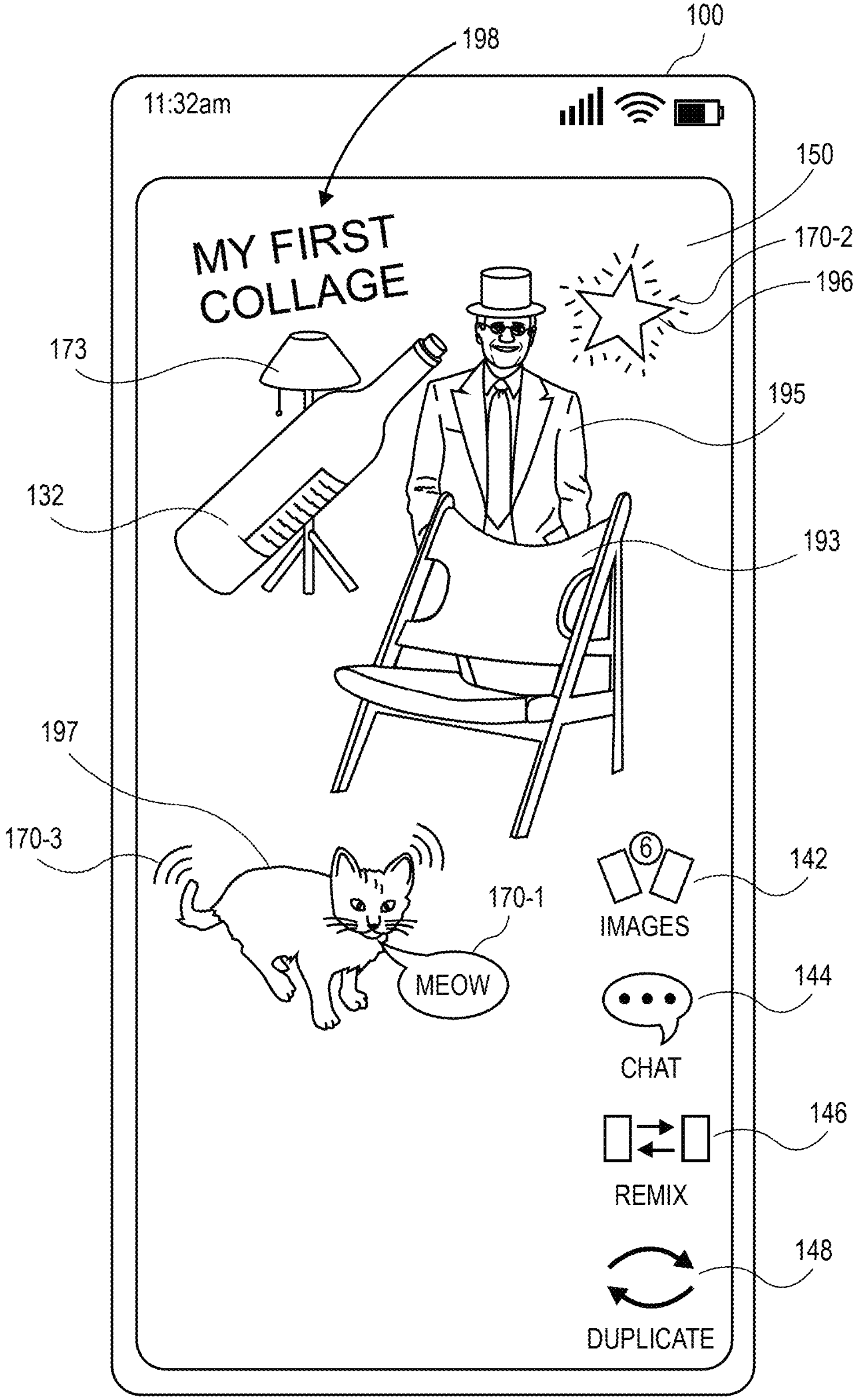

A user may go through the process of extracting image segments and including extracted images segments onto the collage 150 for any number of extracted image segments, each of which may be placed anywhere on the collage. Likewise, in some implementations, the user may draw or write on the collage and/or choose to animate one or more of the extracted image segments. Referring to FIG. 1N, illustrated is a collage that includes six extracted image segments 132, 173, 193, 195, 196, 197, and a typed note 198 ("MY FIRST COLLAGE") added by the user. Likewise, the user has selected animation 170-2 for the star extracted image segment 196 so that the star extracted image segment 196 has a flashing animation effect. Additionally, the user has added animation to the cat extracted image segment 197 that includes both movement 170-3 of the cat extracted image segment 197 and audio (e.g., "MEOW") animation 170-1. Any of a variety of forms of animation may be added to an extracted image segment included on a collage. For example, animation may include, but is not limited to, color changes, movement, flashing, sound, haptics, etc.

Figure 1O:
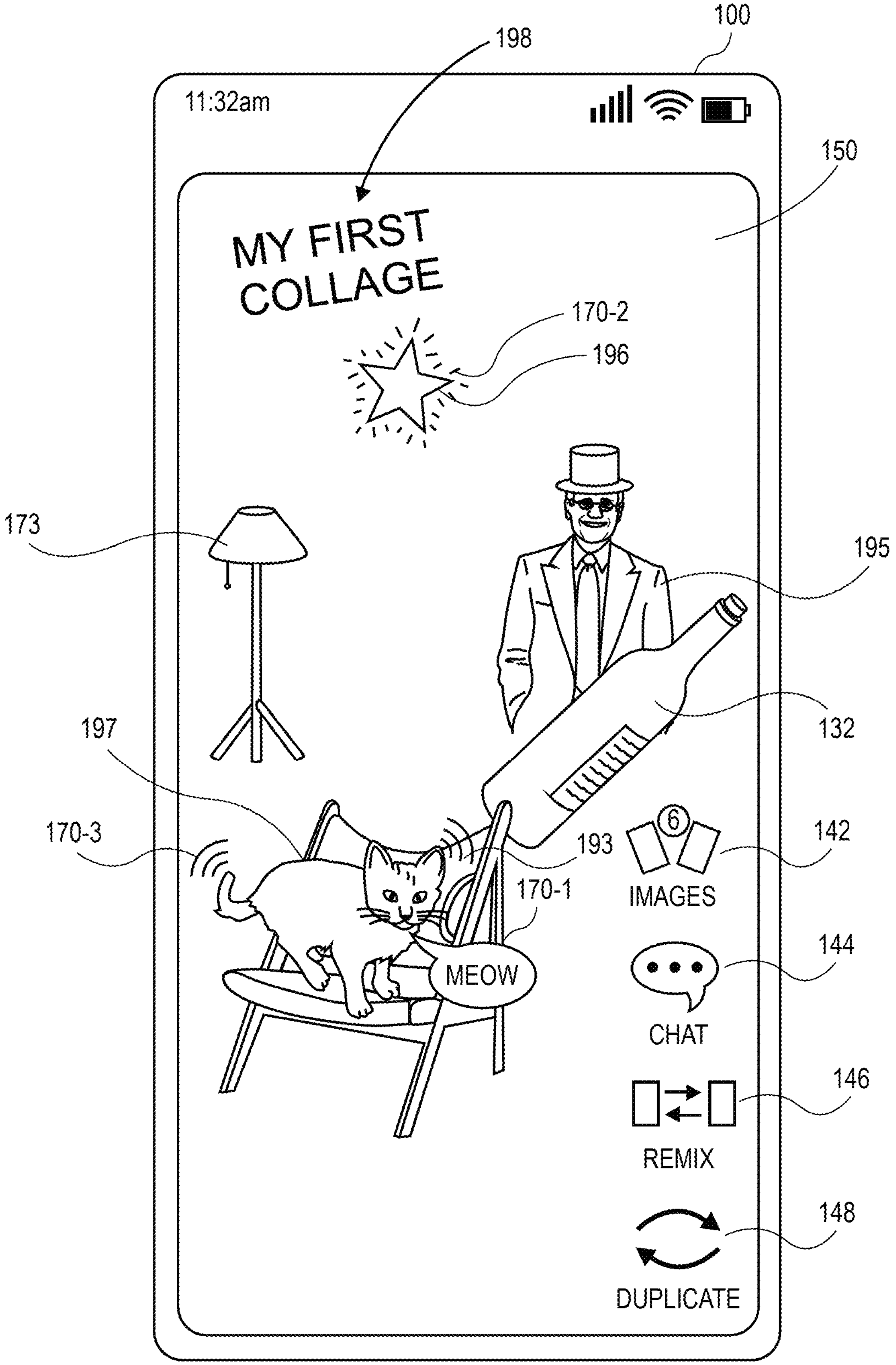

FIG. 1O is an example illustration of the collage 150 illustrated in FIG. 1N after selection of the remix control 146, in accordance with disclosed implementations.

As illustrated, in response to selection of the remix control 146, the position of the extracted image segments 132, 173, 193, 195, 196, 197 on the collage and with respect to each other having been re-arranged or remixed. In some implementations, the rearrangement or remixing of the extracted image segments may be random. In other implementations, rearrangement may be based on, for example, a popularity of the extracted images segments, user preference, cross-pattern configuration, layout, etc.

Figure 2:
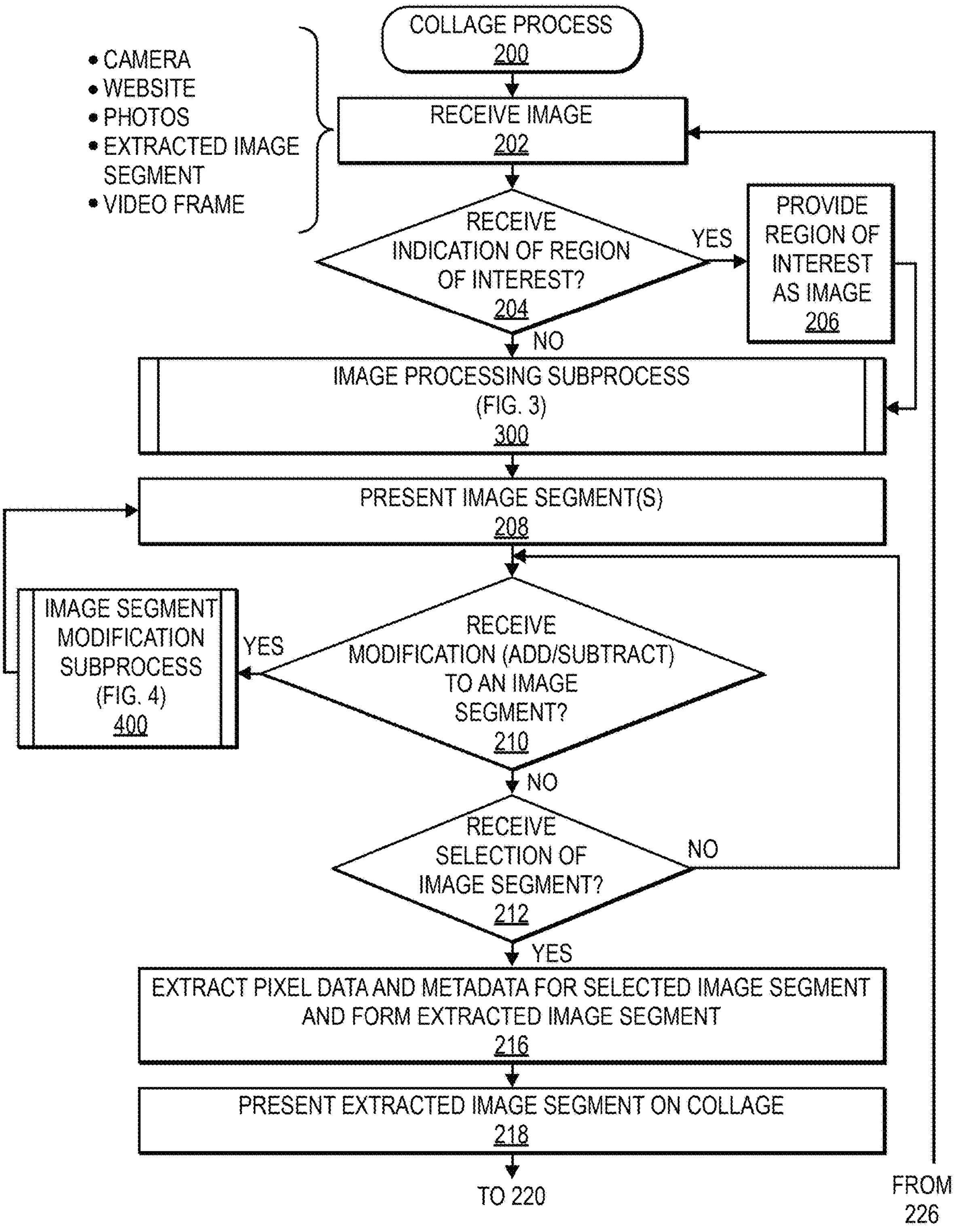
Figure 2:
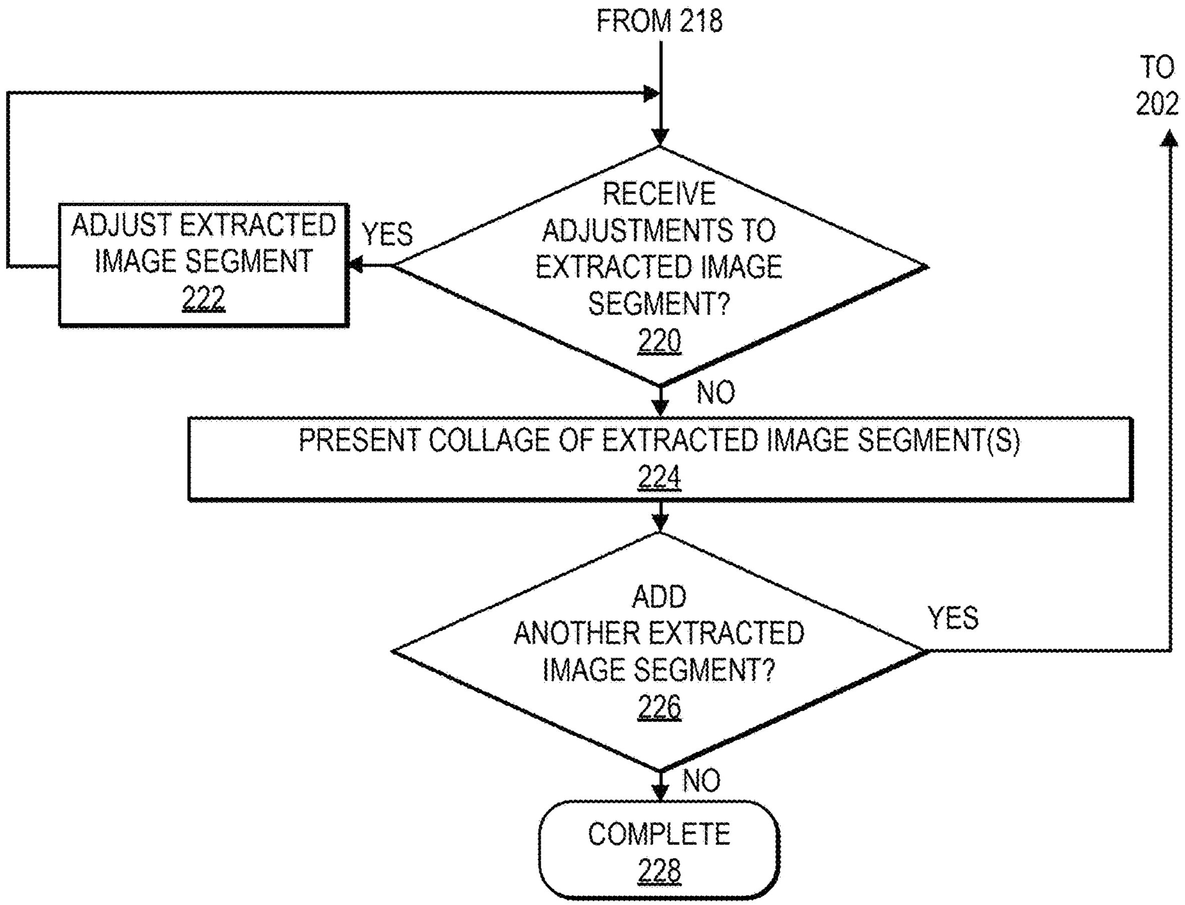

FIG. 2 is an example collage process 200, in accordance with disclosed implementations.

The example process 200 begins upon receipt of an image, as in 202. As discussed above, the image can be from any source such as a camera or other imaging element, from a website, from photos stored in a memory of a user device or stored in memory that is accessible by the user device (local or remote), a video frame from a video, etc. Likewise, in some implementations, the image received by the example process may already be an extracted image segment. For example, in some implementations, the popularity or frequency of extracted image segments used on other collages by the same or other users may be monitored and popular or trending extracted image segments presented to a user for selection and inclusion in the collage. Alternatively, or in addition thereto, and as another example, existing extracted image segments that are similar to other extracted image segments included in a collage by a user and/or that are determined to be of potential interest to the user may be presented and/or selected by the user as the image.

A determination may then be made as to whether a region of interest is indicated by the user, as in 204. For example, in addition to receiving an image, a user may indicate, for example, through interaction with the image, a region or portion of the image that is of interest to the user. If it is determined that a region of interest is indicated, the portion of the image included in the indicated region of interest is provided as the image, as in 206. If it is determined that a region of interest is not provided, or after providing the portion of the image included in an indicated region of interest as the image, the example image processing subprocess 300 is performed on the image, as in 300. The example image processing subprocess 300 is discussed in more detail below with respect to FIG. 3. As discussed below, the image processing subprocess 300 generates and returns one or more image segments of an image, each image segment corresponding to an object represented in the image. In some implementations, the image processing subprocess 300 may be performed independent of the example process 200 such that image segments are already determined for and associated with an image. In such an example, upon receipt of the image, the image segments already determined for the image may be utilized without again processing the image with the image processing subprocess.

One or more of the image segments returned by the image processing subprocess may then be presented to a user, such that the image segment(s) are distinguished from the rest of the image, as in 208. An example of a presentation of an image segment such that the image segment is distinguished from other portions of the image is illustrated in FIGS. 1B, IF, 1K, and 1L, and discussed above. In some implementations, all image segments determined for an image may be presented to the user as distinguished from other portions of the image. In other examples, only a subset (e.g., 3-5) of the image segments determined for an image may be presented to the user as distinguished from other portions of the image. In still other examples, only a single image segment, such as a primary or central image segment of the image, may be presented to the user as distinguished from other portions of the image.

After presenting the image segment(s), a determination is made as to whether a modification to a presented image segment has been received, as in 210. As discussed above with respect to FIGS. 1F, 1K, and 1L, a user may interact with an image segment to modify to the image segment to include/exclude pixels from the image segment. For example, if initial processing of the image inaccurately included/excluded a portion of an object represented in an image segment, a user may interact with the image segment to adjust the pixels included/excluded from the image segment such that the image segment corresponds to the object of the image segment.

Figure 4:
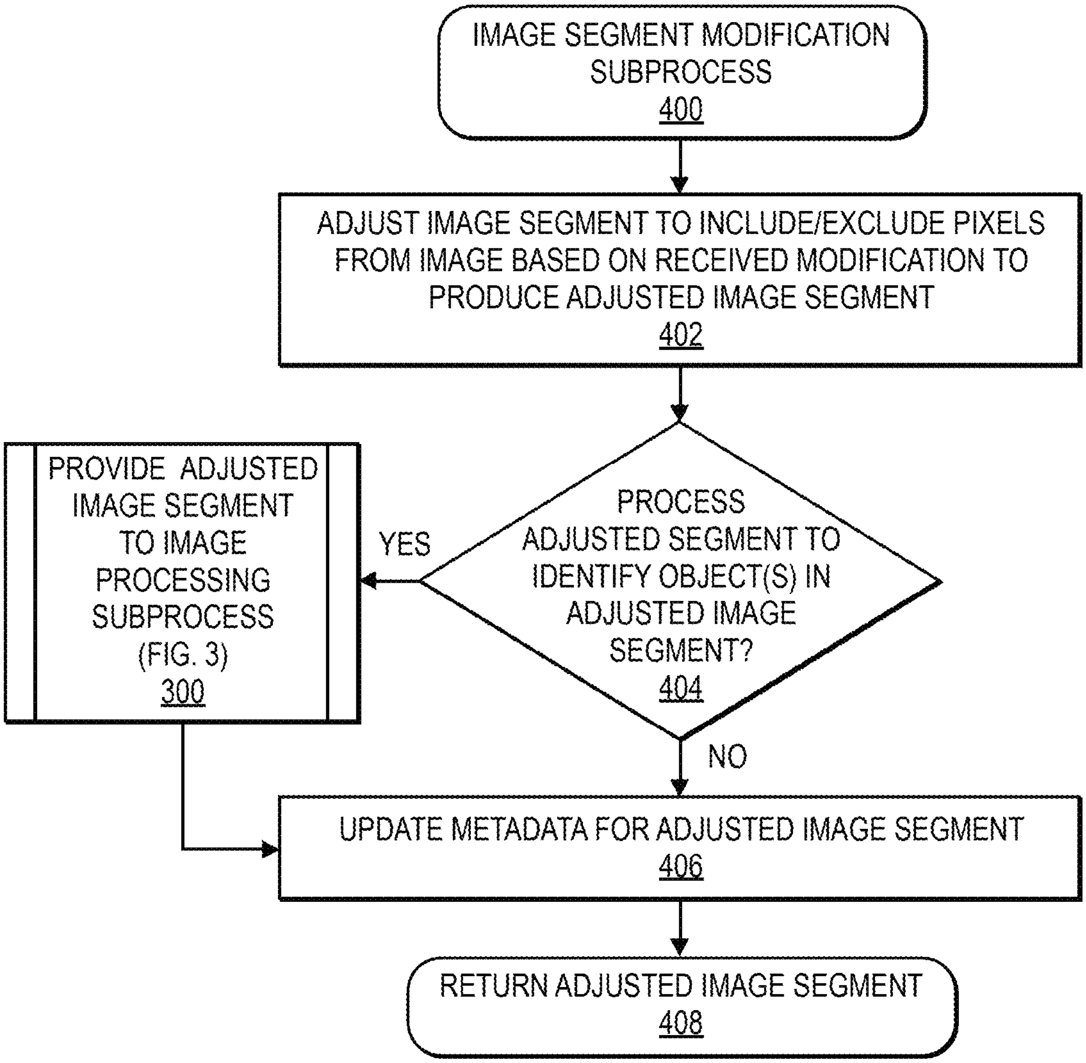

If it is determined that a modification to the image segment is received, the example image segment modification subprocess may be performed, as in 400 (FIG. 4). The example image segment modification subprocess 400 is discussed further below with respect to FIG. 4. Upon completion of the image segment modification subprocess 400, the example process 200 returns to block 208 and continues.

If it is determined that a modification to an image segment is not received, a determination is made as to whether a selection of an image segment of the image has been received, as in 212. If a selection of an image segment has not been received, the example process 200 returns to block 210 and continues. If a selection of an image segment is received, pixel data of the selected image segment and corresponding metadata are extracted and used to create an extracted image segment for the selected image segment, as in 216. As discussed above, the metadata may include, but is not limited to, an indication of the image from which the image segment was extracted, the location of the image from which the image segment was extracted, a link to a website from which the object represented by the extracted image segment can be purchased or obtained, additional information about the object, reviews of the object, a link to a second collage from which the image or the extracted image segment was obtained, a popularity of the extracted image segment, an indication of a user that created the extracted image segment, etc. The metadata included in the extracted image segment may be used for attribution information with respect to the extracted image segment, to enable purchase of the object represented in the extracted image segment, etc.

The extracted image segment may also be presented on a collage, as in 218. If this is the first extracted image segment of the collage, the extracted image segment may be presented on a blank collage. If other extracted image segments are already included on the collage, the extracted image segment may be initially presented in the center of the collage such that the user can adjust the size, orientation, position, etc., of the image in the collage.

After presenting the extracted image segment on the collage, a determination is made as to whether any adjustments to the extracted image segment have been received, as in 220. Adjustments may include, for example, adjustments to the size, position, orientation, and/or rotation of the extracted image segment, and/or animation of the extracted image segment.

If it is determined that an adjustment to the extracted image segment has been received, the extracted image segment is adjusted in accordance with the received adjustment, as in 222. After adjusting the extracted image segment, the example process 200 returns to decision block 220 and continues. If it is determined that an adjustment to the extracted image segment has not been received, the collage of extracted image segments is presented, as in 224, and a determination is made as to whether another extracted image segment is to be added to the collage, as in 226. As discussed, any number of extracted image segments may be added to a collage. If it is determined that another extracted image segment is to be added to the collage, the example process 200 returns to block 202 and continues with receipt of another image. If it is determined that another extracted image segment is not to be added to the collage, the example process 200 completes, as in 228.

Figure 3:
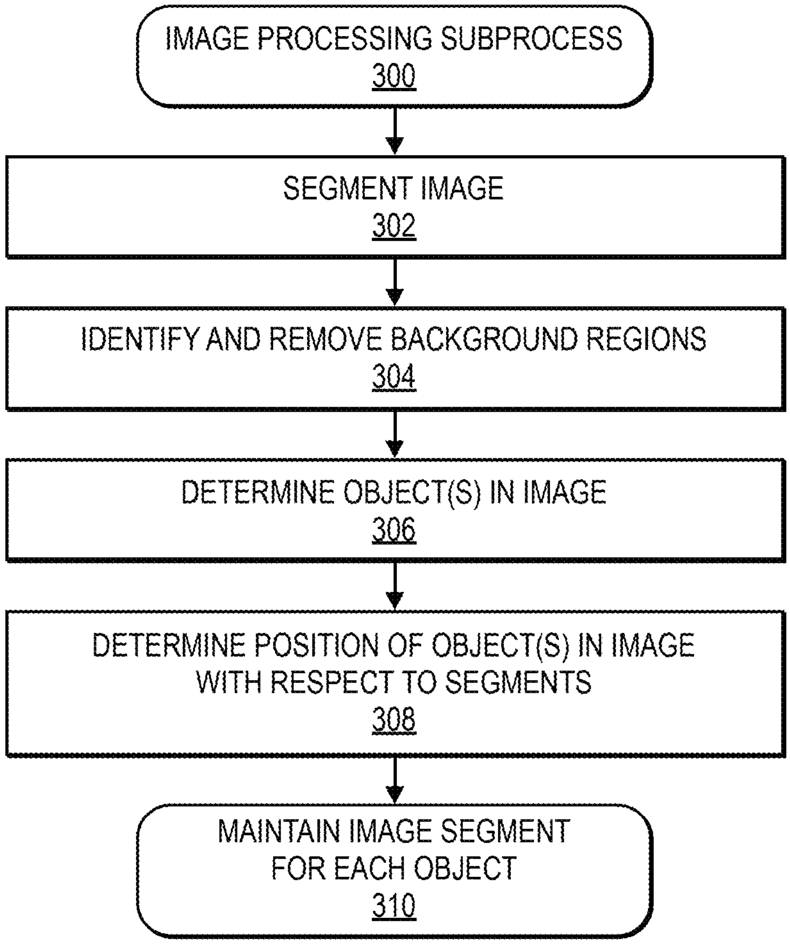

FIG. 3 is an example image processing subprocess 300, in accordance with disclosed implementations.

The example subprocess 300 begins by segmenting an image, in 302. Any variety of segmentation techniques, such as circle packing algorithm, super-pixels, etc., may be used. The segments may then be processed to remove background portions of the image from consideration, in 304. Determining background segments may be done, for example, using a combination of attentive constraints (e.g., salient objects are likely to be at the center of the image) and unique constraints (e.g., salient objects are likely to be different from the background). In one implementation, for each segment ($S_i$), a unique constraint may be computed using a combination of color, texture, shape and/or other feature detection. The pairwise Euclidian distances for all pairs of segments: $L2(S_i, S_j)$ may also be computed for $\forall S_i \in S$, $\forall S_j \in S$. The unique constraint U for segment $S_i$, or $U_i$, may be computed as $U_i = \Sigma_j L2(S_i, S_j)$. The attentive constraint for each Segment $S_i$ may be computed as $A = [X(s) - X']^2 + [Y(s) - Y']^2$, where X' and Y' are the center coordinates of the image.

One or more of the segments S', a subset of S, may then be selected such that $U(s) - A(s) > 1$, where t is a threshold set manually or learned from the data. The threshold t may be any defined number or amount utilized to distinguish segments as background information or potential objects. Alternatively, Similarity($s'_i \in S', r_i \in R-$) and Similarity ($s'_i \in S'$, $r_i \in R+$), where $s'_i$ is an element of S' and $r_i$ is an element R−, and R− is a set of image non-salient regions (background), may be computed and used as the similarity between each segment to a labelled database of labelled salient segments and non-salient segments.

Returning to FIG. 3, upon removing the background segments, the objects remaining in the image are determined, in 306. Objects remaining in the image may be determined, for example, by using a sliding window approach to compute the score of each possible hypothesis of the location of the object. Using approaches such as boosted selection of Haar-like wavelets, or multiple-parts based models, each segment may be processed to determine potentially matching objects. For example, an image vector may be determined for a segment and compared to information stored for objects. Based on the image vector and the stored information, a determination may be made as to how similar the image vector is to the stored information for particular objects.

The DNN may perform a sliding window approach N times, each with a different trained object classifier (e.g., person, bag, shoes, face, arms, etc.). After determining a hypothesis for each object classifier, the output is a set of best hypotheses for each object class. Because objects do not generally appear randomly in images (e.g., eyes and noses typically appear together), position-sensitive constraints may also be considered. For example, positions of the root object (e.g., person) may be defined as W(root) and each geometric constraint for each object k may be denoted with respect to each other as $\lambda_{\vec{k}}(O)$, a 6-element vector. The geometric "fit" of each landmark $W_{oi}$ with respect to the root object $W_{root}$ may be defined by $Ł(\vec{\lambda}(i)(W_o)*\Theta)$, $\Theta_i = [dy, dx^2, dy^2, dxdy, z]$, where dx, dy are the average geometric distance between each pixel in the object box $W_{oi}$ and each pixel in the root object box. The problem of finding optimal $\lambda_{\vec{k}}$ can be formulated as, arg $\min \lambda_i Ł(\vec{\lambda}(i)*D_{train}(\Theta_i)$ where $D_{train}(\Theta_i)$ is the observed value of $\Theta_i$ in training images.

To optimize this function, the location of the objects in the image may be determined, in 308. For example, the center of a root object (e.g., person) in the image is marked as (0, 0), and the location of other objects in the processed images is shifted with respect to the root object. A linear-Support Vector Machine (SVM) is then applied with; as parameters. The input to the SVM is $D_{train}(\Theta_i)$. Other optimizing approaches, such as linear programming, dynamic programming, convex optimizations, and the like, may also be used alone or in combination with the optimization discussed herein. The training data $D_{train}(\Theta_k)$, can be collected by having users place a bounding box on top of both the entire object and the landmarks. Alternatively, semi-automated approaches, such as facial detection algorithms, edge detection algorithms, etc., may be utilized to identify objects. In some implementations, other shapes, such as ovals, ellipses, and/or irregular shapes may be used to represent objects.

Finally, image segments for each detected object are maintained, as in 310. As will be appreciated, the example subprocess 300 of processing images may be performed by a trained DNN that processes an image to generate image segments corresponding to objects represented in the image. For example, a DNN such as a convolution neural network may be trained, for example using labeled and/or unlabeled data, to process an input image and output one or more image segments of the image corresponding to objects detected in the image. Likewise, as discussed further below, as image segments are adjusted by users, those adjusted image segments and corresponding images may be utilized as additional labeled training data to continue training the DNN, thereby further improving the accuracy of the DNN based on user provided inputs.

FIG. 4 is an example image segment modification subprocess 400, in accordance with disclosed implementations.

The example process 400 begins by adjusting the image segment based on user input, such as through a touch-based display, to include and/or exclude pixels from the image, thereby generating an adjusted image segment, as in 402. For example, as discussed above with respect to FIGS. 1K and 1L, a user may interact with the disclosed implementations to add pixels to an image segment, remove pixels from the image segment originally determined and presented to the user, and/or remove an object from the image by replacing pixel values using an in-fill or in-painting process. For example, as illustrated in FIGS. 1K and 1L, the originally determined image segment 182-2 for the chair excluded pixels of the image that represent the rear leg 183-3 of the chair. Likewise, the original image segment included pixels of the image corresponding to the space 182-4 between the seat of the chair and the back of the chair. A user may interact with the presentation of the image to include pixels corresponding to the rear leg 182-3 of the chair in the image segment 182-2 and exclude pixels corresponding to the space 182-4 between the back of the chair and the seat of the chair.

A determination may then be made as to whether the adjusted segment is to be again processed to identify object (s) included in the adjusted image segment, as in 404. If it is determined that the adjusted image segment is to be processed to determine the object included in the adjusted image segment, the example image processing subprocess 300 discussed above with respect to FIG. 3 is performed with the adjusted image segment.

After processing the adjusted image segment, or if it is determined that the adjusted image segment is not to be again processed, metadata for the adjusted image segment is updated to include/exclude an indication of the pixels to/from the metadata, as in 406. Likewise, if the image is processed again, information resultant from the example process 300 may be updated in the metadata for the image segment. Finally, the adjusted image segment, or data corresponding to the adjusted image segment is returned, as in 408.

Figure 5:
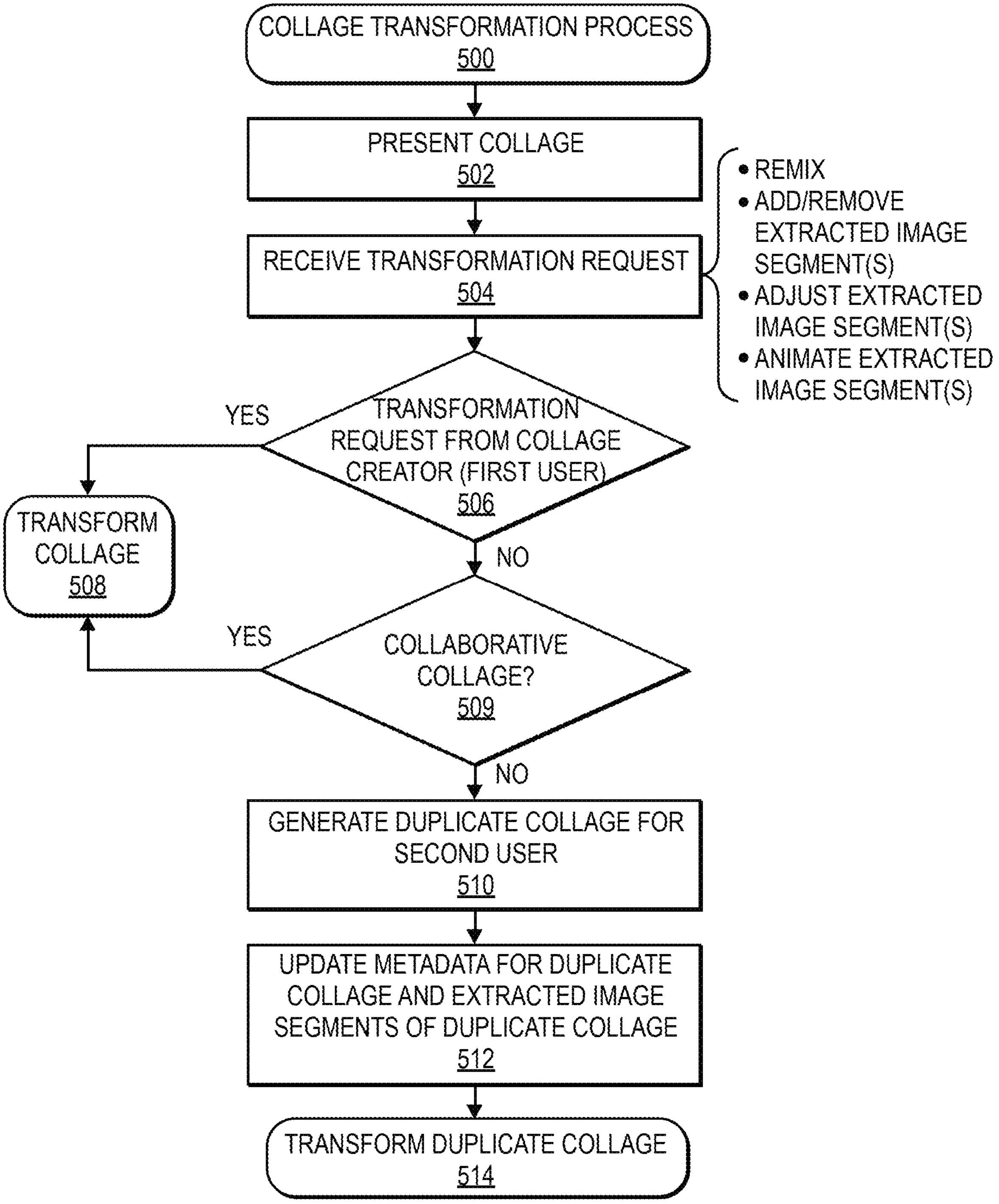

FIG. 5 is an example collage transformation process 500, in accordance with disclosed implementations.

The example collage transformation process 500 begins by presenting a collage that includes one or more extracted image segments, as in 502. For example, a collage, such as the collage 150 illustrated and discussed above with respect to FIG. 1N, which includes six image segments and a text input, may be presented to a user. In some implementations, a collage may be designed as private, such that only the user that created the collage may view and/or transfer the collage. In other implementations, the user may designate the collage as collaborative and invite other users to view and/or collaborate on the collage. Collaboration between users and a collage may be in real-time or near real-time such that each of the users collaborating on the collage can see changes to the collage and/or chat about the collage/changes to the collage. In other examples, collaboration may be incremental such that a second user may transform the collage and the first user may later view the collage and see the changes made by the second user.

In still other examples, the user may make the collage public, such that any user may view the collage. A collaborative collage is a collage in which an invited user, or if allowed by the collage creator, any other users other than the creator of the collage, may modify the collage.

After presenting the collage, a transformation request to transform one or more aspects of the collage may be received, as in 504. A transformation request may be any input to transform one or more aspects of the collage, such as an extracted image segment of the collage. For example, a transformation request may include, but is not limited to, a request to remix the visual placement and presentation of the extracted image segments of the collage, a request to add an extracted image segment to the collage, a request to remove an extracted image segment from the collage, a request to adjust a size, shape, and/or position of an extracted image segment of the collage, a request to add, remove, or change an animation of an extracted image segment of the collage, etc.

In response to receiving the transformation request, a determination is made as to whether the transformation request is from the creator of the collage (a first user), as in 506. For example, a user identifier or user identifier that is associated with an application executing on a user device that is used to create the collage may be indicated as the creator of the collage. If the user is utilizing the same user device, another user device associated with the user, or the user account, or otherwise accessing the user account, it may be determined that the transformation request was from the creator of the collage.

If it is determined that the request is from the creator of the collage, the collage is transformed in accordance with the transformation request, as in 508. If it is determined that the transformation request is not from the creator of the collage, a determination is made as to whether the collage is a collaborative collage, as in 509. As noted above, the creator of a collage may indicate a collage as collaborative such that other users may transform the collage. In such an example, the collage may be transformed by the user and/or other users and those transformations to the collage may be presented to the user and/or the other users. If it is determined that the collage is a collaborative collage, the collage is transformed in accordance with the transformation request, as in 508. In some implementations, the user may specify which other users may transform the collage, such that the collage is only considered a collaborative collage for those specific users. For any other user that submits a transformation request to the collage, a duplicate collage may be generated, as discussed below, for which the transformation request may be applied such that the transformation does not impact the collage generated by the user.

If it is determined that the collage is not a collaborative collage or not a collaborative collage for the user that submitted the transformation request, a duplicate collage is generated for the other user, referred to herein as a second user, as in 510. A duplicate collage may include the same extracted image segments in the same position, orientation, size, etc., as the collage, such that the user transforming the collage cannot determine the difference between the duplicate collage and the collage. However, the metadata of the collage and each extracted image segment may be updated to indicate that the collage is a duplicate collage and include information, a link, and/or other reference to the collage from which the duplicate was generated, as in 512. Likewise, the metadata of each extracted image segment may be updated to indicate the original collage as a source of the extracted image segment. Such information may be in addition to any source information already included in the metadata for the original collage and/or the extracted image segments.

Finally, the duplicate collage may be transformed in accordance with the received transformation request, as in 514. The duplicate collage becomes another collage maintained by the system, the second user is identified as the creator of the duplicate collage, and there is a link or other reference maintained between the duplicate collage, the original collage, as well as any other source information for extracted image segments included in the collage and/or the duplicate collage. Likewise, the second user may transform the duplicate collage without transforming the original collage. In addition, the second user may also specify the duplicate collage as a private collage, a duplicate collage, etc., just as if the second user had been the original creator of the duplicate collage.

Figure 6:
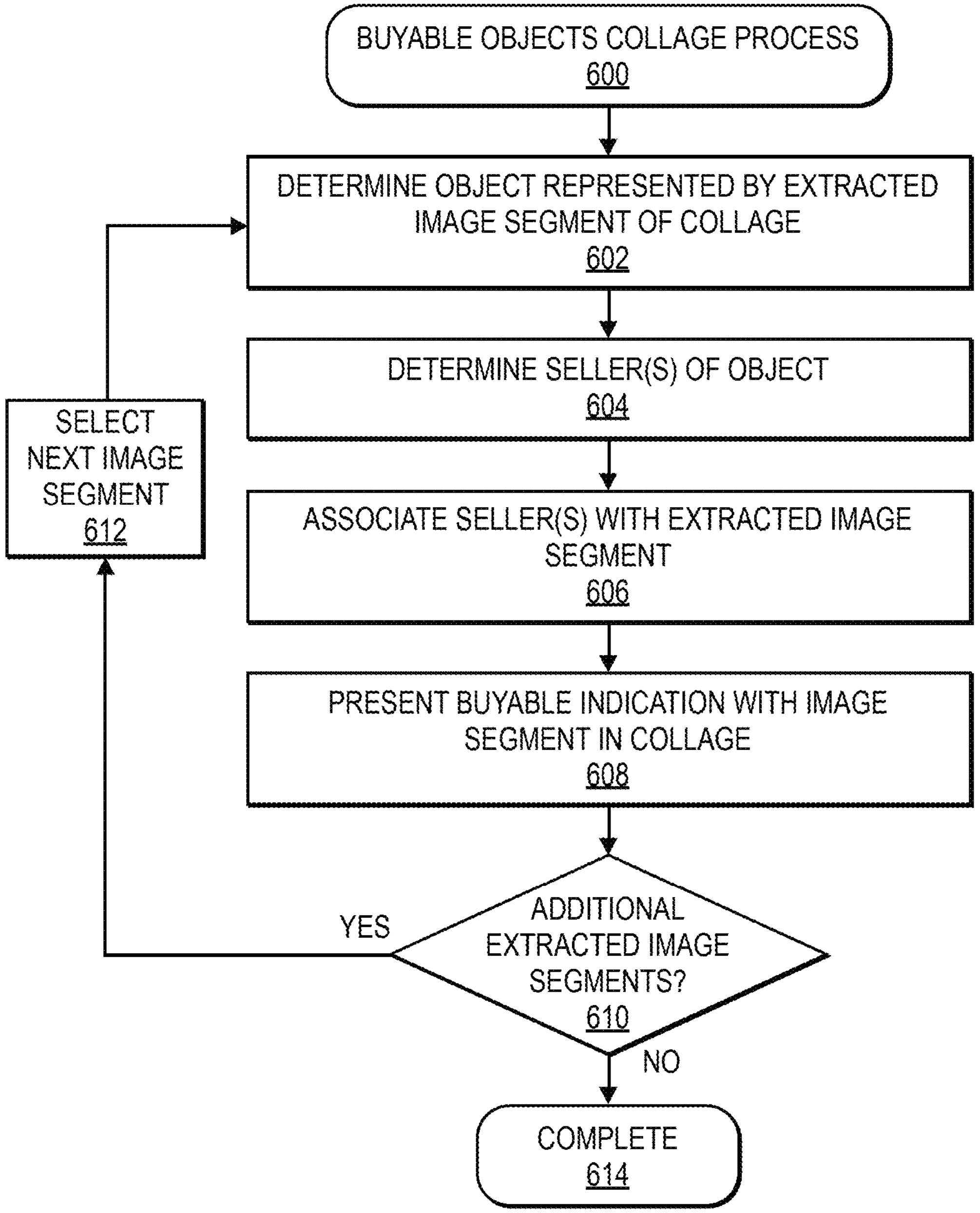

FIG. 6 is an example buyable objects collage process 600, in accordance with disclosed implementations.

The example process 600 begins by determining an object represented by an extracted image segment that is included in a collage, as in 602. For example, any of a plurality of image processing algorithms or DNNs may be utilized to process an image and detect an object, or an object type represented in the image. Alternatively, or in addition thereto, metadata about the extracted image segment may be utilized to determine an object represented in the extracted image segment. For example, if the extracted image segment is originally obtained from a website, the metadata of that extracted image segment may include an indication of the object represented in the extracted image segment.

In addition to determining the object represented in the extracted image segment, one or more sellers of the object may be determined, as in 604. For example, if the extracted image segment was originally obtained from a website, such as an e-commerce website, metadata of the extracted image segment may indicate the seller of the object. In other examples, sellers of objects may provide information, such as catalogs indicating objects offered for sale by that seller. In still other examples, websites of sellers may be processed to determine objects offered for sale by those sellers, and that information used to determine one or more sellers of the object represented in the extracted image segment. In still another example, a seller or other user may provide an indication of the seller of the object represented in the image segment.

Each determined seller may then be associated with the extracted image segment, as in 606. For example, if the seller corresponds to an e-commerce website, a detail page for the object may be associated with the extracted image segment, thereby indicating the seller of the object.

Figure 7A:
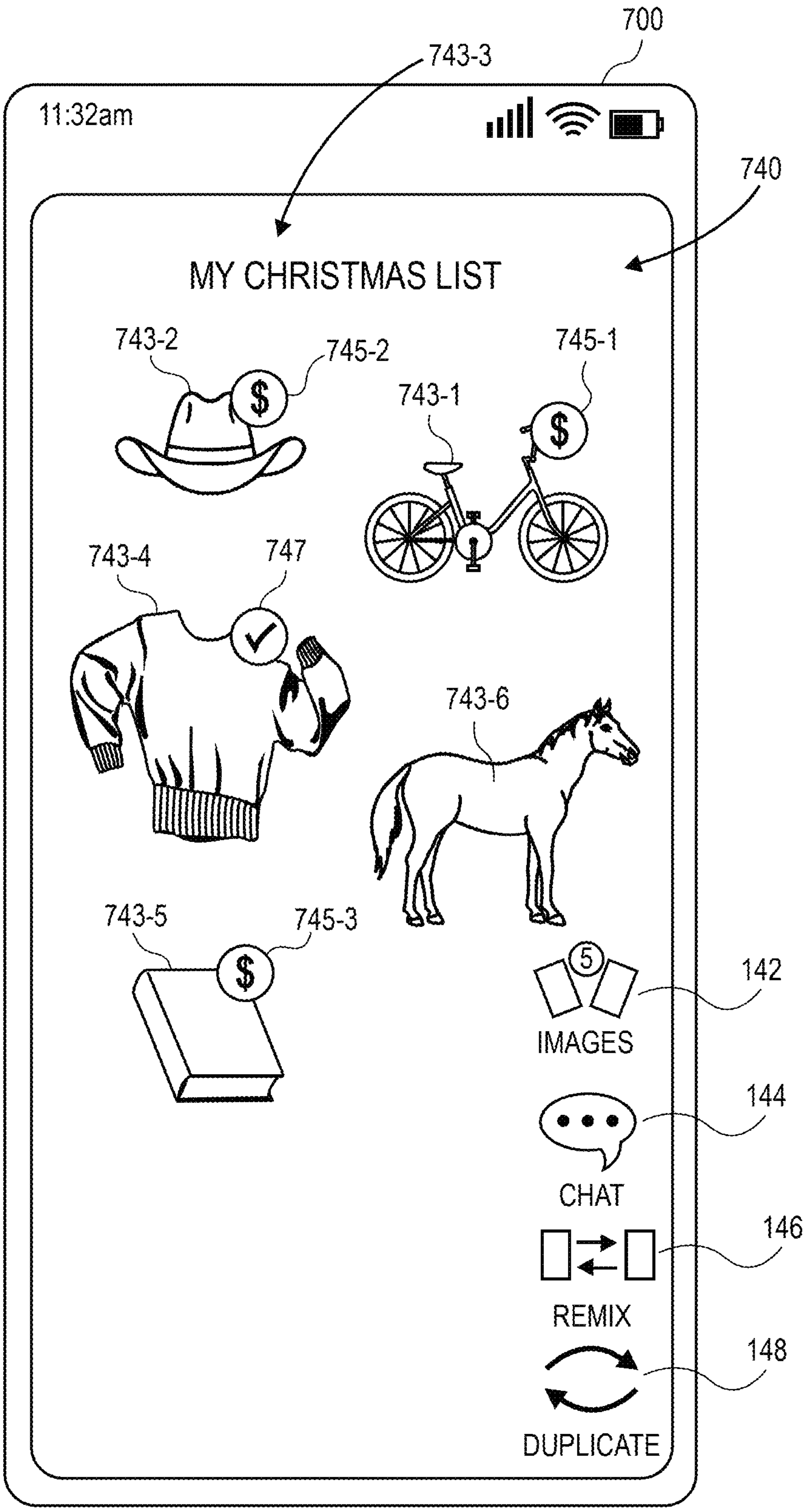
FIG. 7A is an example buyable objects collage, in accordance with disclosed implementations.

In response to determining one or more sellers of the object represented in the image segment, a buyable indication may be presented with the extracted image segment as part of the collage, as in 608. For example, FIG. 7A is an illustration of a collage 740 presented on a user device 700 that includes buyable indicators, in accordance with the disclosed implementations. In this example, the collage 740 includes five extracted image segments 743-1, 743-2, 743-4, 743-5, 743-6, and a typed text input 743-3 of "MY CHRISTMAS LIST." The extracted image segments of the collage 740 may be processed by the example process 600 and a determination made that extracted image segments 743-1 (bicycle), 743-2 (cowboy hat), and 743-5 (book) correspond to buyable objects. As such, a buyable indication 745-1, 745-2, and 745-3 are presented next to the respective extracted image segment. In this example, the object of a sweater that is represented by the extracted image segment 743-4 may have been previously indicated as buyable and now indicated as purchased, through presentation of the purchased indicator 747. For example, if the user that created the collage purchases an object represented by an extracted image segment, the buyable indicator for that extracted image segment may be replaced with a purchased indicator 747, indicating that the item has been purchased.

In other examples, a collage may be created by a first user and shared with other users to indicate items the first user would like to receive, such as Christmas gifts, birthday gifts, wedding gifts, etc., in accordance with the disclosed implementations. In such an example, the collage may be shared with one or more other users. The one or more other users may interact with the collage 740 and optionally purchase items corresponding to extracted image segments included in the collage. In such an example, as items are purchased or otherwise obtained, the buyable indicator may change to a purchased indicator, thereby indicating to other users that the item has already been purchased for the first user.

Returning to FIG. 6, after presenting a buyable indicator in the collage with the corresponding extracted image segment, a determination may be made as to whether another extracted image segment of the collage remains that is to be processed by the example process 600, as in 610. If it is determined that additional extracted image segments of the collage remain, a next extracted image segment is selected, as in 612, the example process 600 returns to block 602, and continues. If it is determined that no additional extracted image segments of the collage remain, the example process 600 completes, as in 614.

In some implementations, if a user selects one of the extracted image segments that are indicated as buyable, such as the extracted image segment 743-1, a buyable object detail page corresponding to the object represented by the extracted image segment may be presented.

Figure 7B:
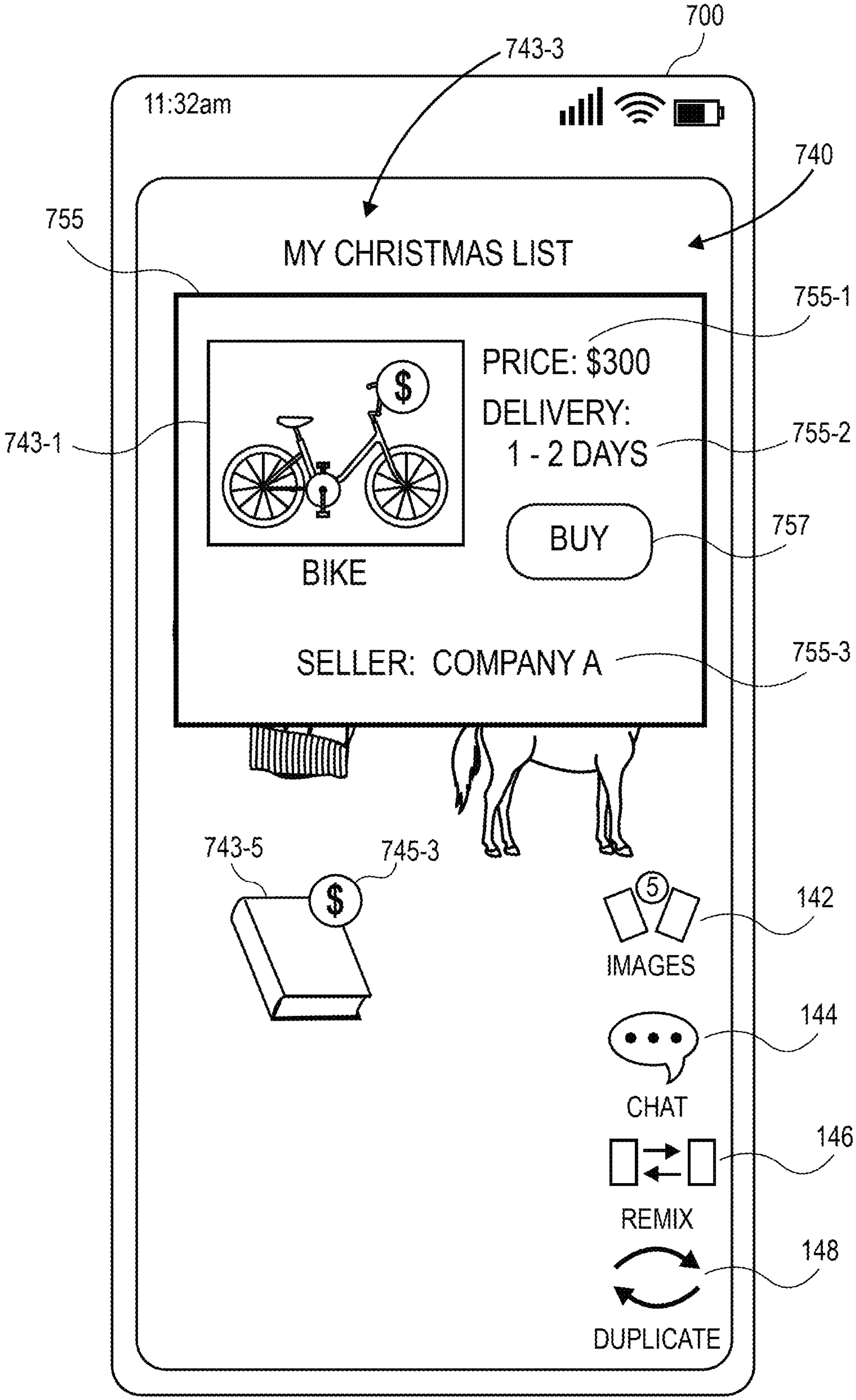
FIG. 7B is an example buyable object detail page, in accordance with disclosed implementations.

For example, FIG. 7B is an example buyable object detail page, in accordance with disclosed implementations. In particular, in response to a user selecting the extracted image segment 743-1 of the bicycle, the buyable object detail page 755 is presented that includes additional information about the object represented by the selected extracted image segment, in this example the extracted image segment 743-1. For example, the buyable object detail page 755 may include an indication of the price 755-1 of the object, a delivery timeframe 755-2 of the object when purchased, a seller 755-3 of the object, etc. Additionally, the buyable object detail page 755 may include a purchase control, such as a "Buy" button 757 that, when selected, enables a purchase of the object represented by the extracted image segment 743-1 from the seller 755-3, in this example, Company A.

Figure 8A:
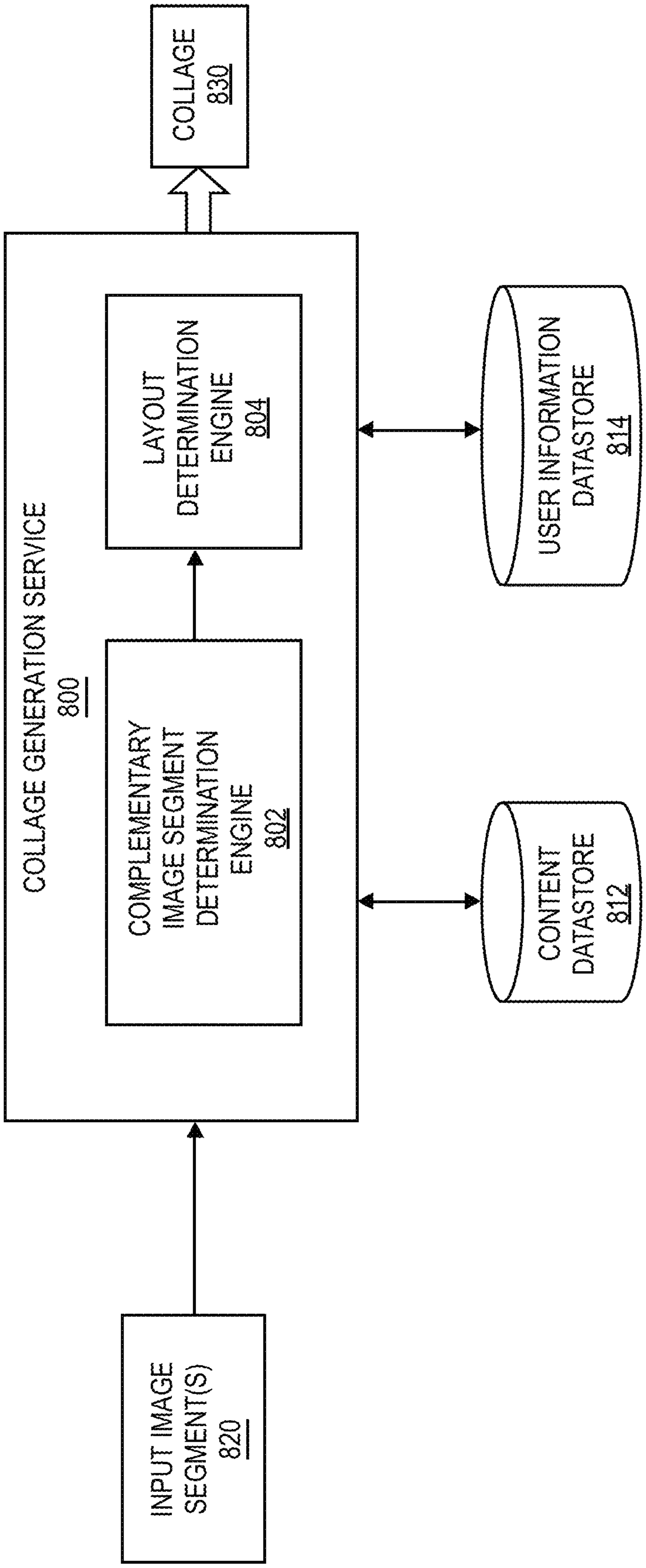
FIG. 8A is a block diagram illustrating the automated generation of a collage, according to exemplary embodiments of the present disclosure.

FIG. 8A is a block diagram illustrating the automated generation of a collage, according to exemplary embodiments of the present disclosure.

As shown in FIG. 8A, collage generation service 800 (that may be implemented as part of a social networking environment or other interactive computing environment) may receive and process one or more input image segment(s) 820 to automatically and dynamically generate collage 830 without further input from a user. According to certain aspects of the present disclosure, input image segment(s) 820 may be provided to collage generation service 800 in connection with a request for generation of a collage. The request may be an explicit request that may be indicated by a user interaction with a selection of input image segment(s) 820 via a user interface, in connection with a query, and the like. For example, in implementations where the request accompanies a query, one or more image segments may be identified as responsive to the query, and the responsive image segment(s) may be provided to collage generation service 800 as input image segment(s) 820. Alternatively and/or in addition, the request may be implicit. For example, as a user browses content items of the social networking and/or interactive computing environment that implement aspects of the present disclosure, image segments of the browsed content items may be included as input image segment(s) 820. As another example, if a user selected to view or close-up a content item from the corpus, image segments of such content items may be utilized as input image segment(s) 820 in the generation of collage 830. According to other aspects, the request may be included as part of and/or in connection with a request to access a homepage and/or a home feed, an indication that a collage is to be pushed to a user, and the like. Still further, the disclosed implementations may be utilized to generate collage 830 without an explicit or implicit request from a user.

In addition to input image segment(s), a collage category may also be provided to collage generation service 800. The collage category may specify a subject matter and/or topic of the collage that is to be generated. For example, the collage category may specify a category associated with the collage, such as women's fashion, men's fashion, beauty products, home décor, and the like. According to certain aspects of the present disclosure, collages may include image segments associated with more than one category (e.g., a compilation of fashion and home décor image segments having a similar aesthetics, etc.), and the collage category for such collages may specify more than one collage category. The collage category may be expressly specified by the user, determined based on user information (e.g., recent activity, likes, dislikes, tastes, demographic information, etc.), determined based on a category associated with input image segment(s) 820, and the like.

As illustrated, input image segment(s) 820 may be processed by complementary image segment determination engine 802 to determine one or more additional image segments that are complementary to input image segment(s)

820. In an exemplary implementation, complementary image segment determination engine 802 may employ one or more trained machine learning systems configured to identify and determine image segments from a corpus of images and/or image segments (e.g., stored and maintained in content datastore 812) that are complementary to input image segment(s) 820. Optionally, the corpus of images and/or image segments from which the complementary image segments are determined may be limited to a particular collection of images and/or image segments. For example, the corpus of images and/or image segments may be limited to images and image segments that include representations of objects or products offered by a particular brand, vendor, e-commerce platform, and the like. In an exemplary implementation, the images and/or image segments may be limited to images and/or image segments included in a catalog associated with a particular brand.

The complementary image segments may include, for example, a similar visual appearance, vibe, aesthetic, taste, feel, ambiance, etc. The determination of complementary image segments may be based, for example, on a relevance, similarity, etc. of image segments in the corpus of image segments to input image segment(s) 820. For example, each image segment (and/or each image from which each image segment was extracted) may be represented as an embedding vector, and the relevance, similarity, etc. of image segments may be based on comparisons of the corresponding embedding vectors. Exemplary implementations of the present disclosure may employ embedding vectors that are generated as described in U.S. patent application Ser. No. 16/273,939 and/or U.S. patent application Ser. No. 18/166,415, which are both hereby incorporated by reference herein in their entireties and may determine complementary objects as described in U.S. patent application Ser. No. 16/918,873, which is also hereby incorporated by reference herein in its entirety.

As shown in FIG. 8A, optionally, complementary image segment determination engine 802 may also consider user information (e.g., stored and maintained in user information datastore 814), as well as the collage category, in determining complementary image segments. For example, the stored user information that may be processed by complementary image segment determination engine 802 may include user history information (e.g., content items with which the user has interacted and/or recently interacted, as well as types of user interactions, user likes, user dislikes, user tastes, user demographic information, and the like) in determining complementary image segments that are more relevant and personalized to the particular user. Further, considering the collage category in determining the complementary image segments may also provide more relevant image segments to ensure that the complementary image segments pertain to the collage category. In some implementations, the popularity or frequency of extracted image segments used on other collages by the same or other users may be monitored and popular or trending image segments may be considered in determining the complementary image segments. According to certain aspects of the present disclosure, the image segments may also include other objects, such as design elements, logos, trademarks, and other design features. For example, in exemplary implementations where the corpus of images and/or image segments from which the complementary image segments are determined are limited to a particular collection of images and/or image segments (e.g., associated with a particular brand, vendor, e-commerce platform, catalog, etc.), design elements, such as logos, trademarks, and other design features may also be included as an image segment in generation of a collage.

In addition to identifying image segments that are complementary to input image segment(s) 820, complementary image segment determination engine 802 may be configured to filter and/or rank the identified complementary image segments to determine a subset of image segments from the identified complementary image segments for inclusion in collage 830. According to aspects of the present disclosure, the identified complementary image segments may be filtered and/or ranked based on the number of input image segment(s) 820, the collage category and/or a category associated with the input image segment(s) 820 (e.g., women's fashion, men's fashion, beauty products, home décor, etc.), the object type of the objects represented in the input image segment(s) 820 (e.g., a sofa, a coffee table, a lamp, a jacket, a dress, a shirt/sweater, an accessory, etc.), a category of the identified complementary image segments, the object type of the objects represented in the identified complementary image segments, user information, a number of image segments to be included in collage 830, recently trending and/or popular images and/or image segments, and the like.

Alternatively and/or in addition, according to another aspect of the present disclosure, rather than determining complementary image segments for the generation of a collage, collages may be generated from objects that are extracted from a scene presented in a single image/content item. For example, it may be assumed that objects appearing together in a scene in a common image/content item are complementary objects to each other. Accordingly, multiple objects may be identified and extracted from a scene presented in a single image or content item as the image segments used in the generation of a collage.

After the complementary image segments (or the image segments from a scene presented in a single image or content item) that are to be included in collage 830 have been determined, layout determination engine 804 may determine a layout of collage 830 that specifies an arrangement, organization, and/or positioning of each image segment in collage 830. In exemplary implementations, layout determination engine 804 employs various probabilistic models, rule-based models, heuristic models, trained machine learning models, and the like to determine a layout to be used to organize and arrange the image segments in collage 830.

In an exemplary implementation, layout determination engine 804 may generate and/or store and maintain a plurality of layout templates and select one of the layout templates as the layout for collage 830. Generating the various layout templates is described in further detail herein in connection with at least FIG. 8B. Each layout template may include and/or specify a collage category (e.g., women's fashion, men's fashion, accessories, beauty products, home décor, etc.), a number of image segments to be included in the collage, an object type of the objects represented in the image segments (e.g., a sofa, a coffee table, a lamp, a jacket, a dress, a shirt/sweater, an accessory, etc.) included in the collage, a position for each image segment included in the collage, and the like. Accordingly, each layout template may specify a position (e.g., in three dimensions-horizontal, vertical, and depth/layer, etc.) for each image segment (e.g., relative to the other image segments to be included in the collage, relative to device display characteristics of the user device, etc.), colors (e.g., background color, etc.), design elements (e.g., frames, stickers, emojis, etc.). For example, the collage templates associated with the women's fashion category may specify that an image segment including a representation of a sweater is partially layered on top of and arranged above an image segment including a representation of a skirt, an image segment including a representation of a pair of shoes is arranged below the image segment including the representation of the skirt, and so forth. Additionally, in connection with the selection of a color, such as a background color, for the collage, a dominant color of the image segments may be determined and a color that is complementary to the dominant color may be selected as the background color.

According to aspects of the present disclosure, the layout template may be determined based on the collage category for the collage being generated, the number of additional complementary image segments to be included in the collage, as well as the object types of the objects represented in the image segments (e.g., input image segment(s) 820 and the additional complementary image segments) to be included in the collage being generated. First, the layout templates associated with the collage category may be identified from the available layout templates. After the collage layouts having the corresponding collage category are determined, the collage layout specifying a layout most suitable based on the number of image segments and the object types of the objects represented in the image segments may be selected. Continuing an example where the collage category of the collage to be generated is women's fashion and the image segments to be included in the collage include representations of a sweater, a skirt, and a pair of shoes. A women's fashion collage layout specifying a layout that includes an arrangement and/or position information for a top, a bottom, and shoes may be selected over a women's fashion collage layout specifying a layout that includes an arrangement and/or position information of a top, a hat, and a necklace. Alternatively and/or in addition, the collage layout may be determined randomly (e.g., from all available collage layouts and/or from the collage layouts having the same collage category).

After determination of a collage layout by layout determination engine 804, collage 830 may be generated using the complementary image segments determined by complementary image segment determination engine 802 and the determined layout. Collage 830 may then be returned and/or transmitted to the user and/or presented on a user device. The user may then interact and/or modify collage 830 (e.g., rearrange and/or reposition the image segments, remove and/or add image segments, and the like), via a user interface presented on the user device.

Alternatively and/or in addition, collage 830 may be stored and maintained as a content item (e.g., as an image, a collage, an advertisement, etc. and may be stored and maintained in content datastore 812). In implementations where collage 830 is stored and maintained as a content item, collage 830 may include metadata that includes links and/or references to each image segment included in collage 830, as well as links and/or references to the images from which the image segments were extracted. Additionally, each image segment may include a link and/or a reference to a page or site associated with the object represented in the respective image segment (e.g., a catalog page from which the object may be purchased, a brand page providing more information regarding the object, etc.). Further, collages that are stored and maintained as advertisements may be dynamically and automatically deleted so as to automatically cancel poorly performing advertisements. Optionally, links and/or references to other collages that include the image segments included in collage 830 and/or image segments from the images from which the image segments included in collage 830 were extracted may also be stored and maintained in association with collage 830.

Figure 8B:
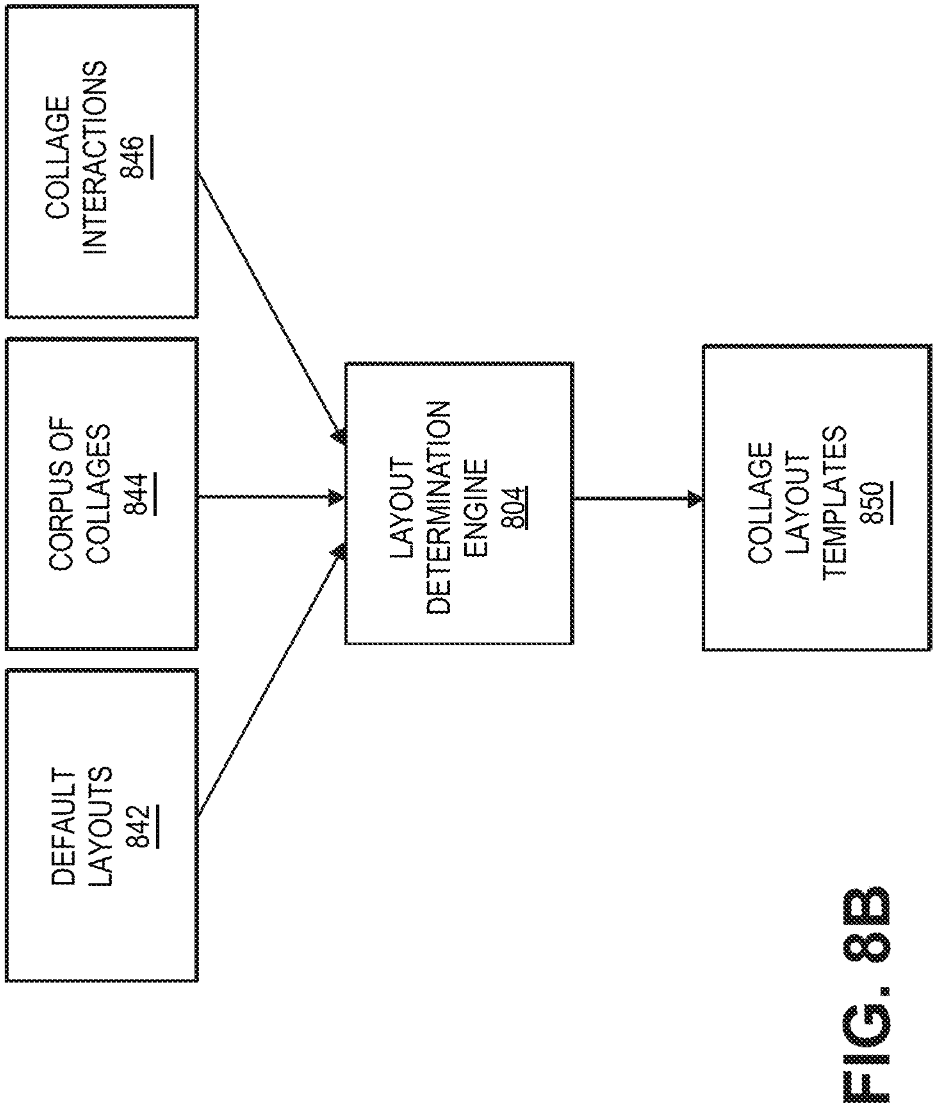
FIG. 8B is a block diagram illustrating the generation of collage layout templates, according to an exemplary embodiment of the present disclosure.

FIG. 8B is a block diagram illustrating the generation of collage layout templates, according to an exemplary embodiment of the present disclosure.

As shown in FIG. 8B, layout determination engine 804 may process various input information (e.g., default layouts 842, corpus of collages 844, and collage interactions 846) in determining collage layout templates 850. Although FIG. 8B illustrates an exemplary implementation where layout determination engine 804 determines collage layout templates 850, embodiments of the present disclosure contemplate other implementations where one or more probabilistic models, rule-based models, heuristic models, trained machine learning models, and the like that are separate and distinct from layout determination engine 804 are used to determine collage layout templates 850. Collage layout templates 850 may include a plurality of collages, where each collage template specifies a collage category, an arrangement and/or positioning of image segments, colors (e.g., background color, etc.), design elements (e.g., frames, stickers, emojis, etc.), as well as object types of objects represented in the image segments. Further, input information may also be considered and processed by layout determination engine 804 in generating collage layout templates 850.

As illustrated, inputs (e.g., default layouts 842, corpus of collages 844, and collage interactions 846) may be utilized and processed by layout determination engine 804 to generate collage layout templates 850. For example, default layouts 842 may include a plurality of default layouts where each collage layout includes an associated collage category and specifies an arrangement and/or positioning of image segments, as well as object types of objects represented in the image segments. Corpus of collages 844 may include a corpus of collages that are stored and maintained by the social networking and/or interactive computing environment that implement aspects of the present disclosure. Accordingly, corpus of collages 844 may include user generated collages, as well as automatically generated collages, and may also include associated collage categories and arrangements and/or positionings of image segments, as well as object types of objects represented in the image segments. Further, collage interactions 846 may include information related to user engagements with collages included within corpus of collages 844. This may include, for example, a frequency and/or a total number of user engagements with each corresponding collage, the types of user engagements with each corresponding collage (e.g., the collage being liked, shared, saved, etc.), and the like. It may be assumed that collages associated with greater user interactions have a more appealing and/or a more optimized layout.

Accordingly, the inputs may be processed by layout determination engine 804 to generate collage layout templates 850. For example, heuristics, rules and the like, that specify spacing, layering, arrangement, etc. of image segments associated with particular collage categories and/or object types may be determined and used to generate collage layout templates 850. In another implementation where layout determination engine 804 may employ one or more trained machine learning models, the inputs may be compiled as training data and used to train layout determination engine 804 to generate collage layout templates 850.

FIGS. 9A-9D are illustrations of representations of a graphical user interface, according to exemplary embodiments of the present disclosure.

Figure 9A:
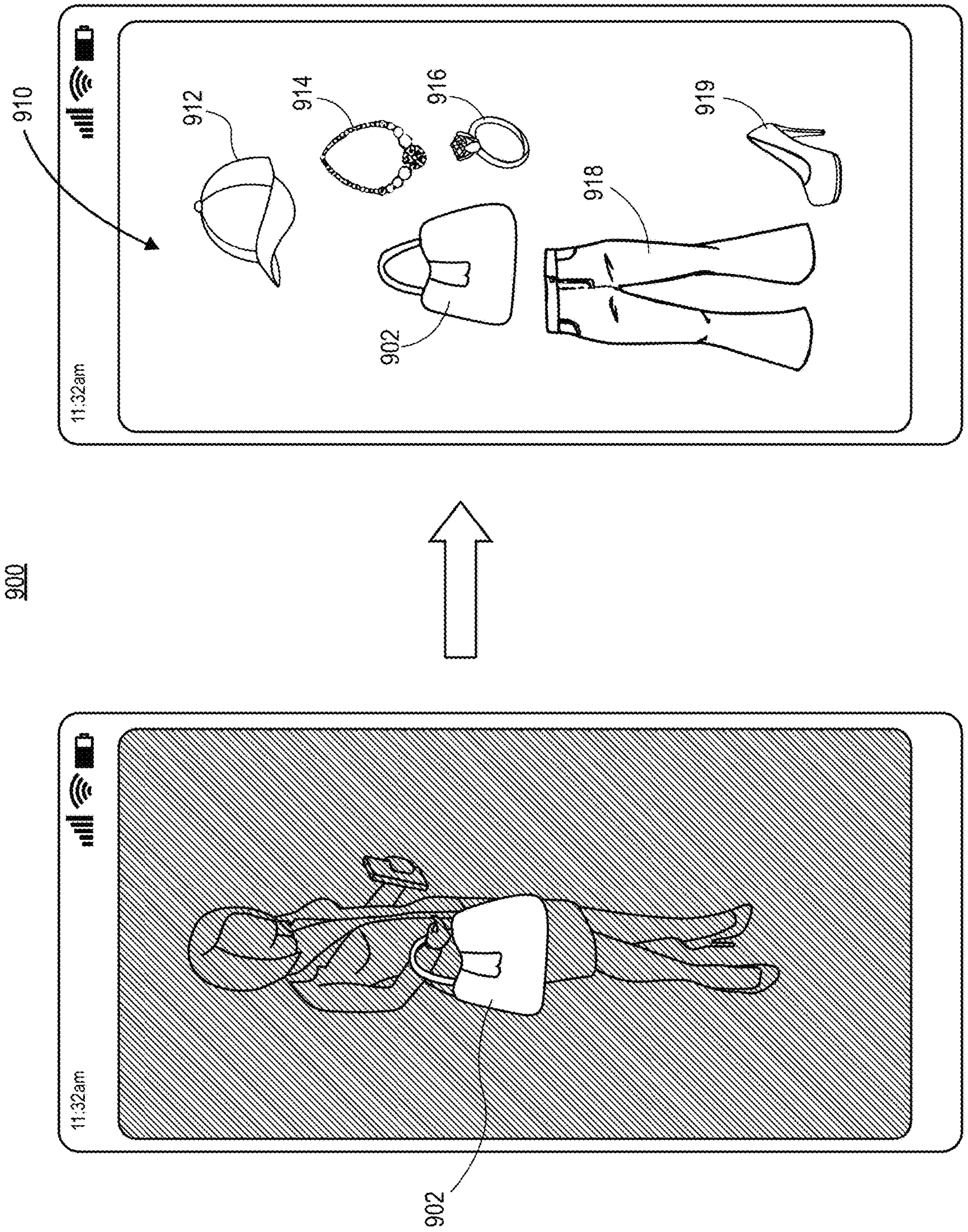
FIGS. 9A-9D are illustrations of representations of a graphical user interface, according to exemplary embodiments of the present disclosure.

FIG. 9A illustrates exemplary graphical user interfaces 900 in connection with the automated generation of collage 910, according to exemplary embodiments of the present disclosure. As shown in FIG. 9A, a user may have selected image segment 902, which includes a representation of a handbag, in connection with the automated generation of collage 910 (e.g., to initiate automated generation of a collage). According to certain aspects, image segment 902 may be received (e.g., by collage generation service 800, etc.) along with a request to generate a collage. Although FIG. 9A illustrates an implementation where a user has explicitly selected image segment 902 to initiate generation of collage 910, the present disclosure contemplates other implementations where collage 910 may be automatically generated subsequent to a response to a query (e.g., one or more image segments may be identified in response to the query and the collage may be generated based on the identified image segments, and the like).

In addition to image segment 902, a collage category may also be provided in connection with the automated generation of collage 910. For example, the collage category may be provided by a user, determined based on user information (e.g., recent activity, likes, dislikes, tastes, demographic information, etc.), determined based on image segment 902 (e.g., a category to which the object represented in image segment 902 belongs, etc.), and the like. The collage category may specify a subject matter and/or topic of collage 910 that is to be generated. In the illustrated implementation, the representation of a handbag in image segment 902 may be associated with the category of women's fashion, which may be determined as the collage category. In other implementations where the object represented in the image segment is associated with more than one category, the user's history (e.g., recent interactions, recent queries, etc.), other information (e.g., currently trending content items and/or topics, etc.) may be considered in determining the collage category.

Image segment 902 may be processed (e.g., by complementary image segment determination engine 802) to determine one or more additional image segments that are complementary to image segment 902. In an exemplary implementation, the complementary image segments may be determined by one or more trained machine learning systems configured to identify and determine image segments from a corpus of image segments that are complementary to image segment 902. In an exemplary implementation, the corpus of images and/or image segments from which the complementary image segments are determined may be limited to a particular collection of images and/or image segments (e.g., associated with a particular brand, vendor, e-commerce platform, catalog, etc.). The complementary image segments may include, for example, representations of object that have a similar visual appearance, vibe, aesthetic, taste, feel, ambiance, etc. The determination of complementary image segments may be based, for example, on a relevance, a similarity, etc. of image segments in the corpus of image segments to image segment 902. For example, each image segment (and/or each image from which each image segment was extracted) may be represented as an embedding vector, and the relevance, similarity, etc. of image segments may be based on comparisons of the corresponding embedding vectors.

Optionally, the collage category and user information may also be considered in determining the complementary image segments. For example, user information, such as user history information (e.g., content items with which the user has interacted and/or recently interacted, as well as types of user interactions, user likes, user dislikes, user tastes, user demographic information, and the like), and the like, may be processed in determining complementary image segments that are more relevant and personalized to the particular user. In some implementations, the popularity or frequency of extracted image segments used on other collages by the same or other users may be monitored and popular or trending image segments may be considered in determining the complementary image segments. Further, considering the collage category in determining the complementary image segments may also provide more relevant image segments to ensure that the complementary image segments pertain to the collage category.

In addition to identifying image segments that are complementary to image segment 902, the identified image segments may be filtered and/or ranked to determine a subset of image segments from the identified complementary image segments for inclusion in collage 910. According to aspects of the present disclosure, the identified complementary image segments may be filtered and/or ranked based on the collage category and/or a category associated with the image segment 902 (e.g., women's fashion, etc.), the object type of the objects represented in the image segment 902 (e.g., a handbag, etc.), a category of the identified complementary image segments, the object type of the objects represented in the identified complementary image segments, user information, a number of image segments to be included in the collage, recently trending and/or popular images and/or image segments, and the like. In the illustrated implementation, based on image segment 902, which includes a representation of a handbag, image segments 912, 914, 916, 918, and 919 may have been identified and selected as complementary image segments for inclusion in collage 910. In the exemplary implementation where the corpus of images and/or image segments from which the complementary image segments are determined is limited to a particular collection of images and/or image segments (e.g., associated with a particular brand, vendor, e-commerce platform, catalog, etc.), each of image segments 912, 914, 916, 918, and 919 may have been determined from the particular collection of images and/or image segments, and therefore may be associated with a particular brand, vendor, e-commerce platform, catalog, and the like.

After the complementary image segments that are to be included in collage 910 have been determined, a layout of collage 910 that specifies an arrangement, organization, and/or positioning of each image segment in collage 910 may also be determined. In exemplary implementations, the collage layout may be determined using various probabilistic models, rule-based models, heuristic models, trained machine learning models, and the like to determine a layout to be used to organize and arrange the image segments in collage 910.

In an exemplary implementation, determination of the collage layout may be based on a plurality of layout templates, one of which may be selected as the layout for collage 910. Each layout template may include and/or specify a collage category (e.g., women's fashion, men's fashion, accessories, beauty products, home décor, etc.), a number of image segments to be included in the collage, an object type of the objects represented in the image segments (e.g., a sofa, a coffee table, a lamp, a jacket, a dress, a shirt/sweater, an accessory, etc.) included in the collage, a position for each image segment included in the collage, and the like. Accordingly, each layout template may specify a position (e.g., in three dimensions-horizontal, vertical, and depth/ layer, etc.) for each image segment (e.g., relative to the other image segments to be included in the collage, relative to device display characteristics of the user device, etc.), a background color, one or more design elements (e.g., a frame, stickers, emojis, brand elements, logos, trademarks, etc.), and the like.

According to aspects of the present disclosure, the layout template may be determined based on the collage category for collage 910 being generated, the number of additional complementary image segments to be included in the collage, as well as the object types of the objects represented in the image segments (e.g., image segment 902 and the additional complementary image segments-image segments 912, 914, 916, 918, and 919) to be included in collage 910. First, the layout templates associated with the collage category may be identified from the available layout templates. After the collage layouts having the corresponding collage category are determined, the collage layout specifying a layout most suitable based on the number of image segments and the object types of the objects represented in the image segments may be selected. Accordingly, in the illustrated implementation, the selected collage layout may specify the arrangement and/or position of each of image segment 902, image segment 912, which includes a representation of a hat, image segment 914, which includes a representation of necklace, image segment 916, which includes a representation of a ring, image segment 918, which includes a representation of a pant, and image segment 919, which includes a representation of a shoe, as illustrated in FIG. 9A.

After determination of a collage layout, collage 910 may be generated using image segments 902, 912, 914, 916, 918, and 919 and the determined collage layout. Collage 910 may then be returned and/or transmitted to the user and/or presented on a user device. The user may then interact and/or modify collage 910 (e.g., rearrange and/or reposition the image segments, remove and/or add image segments, and the like), via a user interface presented on the user device.

Alternatively and/or in addition, collage 910 may be stored and maintained as a content item (e.g., as an image, a collage, an advertisement, etc.). In implementations where collage 910 is stored and maintained as a content item, collage 910 may include metadata that includes links and/or references to each of image segments 902, 912, 914, 916, 918, and 919, as well as links and/or references to the images from which image segments 902, 912, 914, 916, 918, and 919 were extracted. Additionally, each image segment may include a link and/or a reference to a page or site associated with the object represented in the respective image segment (e.g., a catalog page from which the object may be purchased, a brand page providing more information regarding the object, etc.). Further, collages that are stored and maintained as advertisements may be dynamically and automatically deleted, so as to automatically cancel poorly performing advertisements. Optionally, links and/or references to other collages that include the image segments included in collage 910 and/or image segments from the images from which the image segments included in collage 910 were extracted may also be stored and maintained in association with collage 910.

Figure 9B:
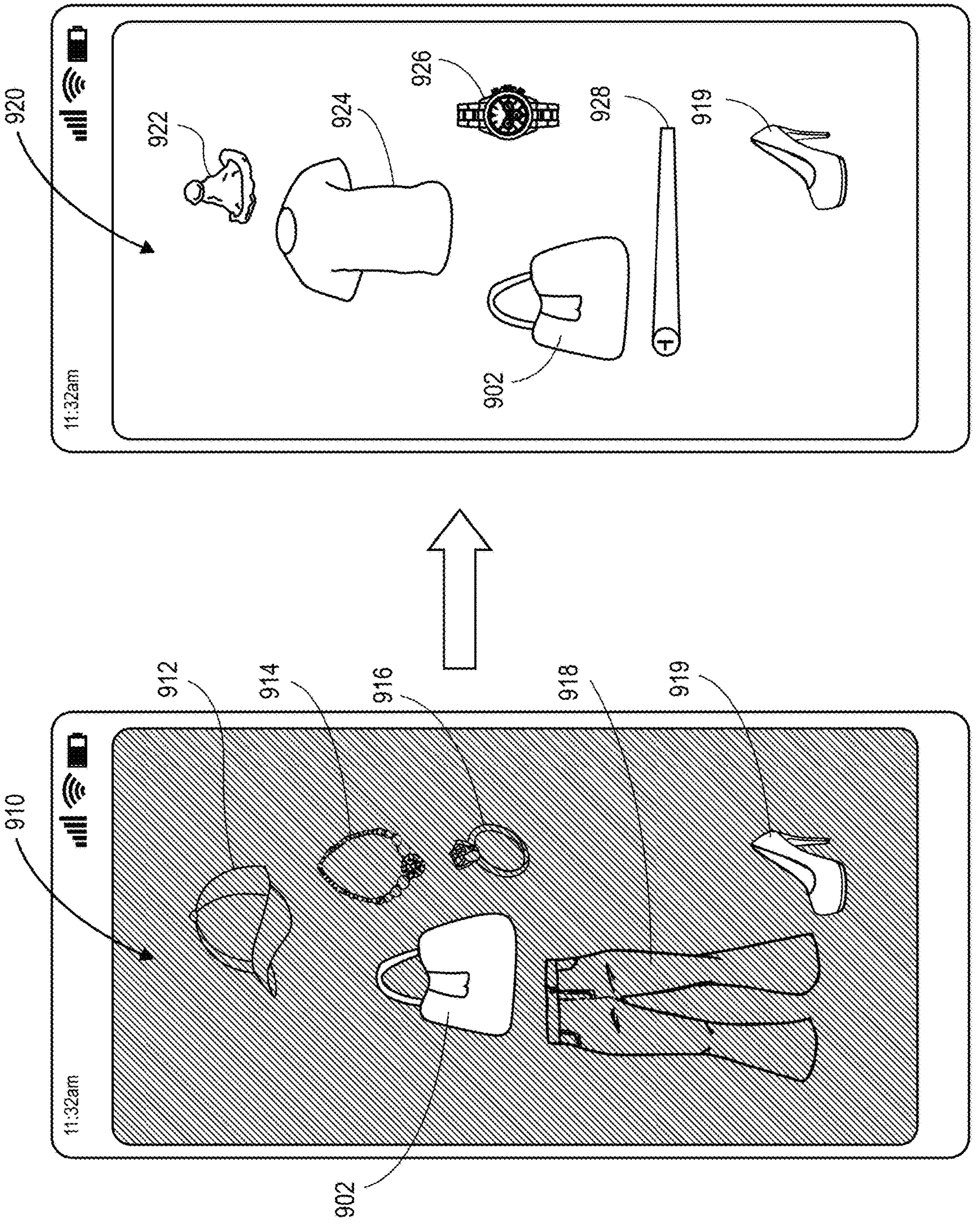

FIG. 9B illustrates exemplary graphical user interfaces in connection with the automated generation of collage 920, according to exemplary embodiments of the present disclosure. The implementation illustrated in FIG. 9B may be subsequent to the generation of collage 910 shown in FIG. 9A. For example, after generation of collage 910, the user may desire a further collage to be automatically generated based on one or more image segments included in collage 910. As shown in FIG. 9B, a user may have selected image segment 902, which includes a representation of a handbag, and image segment 919, which includes a representation of a shoe, in connection with the automated generation of collage 920. Optionally, the user may also specify a collage category for the automated generation of collage 920.

Similar to the generation of collage 910, image segments 902 and 919 may be processed (e.g., by complementary image segment determination engine 802) to determine one or more additional image segments that are complementary to image segments 902 and 919. In an exemplary implementation, the complementary image segments may be determined by one or more trained machine learning systems configured to identify and determine image segments from a corpus of image segments that are complementary to image segments 902 and 919. The complementary image segments may include, for example, representation of objects that have a similar visual appearance, vibe, aesthetic, taste, feel, ambiance, etc. The determination of complementary image segments may be based, for example, on a relevance, a similarity, etc. of image segments in the corpus of image segments to image segments 902 and 919. For example, each image segment (and/or each image from which each image segment was extracted) may be represented as an embedding vector, and the relevance, similarity, etc. of image segments may be based on comparisons of the corresponding embedding vectors.

Optionally, the collage category and user information may also be considered in determining the complementary image segments. For example, user information, such as user history information (e.g., content items with which the user has interacted and/or recently interacted, as well as types of user interactions, user likes, user dislikes, user tastes, user demographic information, and the like), and the like, may be processed in determining complementary image segments that are more relevant and personalized to the particular user. Further, considering the collage category in determining the complementary image segments may also provide more relevant image segments to ensure that the complementary image segments pertain to the collage category.

In addition to identifying image segments that are complementary to image segments 902 and 919, the identified image segments may be filtered and/or ranked to determine a subset of image segments from the identified complementary image segments for inclusion in collage 920. According to aspects of the present disclosure, the identified complementary image segments may be filtered and/or ranked based on the collage category and/or a category associated with the image segments 902 and 919 (e.g., women's fashion, etc.), the object type of the objects represented in the image segments 902 and 919 (e.g., a handbag and a shoe, etc.), a category of the identified complementary image segments, the object type of the objects represented in the identified complementary image segments, user information, a number of image segments to be included in the collage, recently trending and/or popular images and/or image segments, and the like. In the illustrated implementation, based on image segments 902 and 919, which includes a representation of a handbag and shoe, image segments 922, 924, 926, and 928 may have been identified and selected as complementary image segments for inclusion in collage 920.

After the complementary image segments that are to be included in collage 920 have been determined, a layout of collage 920 that specifies an arrangement, organization, and/or positioning of each image segment in collage 920 may also be determined. In exemplary implementations, the collage layout may be determined using various probabilistic models, rule-based models, heuristic models, trained machine learning models, and the like to determine a layout to be used to organize and arrange the image segments in collage 920.

In an exemplary implementation, determination of the collage layout may be based on a plurality of layout templates, one of which may be selected as the layout for collage 920. Each layout template may include and/or specify a collage category (e.g., women's fashion, men's fashion, accessories, beauty products, home décor, etc.), a number of image segments to be included in the collage, an object type of the objects represented in the image segments (e.g., a sofa, a coffee table, a lamp, a jacket, a dress, a shirt/sweater, an accessory, etc.) included in the collage, a position for each image segment included in the collage, and the like. Accordingly, each layout template may specify a position (e.g., in three dimensions-horizontal, vertical, and depth/layer, etc.) for each image segment (e.g., relative to the other image segments to be included in the collage, relative to device display characteristics of the user device, etc.), a background color, one or more design elements, and the like.

According to aspects of the present disclosure, the layout template may be determined based on the collage category for collage 920 being generated, the number of additional complementary image segments to be included in the collage, as well as the object types of the objects represented in the image segments (e.g., image segments 902 and 919 and the additional complementary image segments-image segments 922, 924, 926, and 928) to be included in collage 920. First, the layout templates associated with the collage category may be identified from the available layout templates. After the collage layouts having the corresponding collage category are determined, the collage layout specifying a layout most suitable based on the number of image segments and the object types of the objects represented in the image segments may be selected. Accordingly, in the illustrated implementation, the selected collage layout may specify the arrangement and/or position of each of image segment 902, image segment 922, which includes a representation of a hat, image segment 924, which includes a representation of shirt, image segment 926, which includes a representation of a watch, image segment 928, which includes a representation of a belt, and image segment 919, which includes a representation of a shoe, as illustrated in FIG. 9B.

After determination of a collage layout, collage 920 may be generated using image segments 902, 922, 924, 926, 928, and 919 and the determined collage layout. Collage 920 may then be returned and/or transmitted to the user and/or presented on a user device. The user may then interact and/or modify collage 920 (e.g., rearrange and/or reposition the image segments, remove and/or add image segments, and the like), via a user interface presented on the user device.

Alternatively and/or in addition, collage 920 may be stored and maintained as a content item (e.g., as an image, a collage, an advertisement, etc.). In implementations where collage 920 is stored and maintained as a content item, collage 920 may include metadata that includes links and/or references to each of image segments 902, 922, 924, 926, 928, and 919, as well as links and/or references to the images from which image segments 902, 922, 924, 926, 928, and 919 were extracted. Additionally, each image segment may include a link and/or a reference to a page or site associated with the object represented in the respective image segment (e.g., a catalog page from which the object may be purchased, a brand page providing more information regarding the object, etc.). Further, collages that are stored and maintained as advertisements may be dynamically and automatically deleted, so as to automatically cancel poorly performing advertisements. Optionally, links and/or references to other collages that include the image segments included in collage 920 and/or image segments from the images from which the image segments included in collage 920 were extracted may also be stored and maintained in association with collage 920.

Figure 9C:
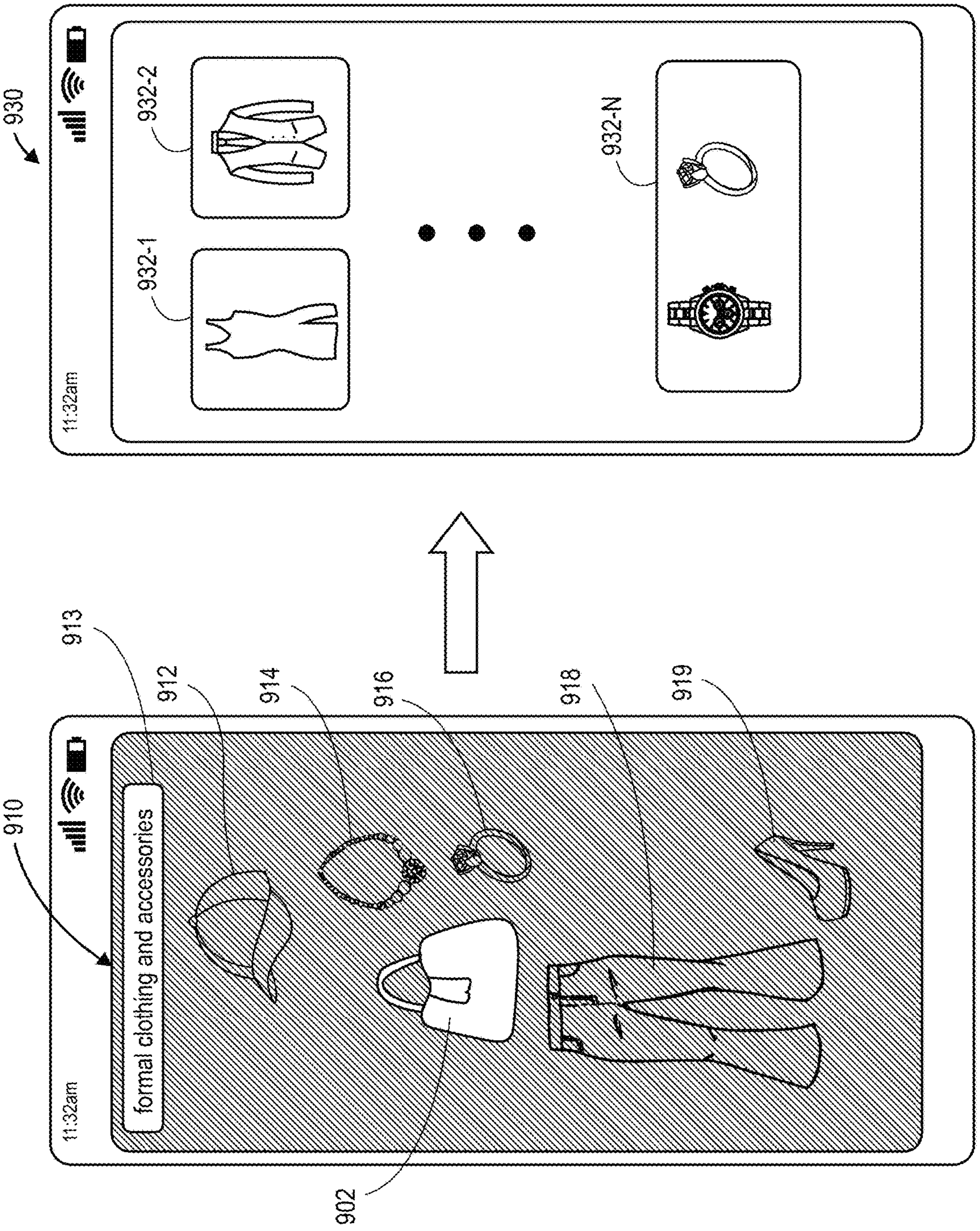

FIG. 9C illustrates exemplary graphical user interfaces in connection with performing a query, according to exemplary embodiments of the present disclosure. The implementation illustrated in FIG. 9C may be subsequent to the generation of collage 910 shown in FIG. 9A. For example, after generation of collage 910, the user may desire to perform a query (e.g., a multi-modal query, a refining query, etc.) based on one or more image segments included in collage 910. As shown in FIG. 9C, a user may have selected image segment 902, which includes a representation of a handbag, and have provided a text input 913.

According to exemplary implementations of the present disclosure, a multi-modal query may be processed to determine relevant and responsive results to the query. For example, one or more embedding vectors that represent each of image segment 902 and the text query and/or the combination of image segment 902 and the text query may be used to identify and return content items from a corpus of content items that are responsive to the query. As shown in FIG. 9C, in response to the query including image segment 902 and text input 913, content items 932 (e.g., 932-1, 932-2, through 932-N) may have been determined and presented to the user via user interface 930.

Figure 9D:
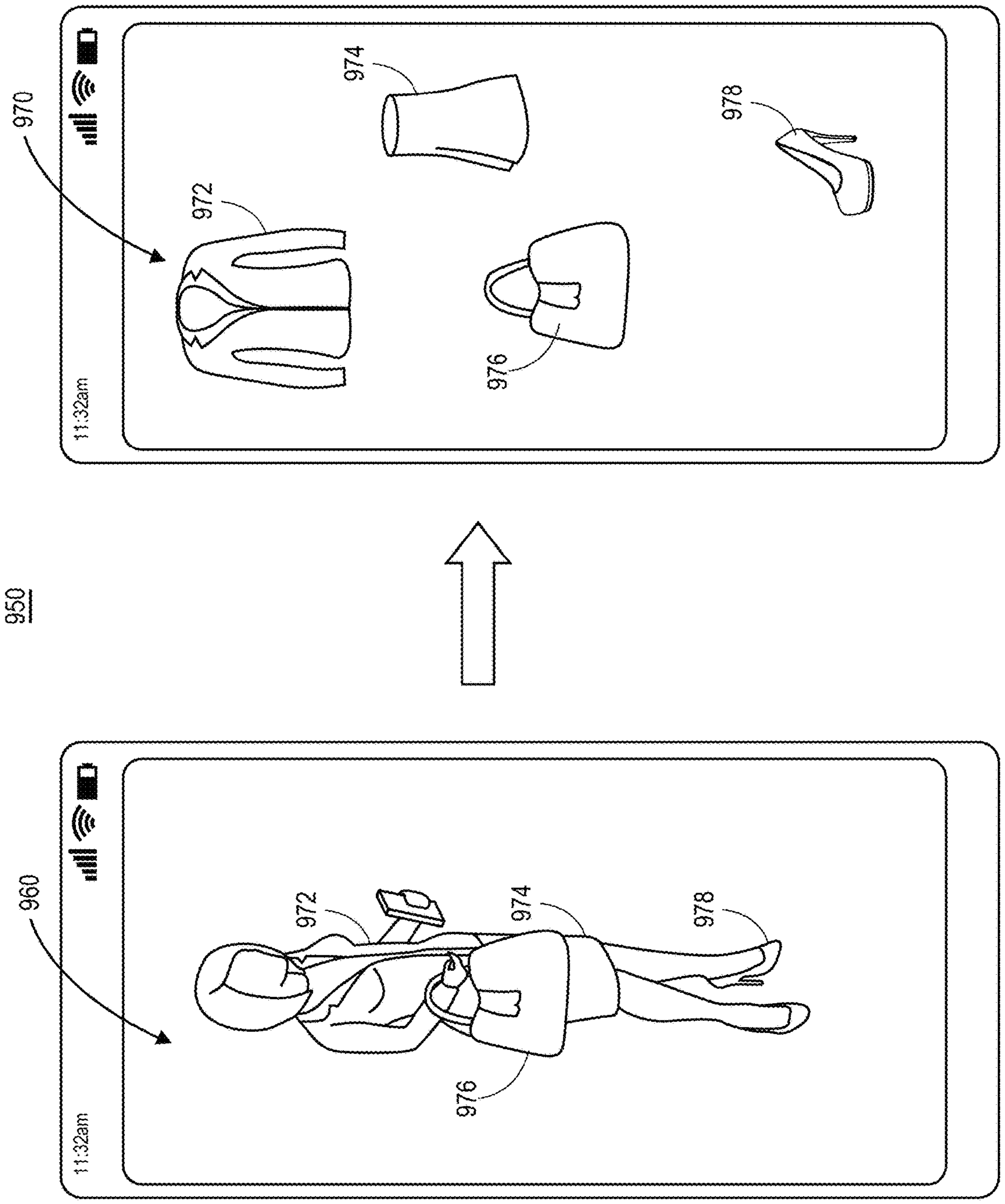

FIG. 9D illustrates exemplary graphical user interfaces 950 in connection with the automated generation of collage 970, according to exemplary embodiments of the present disclosure. The exemplary implementation illustrated in FIG. 9D is similar to the implementation illustrated in FIG. 9A, however, rather than determining image segments that are complementary to a selected image segment in connection with the generation of a collage, FIG. 9D illustrates an implementation where a collage is generated from image segments extracted from a scene presented in a single image or content item.

As shown in FIG. 9D, image 960 may have been selected for the generation of a collage. Accordingly, image 960 may be processed as described herein to detect objects represented in image 960 and extract image segments corresponding to the objects represented in image 960. For example, image 960 may be processed to determine image segment 972, which may include a representation of a blazer, image segment 974, which may include a representation of a skirt, image segment 976, which may include a representation of a handbag, and image segment 978, which may include a representation of a shoe. Optionally, the user may be able to select additional objects in the image and/or deselect objects identified in the image and/or additional complementary image segments to the extracted image segments may be determined, as described herein.

Similar to the embodiment illustrated in FIG. 9A, a collage category may also be provided in connection with the automated generation of collage 970. For example, the collage category may be provided by a user, determined based on user information (e.g., recent activity, likes, dislikes, tastes, demographic information, etc.), determined based on image 960 (e.g., metadata associated with image 960, etc.), determined based on image segments extracted from image 960 (e.g., a category to which the object represented in image segments 972, 974, 976, and/or 978 belong, etc.), and the like. The collage category may specify a subject matter and/or topic of collage 970 that is to be generated. In the illustrated implementation, the representation of a handbag in image segments 972, 974, 976, and/or 978 may be associated with the category of women's fashion, which may be determined as the collage category. In other implementations where the object represented in the image segments are associated with more than one category, the user's history (e.g., recent interactions, recent queries, etc.), other information (e.g., currently trending content items and/or topics, etc.), metadata or other information associated with the image, and the like may be considered in determining the collage category.

After the image segments that are to be included in collage 970 have been determined, a layout of collage 970 that specifies an arrangement, organization, and/or positioning of each image segment in collage 970, a background color, other design elements, and the like, may also be determined. In exemplary implementations, the collage layout may be determined using various probabilistic models, rule-based models, heuristic models, trained machine learning models, and the like to determine a layout to be used to organize and arrange the image segments in collage 970.

In an exemplary implementation, determination of the collage layout may be based on a plurality of layout templates, one of which may be selected as the layout for collage 970. Each layout template may include and/or specify a collage category (e.g., women's fashion, men's fashion, accessories, beauty products, home décor, etc.), a number of image segments to be included in the collage, an object type of the objects represented in the image segments (e.g., a sofa, a coffee table, a lamp, a jacket, a dress, a shirt/sweater, an accessory, etc.) included in the collage, a position for each image segment included in the collage, and the like. Accordingly, each layout template may specify a position (e.g., in three dimensions-horizontal, vertical, and depth/layer, etc.) for each image segment (e.g., relative to the other image segments to be included in the collage, relative to device display characteristics of the user device, etc.), a background color, one or more design elements, and the like.

According to aspects of the present disclosure, the layout template may be determined based on the collage category for collage 970 being generated, the number of image segments to be included in the collage, as well as the object types of the objects represented in the image segments (e.g., image segments 972, 974, 976, and 978) to be included in collage 970. First, the layout templates associated with the collage category may be identified from the available layout templates. After the collage layouts having the corresponding collage category are determined, the collage layout specifying a layout most suitable based on the number of image segments and the object types of the objects represented in the image segments may be selected. Accordingly, in the illustrated implementation, the selected collage layout may specify the arrangement and/or position of each of image segments 972, 974, 976, and 978, as illustrated in FIG. 9A.

After determination of a collage layout, collage 970 may be generated using image segments 972, 974, 976, and 978 and the determined collage layout. Collage 970 may then be returned and/or transmitted to the user and/or presented on a user device. The user may then interact and/or modify collage 970 (e.g., rearrange and/or reposition the image segments, remove and/or add image segments, and the like), via a user interface presented on the user device.

Alternatively and/or in addition, collage 970 may be stored and maintained as a content item (e.g., as an image, a collage, an advertisement, etc.). In implementations where collage 970 is stored and maintained as a content item, collage 970 may include metadata that includes links and/or references to each of image segments 972, 974, 976, and 978, as well as links and/or references to the image from which image segments 972, 974, 976, and 978 were extracted. Additionally, each image segment may include a link and/or a reference to a page or site associated with the object represented in the respective image segment (e.g., a catalog page from which the object may be purchased, a brand page providing more information regarding the object, etc.). Further, collages that are stored and maintained as advertisements may be dynamically and automatically deleted so as to automatically cancel poorly performing advertisements. Optionally, links and/or references to other collages that include the image segments included in collage 970 and/or image segments from the images from which the image segments included in collage 970 were extracted may also be stored and maintained in association with collage 970.

Figure 10A:
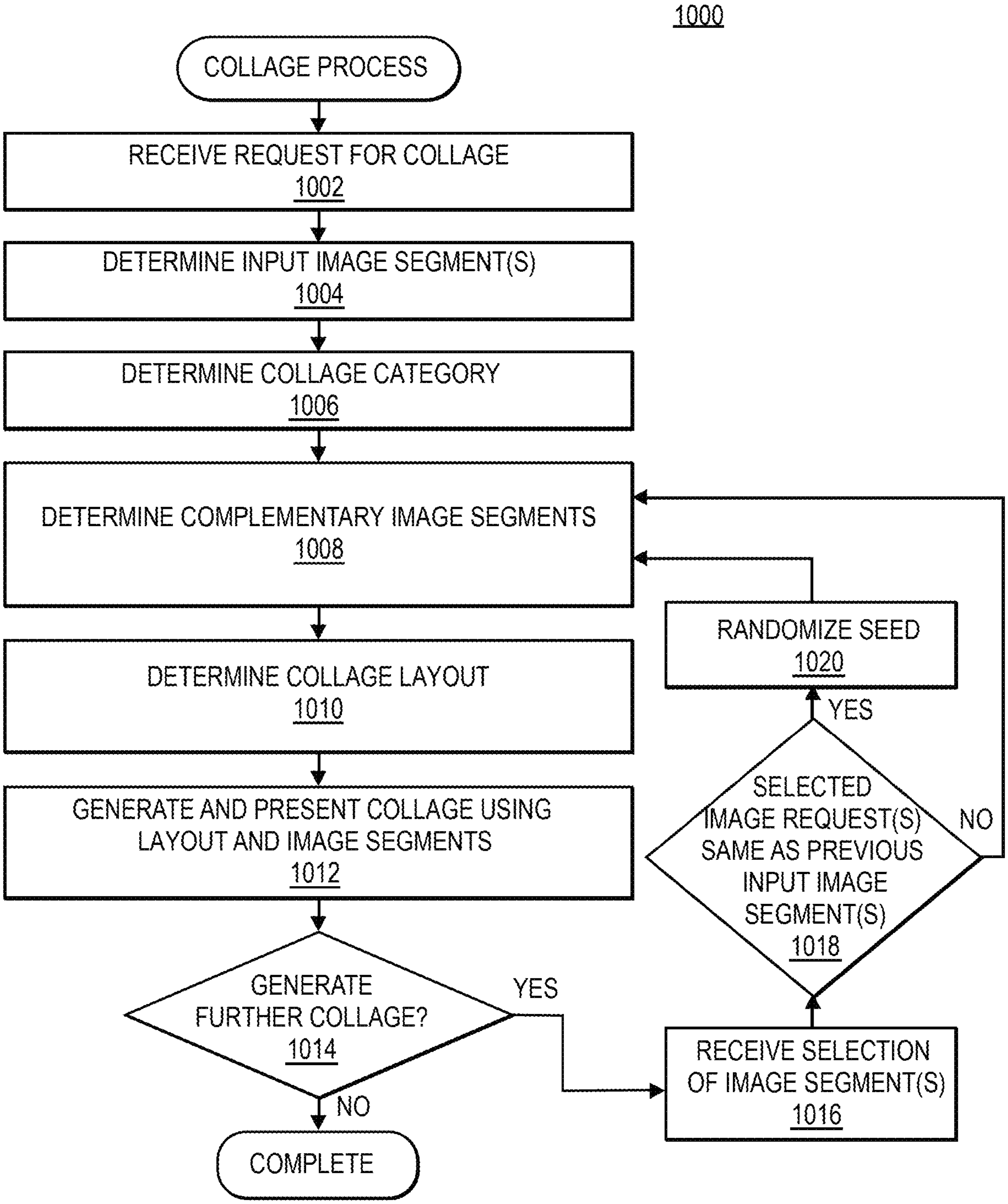
FIGS. 10A and 10B are flow diagrams of exemplary collage processes, according to exemplary embodiments of the present disclosure.
Figure 10B:
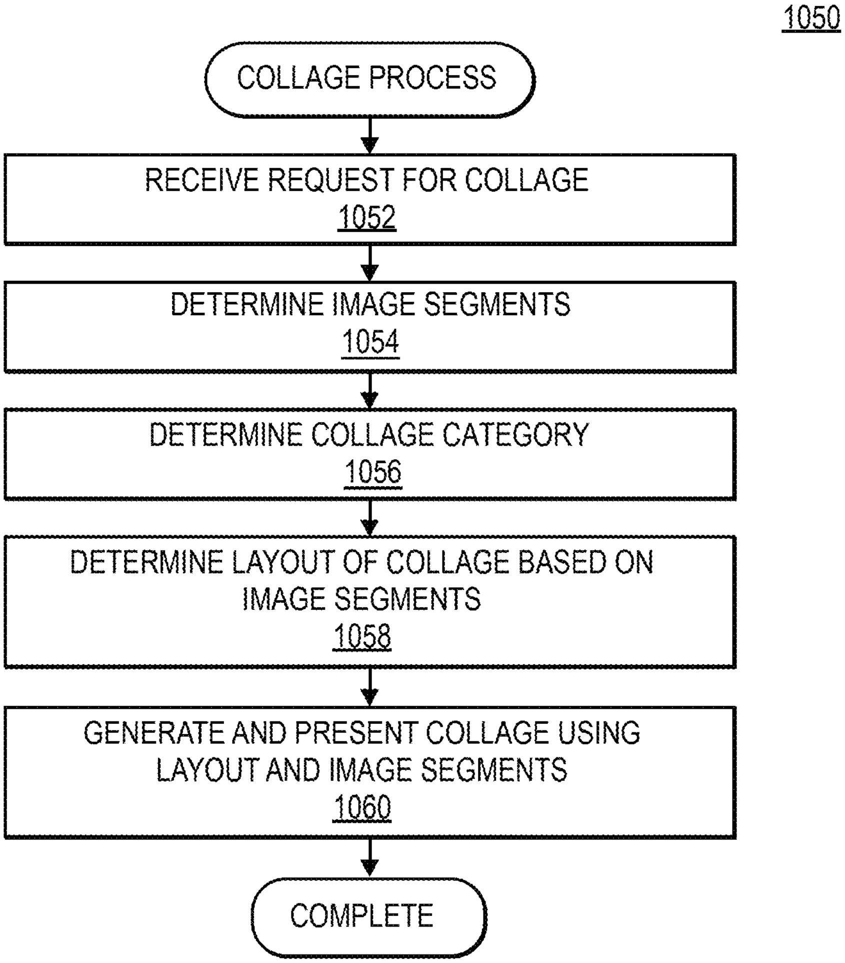

FIGS. 10A and 10B are flow diagrams of exemplary collage processes, according to exemplary embodiments of the present disclosure. FIG. 10A illustrates an exemplary collage process where complementary image segments are determined as the image segments used to generate a collage, and FIG. 10B illustrates an exemplary collage process where the image segments used to generate a collage are extracted from a scene presented in a single image/content item.

As shown in FIG. 10A, process 1000 may begin with the receipt of a request for generating a collage, as in step 1002, and one or more input image segment(s) may also be determined, as in step 1004. The request may be an explicit request that may be indicated by a user interaction with a selection of an image segment via a user interface, in connection with a query, and the like. For example, in implementations where the request accompanies a query, one or more image segments may be identified as responsive to the query, and the responsive image segment(s) may be processed as the basis for generating a collage. Alternatively and/or in addition, the request may be implicit. For example, as a user browses content items of the social networking and/or interactive computing environment that implement aspects of the present disclosure, image segments of the browsed content items may be processed as the basis for generating a collage, without further input from the user. As another example, if a user selected to view or close-up a content item from the corpus, image segments of such content items may be processed as the basis for generating a collage. According to other aspects, the request may be included as part of and/or in connection with a request to access a homepage and/or a home feed, an indication that a collage is to be pushed to a user, and the like. Still further, the disclosed implementations may be utilized to generate a collage without an explicit or implicit request from a user.

In step 1006, in addition to receiving a request for a collage and input image segment(s), a collage category may also be determined. The collage category may specify a subject matter and/or topic of the collage that is to be generated. For example, the collage category may specify a category associated with the collage, such as women's fashion, men's fashion, beauty products, home décor, and the like. According to certain aspects of the present disclosure, collages may include image segments associated with more than one category (e.g., a compilation of fashion and home décor image segments having a similar aesthetics, etc.), and the collage category for such collages may specify more than one collage category. The collage category may be expressly specified by the user, determined based on user information (e.g., recent activity, likes, dislikes, tastes, demographic information, etc.), determined based on a category associated with the input image segment(s), and the like.

As illustrated, one or more additional image segments that are complementary to the input image segment(s) may be determined, as in step 1008. In an exemplary implementation, one or more trained machine learning systems may be used to identify and determine image segments from a corpus of image segments that are complementary to the input image segment(s). The complementary image segments may include, for example, representations of objects that have a similar visual appearance, vibe, aesthetic, taste, feel, ambiance, etc. to objects represented in the input image segment(s). The determination of complementary image segments may be based, for example, on a relevance, similarity, etc. of image segments in the corpus of image segments to the input image segment(s). For example, each image segment (and/or each image from which each image segment was extracted) may be represented as an embedding vector, and the relevance, similarity, etc. of image segments may be based on comparisons of the corresponding embedding vectors.

Optionally, user information, the collage category, and other information may also be considered in determining complementary image segments. For example, user information, such as user history, user likes, user dislikes, etc., may be processed in determining complementary image segments that are more relevant and personalized to the particular user based on the user information. In some implementations, the popularity or frequency of extracted image segments used on other collages by the same or other users may be monitored and popular or trending image segments may be considered in determining the complementary image segments. Further, the collage category may also be processed in connection with determining the complementary image segments to ensure that the complementary image segments pertain to the collage category.

In connection with identifying image segments that are complementary to the input image segment(s), an initial set of identified image segments may be filtered and/or ranked to determine a subset of image segments from the initially identified complementary image segments for inclusion in the collage. According to aspects of the present disclosure, the identified complementary image segments may be filtered and/or ranked based on the number of input image segment(s), the collage category and/or a category associated with the input image segment(s) (e.g., women's fashion, men's fashion, beauty products, home décor, etc.), the object type of the objects represented in the input image segment(s) (e.g., a sofa, a coffee table, a lamp, a jacket, a dress, a shirt/sweater, an accessory, etc.), a category of the identified complementary image segments, the object type of the objects represented in the identified complementary image segments, user information, a number of image segments to be included in the collage, recently trending and/or popular images and/or image segments, and the like.

After the complementary image segments that are to be included in the collage have been determined, a collage layout may be determined, as in step 1010. For example, the collage layout may specify an arrangement, organization, and/or positioning of each image segment in the collage. In exemplary implementations, the collage layout may be determined from a plurality of layout templates. Each layout template may include and/or specify a collage category (e.g., women's fashion, men's fashion, accessories, beauty products, home décor, etc.), a number of image segments to be included in the collage, an object type of the objects represented in the image segments (e.g., a sofa, a coffee table, a lamp, a jacket, a dress, a shirt/sweater, an accessory, etc.) included in the collage, a position for each image segment included in the collage, and the like. Accordingly, each layout template may specify a position (e.g., in three dimensions-horizontal, vertical, and depth/layer, etc.) for each image segment (e.g., relative to the other image segments to be included in the collage, relative to device display characteristics of the user device, etc.), a background color, one or more design elements, and the like. For example, the collage templates associated with the women's fashion category may specify that an image segment including a representation of a sweater is partially layered on top of and arranged above an image segment including a representation of a skirt, an image segment including a representation of a pair of shoes is arranged below the image segment including the representation of the skirt, and so forth.

According to aspects of the present disclosure, the layout template may be determined based on the collage category for the collage being generated, the number of additional complementary image segments to be included in the collage, as well as the object types of the objects represented in the image segments (e.g., input image segment(s) and the additional complementary image segments) to be included in the collage being generated. First, the layout templates associated with the collage category may be identified from the available layout templates. After the collage layouts having the corresponding collage category are determined, the collage layout specifying a layout most suitable based on the number of image segments and the object types of the objects represented in the image segments may be selected. Continuing an example where the collage category of the collage to be generated is women's fashion and the image segments to be included in the collage include representations of a sweater, a skirt, and a pair of shoes. A women's fashion collage layout specifying a layout that includes an arrangement and/or position information for a top, a bottom, and shoes may be selected over a women's fashion collage layout specifying a layout that includes an arrangement and/or position information of a top, a hat, and a necklace. Alternatively and/or in addition, the collage layout may be determined randomly (e.g., from all available collage layouts and/or from the collage layouts having the same collage category).

After determination of the collage layout, in step 1012, the collage may be generated to include the input image segment(s) and the identified complementary image segments according to the collage layout. The collage may then be returned and/or transmitted to the user and/or presented on a user device. Alternatively and/or in addition, the collage may be stored and maintained as a content item. In implementations where the collage is stored and maintained as a content item, the collage may include metadata that includes links and/or references to each image segment included in the collage, as well as links and/or references to the images from which the image segments were extracted. Optionally, links and/or references to other collages that include the image segments included in the collage and/or image segments from the images from which the image segments included in the collage were extracted may also be stored and maintained in association with the collage.

In step 1014, it may be determined whether a further collage is to be generated. If a further collage is not to be generated, process 1000 may complete. Otherwise, the selection of one or more image segments (e.g., of the image segments included in the collage) may be received, as in step 1016. Optionally, a collage category for the automated generation of the further collage may also be received. In step 1018, it may be determined whether the image segment(s) selected for generation of a further collage are the same as the previously received input image segment(s) that were first received and processed in connection with the previously generated collage. If the selected image segment(s) are not the same as the previously received input segment(s) in connection with the previously generated collage, process 1000 returns to step 1008 to determine complementary image segments based on the selected image segment(s). Otherwise, a randomized seed may be used in the determination of complementary image segments, as in step 1020, so that different complementary image segments that were not included in the previously generated collage are determined and selected, despite the selected image segment being the same as the input image segment(s) received in connection with the previously generated collage, for inclusion in the further collage. Process 1000 then returns to step 1008 to determine complementary image segments based on the selected image segment(s).

As shown in FIG. 10B, process 1050 may begin with the receipt of a request for generating a collage, as in step 1052. The request may be an explicit request that may be indicated by a user interaction with a selection of an image segment via a user interface, in connection with a query, and the like. For example, in implementations where the request accompanies a query, one or more image segments may be identified as responsive to the query, and the responsive image segment(s) may be processed as the basis for generating a collage. Alternatively and/or in addition, the request may be implicit. For example, as a user browses content items of the social networking and/or interactive computing environment that implement aspects of the present disclosure, image segments of the browsed content items may be processed as the basis for generating a collage, without further input from the user. As another example, if a user selected to view or close-up a content item from the corpus, image segments of such content items may be processed as the basis for generating a collage. According to other aspects, the request may be included as part of and/or in connection with a request to access a homepage and/or a home feed, an indication that a collage is to be pushed to a user, and the like. Still further, the disclosed implementations may be utilized to generate a collage without an explicit or implicit request from a user.

In step 1054, image segments may be determined. For example, an image may be processed as described herein to detect objects represented in the image and extract image segments corresponding to objects represented in the image. In step 1056, in addition to receiving a request for a collage and determination of the image segments, a collage category may also be determined. The collage category may specify a subject matter and/or topic of the collage that is to be generated. For example, the collage category may specify a category associated with the collage, such as women's fashion, men's fashion, beauty products, home décor, and the like. According to certain aspects of the present disclosure, collages may include image segments associated with more than one category (e.g., a compilation of fashion and home décor image segments having a similar aesthetics, etc.), and the collage category for such collages may specify more than one collage category. The collage category may be expressly specified by the user, determined based on user information (e.g., recent activity, likes, dislikes, tastes, demographic information, etc.), determined based on a category associated with the determined image segments, and the like.

According to certain implementations, one or more additional image segments that are complementary to the determined image segments may also be determined. In an exemplary implementation, one or more trained machine learning systems may be used to identify and determine image segments from a corpus of image segments that are complementary to the determined image segments. The complementary image segments may include, for example, representations of objects that have a similar visual appearance, vibe, aesthetic, taste, feel, ambiance, etc. to objects represented in the determined image segments. The determination of complementary image segments may be based, for example, on a relevance, similarity, etc. of image segments in the corpus of image segments to the input image segment(s). For example, each image segment (and/or each image from which each image segment was extracted) may be represented as an embedding vector, and the relevance, similarity, etc. of image segments may be based on comparisons of the corresponding embedding vectors.

Optionally, user information, the collage category, and other information may also be considered in determining complementary image segments. For example, user information, such as user history, user likes, user dislikes, etc., may be processed in determining complementary image segments that are more relevant and personalized to the particular user based on the user information. In some implementations, the popularity or frequency of extracted image segments used on other collages by the same or other users may be monitored and popular or trending image segments may be considered in determining the complementary image segments. Further, the collage category may also be processed in connection with determining the complementary image segments to ensure that the complementary image segments pertain to the collage category.

After the image segments that are to be included in the collage have been determined, a collage layout may be determined, as in step 1058. For example, the collage layout may specify an arrangement, organization, and/or positioning of each image segment in the collage. In exemplary implementations, the collage layout may be determined from a plurality of layout templates. Each layout template may include and/or specify a collage category (e.g., women's fashion, men's fashion, accessories, beauty products, home décor, etc.), a number of image segments to be included in the collage, an object type of the objects represented in the image segments (e.g., a sofa, a coffee table, a lamp, a jacket, a dress, a shirt/sweater, an accessory, etc.) included in the collage, a position for each image segment included in the collage, a background color, one or more design elements, and the like. Accordingly, each layout template may specify a position (e.g., in three dimensions-horizontal, vertical, and depth/layer, etc.) for each image segment (e.g., relative to the other image segments to be included in the collage, relative to device display characteristics of the user device, etc.), a background color, one or more design elements, and the like. For example, the collage templates associated with the women's fashion category may specify that an image segment including a representation of a sweater is partially layered on top of and arranged above an image segment including a representation of a skirt, an image segment including a representation of a pair of shoes is arranged below the image segment including the representation of the skirt, and so forth.

According to aspects of the present disclosure, the layout template may be determined based on the collage category for the collage being generated, the number of image segments to be included in the collage, as well as the object types of the objects represented in the image segments to be included in the collage being generated. First, the layout templates associated with the collage category may be identified from the available layout templates. After the collage layouts having the corresponding collage category are determined, the collage layout specifying a layout most suitable based on the number of image segments and the object types of the objects represented in the image segments may be selected. Continuing an example where the collage category of the collage to be generated is women's fashion and the image segments to be included in the collage include representations of a sweater, a skirt, and a pair of shoes, a women's fashion collage layout specifying a layout that includes an arrangement and/or position information for a top, a bottom, and shoes may be selected over a women's fashion collage layout specifying a layout that includes an arrangement and/or position information of a top, a hat, and a necklace. Alternatively and/or in addition, the collage layout may be determined randomly (e.g., from all available collage layouts and/or from the collage layouts having the same collage category).

After determination of the collage layout, in step 1060, the collage may be generated to include the input image segment(s) and the identified complementary image segments according to the collage layout. The collage may then be returned and/or transmitted to the user and/or presented on a user device. Alternatively and/or in addition, the collage may be stored and maintained as a content item (e.g., as an image, a collage, an advertisement, etc.). In implementations where the collage is stored and maintained as a content item, the collage may include metadata that includes links and/or references to each image segment included in the collage, as well as links and/or references to the images from which the image segments were extracted. Additionally, each image segment may include a link and/or a reference to a page or site associated with the object represented in the respective image segment (e.g., a catalog page from which the object may be purchased, a brand page providing more information regarding the object, etc.). Further, collages that are stored and maintained as advertisements may be dynamically and automatically deleted, so as to automatically cancel poorly performing advertisements. Optionally, links and/or references to other collages that include the image segments included in the collage and/or image segments from the images from which the image segments included in the collage were extracted may also be stored and maintained in association with the collage.

Figure 11:
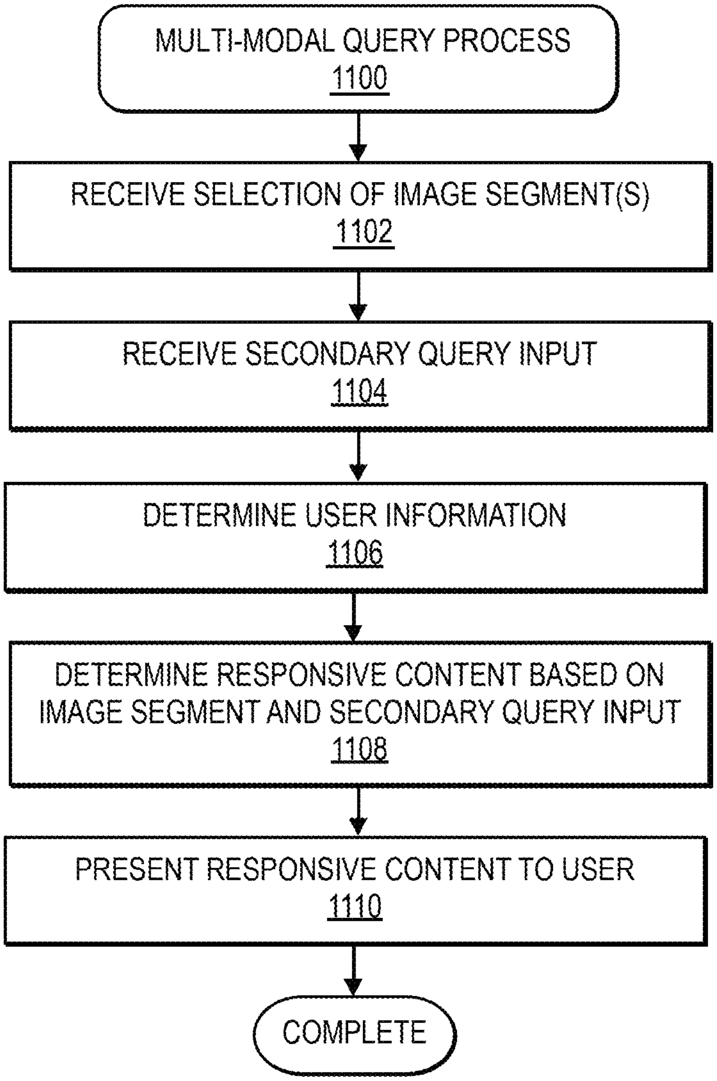
FIG. 11 is a flow diagram of an exemplary multi-modal query process, according to exemplary embodiments of the present disclosure.

FIG. 11 is a flow diagram of an exemplary multi-modal query process, according to exemplary embodiments of the present disclosure.

As shown in FIG. 11, process 1100 may begin with the receipt of the selection of one or more image segment(s), as in step 1102. According to exemplary implementations, process 1100 may be performed after the automated generation of a collage, and selection of the image segment(s) may include the selection of an image segment included in the collage. For example, after generation of a collage, the user may desire to perform a query (e.g., a multi-modal query, a refining query, etc.) based on one or more image segments included in the collage.

In step 1104, a secondary query input may also be received. For example, this may include a text-based input, a content item, and the like. Optionally, user information may also be determined and/or received in step 1106, so that responsive content is determined in view of user information so that the responsive content is more relevant to the particular user.

In step 1108, the image segment and the secondary query input (and optionally the user information) may be processed to determine relevant and responsive results to the query. For example, one or more embedding vectors that represent each of the image segment and the secondary query input and/or the combination of the image segment(s) and the secondary query input may be used to identify and return content items from a corpus of content items that are responsive to the query. In step 1110, the responsive content may be presented to the user.

Figure 12:
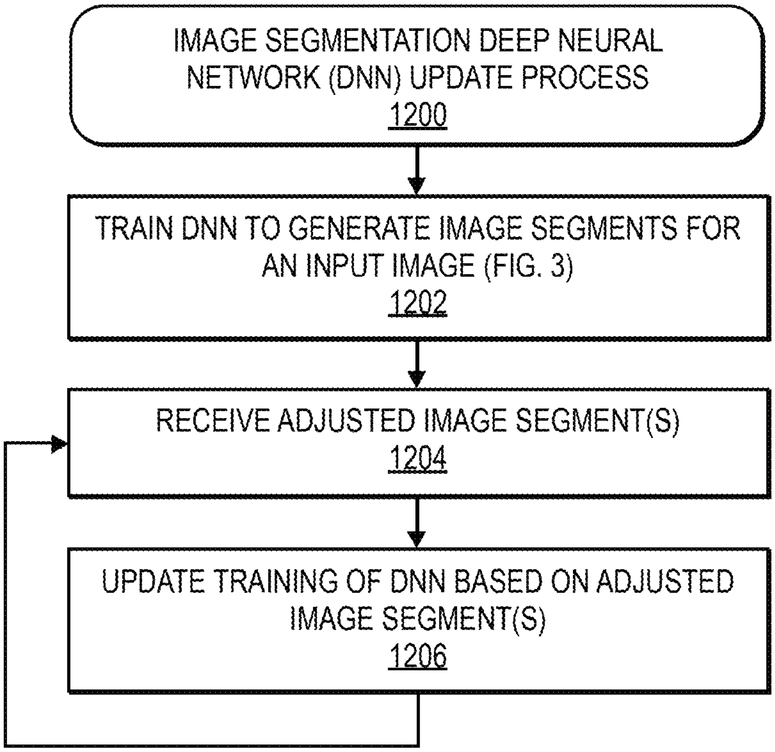
FIG. 12 is an example image segmentation deep neural network update process, in accordance with disclosed implementations.

FIG. 12 is an example image segmentation deep neural network update process 1200, in accordance with disclosed implementations. As discussed above, in some implementations, the DNN used to determine image segments of an image may be continually or periodically updated as image segments are adjusted by users to include/exclude pixels of those image segments. In some implementations, if an image segment is adjusted on a user device, the adjusted image segment may be sent to a remote computing resource and compiled with other user feedback (other image segment adjustments) and the adjusted image segments used for ongoing training to update the DNN. As a DNN is updated, the updated DNN may be sent to user devices for operation on those user devices. Alternatively, the updated DNN may reside on one or more remote computing resources and operate on those remote computing resources.

The example process 1200 begins by initially training a DNN to generate one or more image segments for an input image, as in 1202. In some implementations, the DNN may be trained to perform the image processing subprocess 300 discussed above with respect to FIG. 3. In other implementations, other training techniques or processes may be used to train a DNN to receive an input image and determine one or more image segments corresponding to objects represented in the input image.

At some point after the DNN is initially trained, one or more adjusted image segments may be obtained based on user input that caused the adjustment to image segments originally determined by the DNN, as in 1204. With a significantly large set of users, a large set of adjusted image segments may be received as different users interact with images and image segments determined and presented in accordance with the disclosed implementations.

The adjusted image segments and the corresponding image may be utilized as labeled training data for the DNN. Accordingly, the adjusted image segments may be used to update the DNN, as in 1206.

Figure 13:
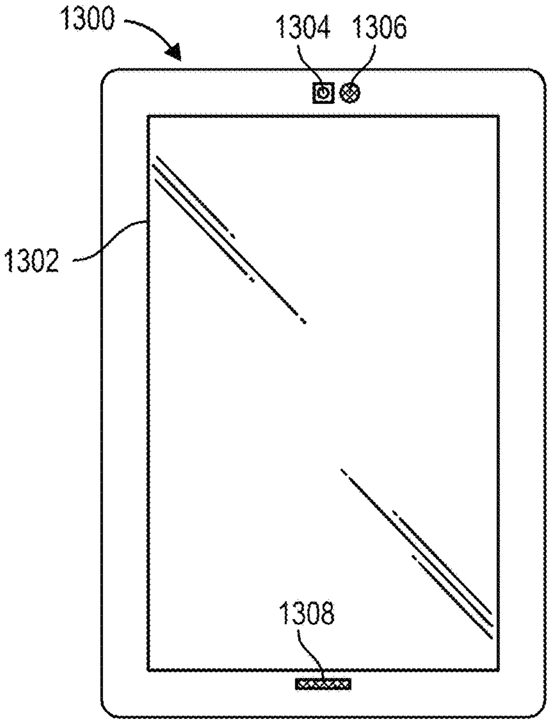
FIG. 13 illustrates an example computing device, in accordance with disclosed implementations.

FIG. 13 illustrates an example user device 1300 that can be used in accordance with various implementations described herein. In this example, the user device 1300 includes a display 1302 and optionally at least one input component 1304, such as a camera, on a same side and/or opposite side of the device as the display 1302. The user device 1300 may also include an audio transducer, such as a speaker 1306, and optionally a microphone 1308. Generally, the user device 1300 may have any form of input/output components that allow a user to interact with the user device 1300. For example, the various input components for enabling user interaction with the device may include a touch-based display 1302 (e.g., resistive, capacitive, Interpolating Force-Sensitive Resistance (IFSR)), camera (for gesture tracking, etc.), microphone, global positioning system (GPS), compass or any combination thereof. One or more of these input components may be included on a user device or otherwise in communication with the user device. Various other input components and combinations of input components can be used as well within the scope of the various implementations as should be apparent in light of the teachings and suggestions contained herein.

Figure 14:
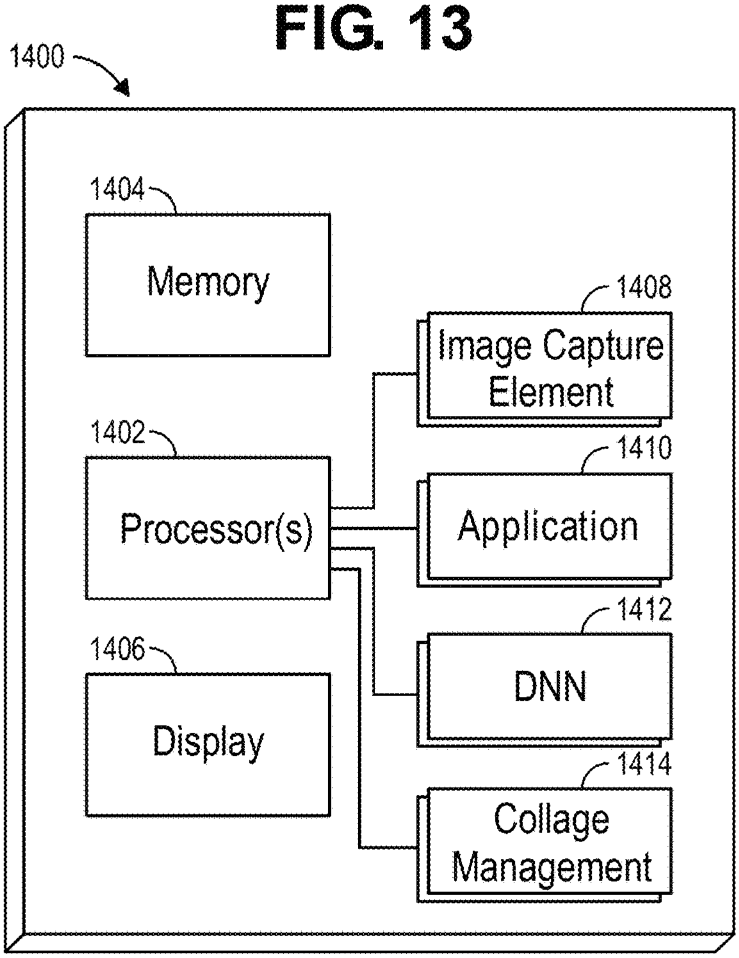
FIG. 14 illustrates an example configuration of components of a computing device, such as that illustrated in FIG. 13.

In order to provide the various functionality described herein, FIG. 14 illustrates an example set of basic components 1400 of a user device, such as the user device 1300 described with respect to FIG. 13 and discussed herein. In this example, the device includes one or more processors 1402 for executing instructions that can be stored in at least one memory device or element 1404. As would be apparent to one of ordinary skill in the art, the device can include many types of memory, data storage or computer-readable storage media, such as a first data storage for program instruction for execution by the one or more processors 1402. Removable storage memory can be available for sharing information with other devices, etc. The device typically will include some type of display 1406, such as a touch-based display, electronic ink (e-ink), organic light emitting diode (OLED), liquid crystal display (LCD), etc.

As discussed, the device in many implementations will include at least one image capture element 1408, such as one or more cameras that are able to image objects in the vicinity of the device. An image capture element can include, or be based at least in part upon, any appropriate technology, such as a CCD or CMOS image capture element having a determined resolution, focal range, viewable area, and capture rate. The device can include at least one application component 1410 for performing the implementations discussed herein, such as the generation of collages. The user device may be in constant or intermittent communication with one or more remote computing resources and may exchange information, such as collages, extracted image segments, transformed image segments, metadata, updated DNNs, etc., with the remote computing system(s) as part of the disclosed implementations.

The device also can include at least one location component, such as GPS, NFC location tracking, Wi-Fi location monitoring, etc. Location information obtained by the location component may be used with the various implementations discussed herein as a factor in, for example, determining a seller of an object represented in an extracted image segment. For example, if the user is located in a Store A department store and generates an extracted image segment from an image generated by the image capture element 1408 of the user device while located in the Store A department store, the location information may be used as a factor in determining a seller of an object represented in the extracted image segment.

The user device may also include a DNN 1412, as discussed herein, that is operable to receive an image as an input and determine one or more image segments corresponding to objects represented in the input image. Likewise, the user device may also include a collage management component 1414 that maintains, for example, collages created and/or viewed by the user of the user device, extracted image segments, etc., and/or performs some or all of the implementations discussed herein.

The example user device may also include at least one additional input device able to receive conventional input from a user. This conventional input can include, for example, a push button, touch pad, touch-based display, wheel, joystick, keyboard, mouse, trackball, keypad or any other such device or element whereby a user can submit an input to the device. These I/O devices could be connected by a wireless, infrared, Bluetooth, or other link as well in some implementations. In some implementations, however, such a device might not include any buttons at all and might be controlled only through touch inputs (e.g., touch-based display), audio inputs (e.g., spoken), or a combination thereof.

Figure 15:
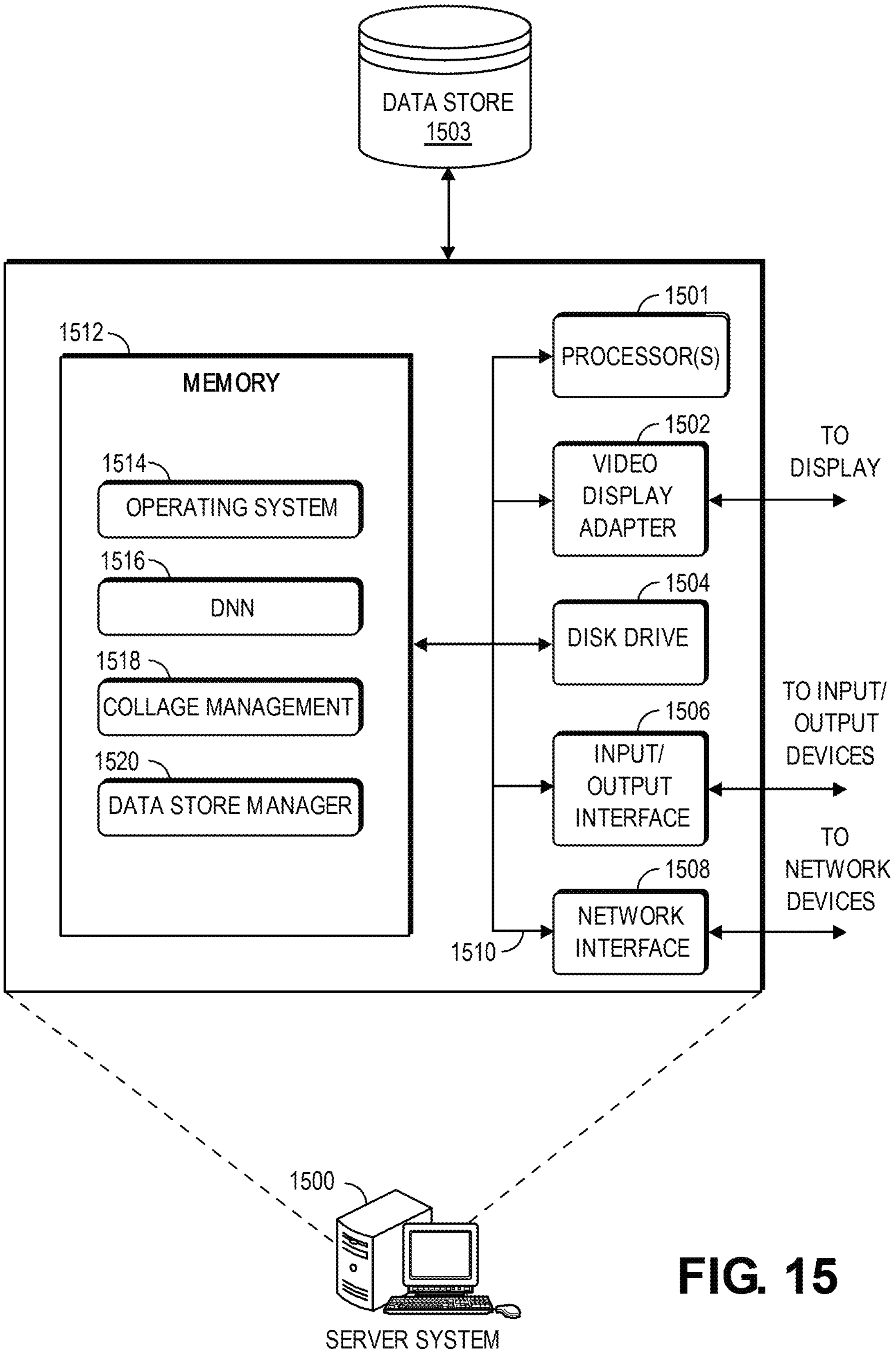
FIG. 15 is a pictorial diagram of an illustrative implementation of a server system that may be used for various implementations.

FIG. 15 is a pictorial diagram of an illustrative implementation of a server system 1500, such as a remote computing resource, that may be used with one or more of the implementations described herein. The server system 1500 may include one or more processors 1501, such as one or more redundant processors, a video display adapter 1502, a disk drive 1504, an input/output interface 1506, a network interface 1508, and a memory 1512. The processor(s) 1501, the video display adapter 1502, the disk drive 1504, the input/output interface 1506, the network interface 1508, and the memory 1512 may be communicatively coupled to each other by a communication bus 1510.

The video display adapter 1502 provides display signals to a local display permitting an operator of the server system 1500 to monitor and configure operation of the server system 1500. The input/output interface 1506 likewise communicates with external input/output devices not shown in FIG. 15, such as a mouse, keyboard, scanner, or other input and output devices that can be operated by an operator of the server system 1500. The network interface 1508 includes hardware, software, or any combination thereof, to communicate with other computing devices. For example, the network interface 1508 may be configured to provide communications between the server system 1500 and other computing devices, such as the user device 1300.

The memory 1512 generally comprises random access memory (RAM), read-only memory (ROM), flash memory, and/or other volatile or permanent memory. The memory 1512 is shown storing an operating system 1514 for controlling the operation of the server system 1500. The server system 1500 may also include a trained DNN 1516, as discussed herein. In some implementations, the DNN may determine object segments on the server. In other implementations, the DNN 1412 (FIG. 14) may determine image segments on a user device. In still other examples, a DNN may exist on both the server and each user device.

The memory 1512 additionally stores program code and data for providing network services that allow user devices 1300 and external sources to exchange information and data files with the server system 1500. The memory 1512 may also include a collage management application 1518 that maintains collage and/or collage information for different users that utilize the disclosed implementations. The collage management application 1518 may communicate with a data store manager application 1520 to facilitate data exchange and mapping between the data store 1503, user devices, such as the user device 1300, external sources, etc.

As used herein, the term "data store" refers to any device or combination of devices capable of storing, accessing and retrieving data, which may include any combination and number of data servers, databases, data storage devices and data storage media, in any standard, distributed or clustered environment. The server system 1500 can include any appropriate hardware and software for integrating with the data store 1503 as needed to execute aspects of one or more applications for the user device 1300, the external sources, etc.

The data store 1503 can include several separate data tables, databases or other data storage mechanisms and media for storing data relating to a particular aspect. For example, the data store 1503 may include digital items (e.g., images) and corresponding metadata (e.g., image segments, popularity, source) about those items. Collage data and/or user information and/or other information may likewise be stored in the data store.

It should be understood that there can be many other aspects that may be stored in the data store 1503, which can be stored in any of the above listed mechanisms as appropriate or in additional mechanisms of any of the data store. The data store 1503 may be operable, through logic associated therewith, to receive instructions from the server system 1500 and obtain, update or otherwise process data in response thereto.

The server system 1500, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction in FIG. 15 should be taken as being illustrative in nature and not limiting to the scope of the disclosure.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, media files, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some, or all of the specific details and steps disclosed herein.

Moreover, with respect to the one or more methods or processes of the present disclosure shown or described herein, including but not limited to the flow charts shown in FIGS. 2 through 6 and 10-12, orders in which such methods or processes are presented are not intended to be construed as any limitation on the claims, and any number of the method or process steps or boxes described herein can be combined in any order and/or in parallel to implement the methods or processes described herein. In addition, some process steps or boxes may be optional. Also, the drawings herein are not drawn to scale.

Aspects of the disclosed system may be implemented as a computer method or as an article of manufacture such as a memory device or non-transitory computer-readable storage medium. The computer-readable storage medium may be readable by a computer and may comprise instructions for causing a computer or other device to perform processes described in the present disclosure. The computer-readable storage media may be implemented by a volatile computer memory, non-volatile computer memory, hard drive, solid-state memory, flash drive, removable disk, and/or other media. In addition, components of one or more of the modules and engines may be implemented in firmware or hardware.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:

receiving a first image segment that is extracted from a first image and includes a representation of an object of interest;

determining, based at least in part on the object of interest, a first plurality of objects that are complementary to the object of interest and are represented in a first plurality of image segments extracted from a first plurality of images;

determining, based at least in part on the object of interest and the first plurality of objects, a collage layout template from a plurality of collage layout templates, wherein the collage layout specifies an arrangement of the first image segment and the first plurality of image segments to form a collage, wherein determining the collage layout template comprises:

determining a number of the first plurality of image segments extracted from the first plurality of objects that are complementary to the object of interest; and determining respective object types for the objects represented in the first image segment and the first plurality of image segments;

generating, based at least in part on the collage layout, the collage that includes the first image segment and the first plurality of image segments in the arrangement specified by the collage layout including specifying a position of the first image segment and the first plurality of image segments in the collage layout based on the respective object types; and causing the collage to be presented on a client device.

2. The computer-implemented method of claim 1, further comprising:

receiving, in response to presenting of the collage on the client device, a selection of at least one second image segment from the first plurality of image segments and the first image segment;

determining a second plurality of objects that are complementary to objects represented in the at least one second image segment and are represented in a second plurality of image segments extracted from a second plurality of images;

determining, based at least in part on the at least one second image segment and the second plurality of image segments, a second collage layout template from the plurality of collage layout templates, wherein the second collage layout specifies a second arrangement of the at least one second image segment and the second plurality of image segments to form a second collage;

generating, based at least in part on the second collage layout, the second collage that includes the at least one second image segment and the second plurality of image segments in the second arrangement specified by the second collage layout; and causing the second collage to be presented on the client device.

3. The computer-implemented method of claim 1, further comprising:

receiving, in response to presenting of the collage on the client device, a selection of the first image segment;

determining, based at least in part on the object of interest, a second plurality of objects that are complementary to the object of interest and are represented in a second plurality of image segments extracted from a second plurality of images, wherein the second plurality of image segments were not included in the first plurality of image segments; and determining, based at least in part on the object of interest and the second plurality of objects, a second collage layout template from the plurality of collage layout templates, wherein the second collage layout specifies a second arrangement of the first image segment and the second plurality of image segments to form a second collage;

generating, based at least in part on the second collage layout, the second collage that includes the first image segment and the second plurality of image segments in the second arrangement specified by the second collage layout; and causing the second collage to be presented on the client device.

4. The computer-implemented method of claim 1, further comprising:

receiving, in response to presenting of the collage on the client device, a selection of at least one second image segment from the first plurality of image segments and the first image segment;

receiving a secondary query input;

determining, based at least in part on the at least one second image segment and the secondary query input, a plurality of responsive content items; and causing at least a portion of the responsive content items to be presented on the client device.

5. The computer-implemented method of claim 4, wherein the secondary query input includes a text-based query.

6. A computing system, comprising:

one or more processors; and a memory storing program instructions that, when executed by the one or more processors, cause the one or more processors to at least:

receive a first plurality of image segments;

determine, based at least in part on the first plurality of image segments, a collage layout that specifies an arrangement of the first plurality of image segments, wherein determining the collage layout comprises:

determining a number of the first plurality of image segments extracted from the first plurality of objects that are complementary to the object of interest; and determining respective object types for the objects represented in the first image segment and the first plurality of image segments;

generate, based at least in part on the collage layout, a collage that includes the first plurality of image segments in the arrangement specified by the collage layout including specifying a position of the first image segment and the first plurality of image segments in the collage layout based on the respective object types; and cause the collage to be presented on a client device.

7. The computing system of claim 6, wherein the first plurality of image segments are extracted from a scene presented in a first image and include representations of a plurality of objects represented in the scene.

8. The computing system of claim 6, wherein:

the program instructions that, when executed by the one or more processors, further cause the one or more processors to at least cause the collage to be stored as a content item;

the collage includes a first respective link to one or more of the first plurality of image segments; and one or more of the first plurality of image segments includes a second respective link to a corresponding image from which it was extracted.

9. The computing system of claim 6, wherein:

the program instructions that, when executed by the one or more processors, further cause the one or more processors to at least:

prior to generation of the collage:

determine a collage category of the collage to be generated; and the collage layout is determined based at least in part on the collage category.

10. The computing system of claim 6, wherein:

the program instructions that, when executed by the one or more processors, further cause the one or more processors to at least determine user information associated with a user associated with the client device; and the first plurality of image segments are determined based at least in part on the user information.

11. The computing system of claim 6, wherein the program instructions that, when executed by the one or more processors, further cause the one or more processors to at least:

receive, in response to presenting of the collage on the client device, a selection of at least one second image segment from the first plurality of image segments;

determine a second plurality of image segments that include representation of a plurality of second objects that are complementary to objects represented in the at least one second image segment;

determine, based at least in part on the at least one second image segment and the second plurality of image segments, a second collage layout that specifies a second arrangement of the at least one second image segment and the second plurality of image segments;

generate, based at least in part on the second collage layout, a second collage that includes the at least one second image segment and the second plurality of image segments in the second arrangement specified by the second collage layout; and cause the second collage to be presented on the client device.

12. The computing system of claim 6, wherein the first plurality of image segments includes:

a first image segment extracted from a first image and including a representation of an object of interest; and a second plurality of image segments that are extracted from a first plurality of images and include representations of a first plurality of objects that are complementary to the object of interest.

13. The computing system of claim 12, wherein the program instructions that, when executed by the one or more processors, further cause the one or more processors to at least:

receive, in response to presenting of the collage on the client device, a selection of the first image segment;

determine, based at least in part on the object of interest, a third plurality of image segments that include representations of objects that are complementary to the object of interest, wherein the third plurality of image segments were not included in the second plurality of image segments; and determine, based at least in part on the object of interest and the third plurality of image segments, a second collage layout that specifies a second arrangement of the first image segment and the third plurality of image segments;

generate, based at least in part on the second collage layout, a second collage that includes the first image segment and the third plurality of image segments in the second arrangement specified by the second collage layout; and cause the second collage to be presented on the client device.

14. The computing system of claim 12, wherein the first plurality of images are included in a catalog associated with a brand.

15. The computer-implemented method of claim 6, wherein the program instructions that, when executed by the one or more processors, further cause the one or more processors to at least:

receive, in response to presenting of the collage on the client device, a selection of at least one second image segment from the first plurality of image segments;

receive a secondary query input;

determine, based at least in part on the at least one second image segment and the secondary query input, a plurality of responsive content items; and cause at least a portion of the responsive content items to be presented on the client device.

16. A method, comprising:

receiving, from a client device associated with a user, an indication of a first image segment that is extracted from a first image and includes a representation of an object of interest;

determining, based at least in part on the object of interest and user information associated with the user, a first plurality of image segments that include representations of objects that are complementary to the object of interest;

determining, based at least in part on the first image segment and the first plurality of image segments, a collage layout that specifies an arrangement of the first image segment and the first plurality of image segments, wherein determining the collage layout comprises:

determining a number of the first plurality of image segments extracted from the first plurality of objects that are complementary to the object of interest; and determining respective object types for the objects represented in the first image segment and the first plurality of image segments;

generate, based at least in part on the collage layout, a collage that includes the first image segment and the first plurality of image segments in the arrangement specified by the collage layout including specifying a position of the first image segment and the first plurality of image segments in the collage layout based on the respective object types; and providing the collage to the client device for presentation.

17. The method of claim 16, further comprising:

prior to generation of the collage:

determining a collage category of the collage to be generated;

wherein the collage layout is determined based at least in part on of the collage category.

18. The method of claim 16, wherein the first plurality of image segments are further determined as least based in part on a popularity of the first image segments.

19. The method of claim 16, wherein:

the first plurality of image segments are extracted from a first plurality of images that are included in a catalog associated with a brand;

and the method further comprises:

storing the collage as an advertisement, wherein:

one or more image segment of the first plurality of image segments included in the collage includes a first respective link to a respective object page corresponding to an object represented in respective image segments.

20. The method of claim 16, wherein the arrangement specifies at least one of:

a relative positioning of one or more of the first image segment and the first plurality image segments in three dimensions;

a background color; or a design element.

* * * * *